(12) United States Patent
Fortner et al.

(10) Patent No.: US 11,148,119 B2
(45) Date of Patent: Oct. 19, 2021

(54) ENGINEERED NANOPARTICLES FOR AQUEOUS APPLICATIONS

(71) Applicant: WASHINGTON UNIVERSITY, St. Louis, MO (US)

(72) Inventors: John Fortner, St. Louis, MO (US); Brandon J. Lafferty, St. Louis, MO (US); Seung Lee, St. Louis, MO (US); Wenlu Li, St. Louis, MO (US)

(73) Assignee: Washington University, St. Louis, MO (US)

( * ) Notice: Subject to any disclaimer, the term of this patent is extended or adjusted under 35 U.S.C. 154(b) by 782 days.

(21) Appl. No.: 15/748,369

(22) PCT Filed: Aug. 11, 2016

(86) PCT No.: PCT/US2016/046591
§ 371 (c)(1),
(2) Date: Jan. 29, 2018

(87) PCT Pub. No.: WO2017/069837
PCT Pub. Date: Apr. 27, 2017

(65) Prior Publication Data
US 2018/0280923 A1      Oct. 4, 2018

Related U.S. Application Data

(60) Provisional application No. 62/205,243, filed on Aug. 14, 2015.

(51) Int. Cl.
*H01F 1/00* (2006.01)
*C02F 1/28* (2006.01)
(Continued)

(52) U.S. Cl.
CPC ........... *B01J 20/06* (2013.01); *B01J 20/0222* (2013.01); *B01J 20/22* (2013.01);
(Continued)

(58) Field of Classification Search
CPC .... H01F 1/0054; H01F 1/0018; H01F 1/0045; B01J 20/0222; B01J 20/06; B01J 20/22;
(Continued)

(56) References Cited

FOREIGN PATENT DOCUMENTS

| CN | 104637644 A | 5/2015 |
|---|---|---|
| EP | 2727577 A1 | 5/2014 |

(Continued)

OTHER PUBLICATIONS

Lan et al., "Synthesis of bilayer oleic acid-coated Fe3O4 nanoparticles and their application in pH-responsive Pickering emulsions", Journal of Colloid and Interface Science, Feb. 2, 2007, 310, pp. 260-269. (Year: 2007).*

(Continued)

*Primary Examiner* — Matthew E. Hoban
*Assistant Examiner* — Lynne Edmondson
(74) *Attorney, Agent, or Firm* — Armstrong Teasdale LLP

(57) ABSTRACT

Coated iron oxide (10) nanocrystal structures, superparamagnetic 10 nanoparticles, methods for synthesizing coated 10 nanocrystal structures, and methods for synthesizing superparamagnetic 10 nanoparticles are described herein. A coated 10 nanocrystal structure may comprise an iron oxide core, a manganese ferrite shell layer surrounding the core, and a bilayer coating surrounding the shell layer. The bilayer coating may include an inner oleic acid layer surrounding the shell layer and an outer layer surrounding the inner oleic acid layer.

13 Claims, 51 Drawing Sheets

(51) Int. Cl.

| | |
|---|---|
| *B01J 20/28* | (2006.01) |
| *B01J 20/32* | (2006.01) |
| *B01J 20/02* | (2006.01) |
| *B01J 20/06* | (2006.01) |
| *C01G 45/02* | (2006.01) |
| *C09C 1/24* | (2006.01) |
| *C01G 49/00* | (2006.01) |
| *C01G 49/02* | (2006.01) |
| *B01J 20/22* | (2006.01) |
| *C02F 101/00* | (2006.01) |
| *C02F 101/10* | (2006.01) |
| *C02F 101/22* | (2006.01) |
| *B82Y 40/00* | (2011.01) |
| *C02F 101/20* | (2006.01) |

(52) U.S. Cl.
CPC ... *B01J 20/28007* (2013.01); *B01J 20/28009* (2013.01); *B01J 20/28021* (2013.01); *B01J 20/3204* (2013.01); *B01J 20/3225* (2013.01); *B01J 20/3236* (2013.01); *B01J 20/3248* (2013.01); *B01J 20/3287* (2013.01); *B01J 20/3293* (2013.01); *C01G 45/02* (2013.01); *C01G 49/0072* (2013.01); *C01G 49/02* (2013.01); *C02F 1/288* (2013.01); *C09C 1/24* (2013.01); *B82Y 40/00* (2013.01); *C01P 2002/72* (2013.01); *C01P 2002/78* (2013.01); *C01P 2002/85* (2013.01); *C01P 2004/04* (2013.01); *C01P 2004/61* (2013.01); *C01P 2004/84* (2013.01); *C01P 2006/22* (2013.01); *C01P 2006/42* (2013.01); *C02F 1/281* (2013.01); *C02F 1/285* (2013.01); *C02F 2101/006* (2013.01); *C02F 2101/103* (2013.01); *C02F 2101/206* (2013.01); *C02F 2101/22* (2013.01); *C02F 2305/04* (2013.01); *C02F 2305/08* (2013.01)

(58) Field of Classification Search
CPC ............ B01J 20/28009; B01J 20/28021; B01J 20/3204; B01J 20/3225; B01J 20/3236; B01J 20/3248; B01J 20/3287; B01J 20/3293; C02F 1/281; C02F 1/285; C02F 1/288; C02F 2101/006; C02F 2101/206; C02F 2305/04; C02F 2305/08; C04B 2235/3274; C04B 35/2658; C01P 2004/84

See application file for complete search history.

(56) References Cited

FOREIGN PATENT DOCUMENTS

| | | |
|---|---|---|
| RU | 2419454 C1 | 5/2011 |
| WO | 2010062127 A2 | 6/2010 |
| WO | 2015044964 A1 | 4/2015 |

OTHER PUBLICATIONS

Wu et al., "Recent progress on magnetic iron oxide nanoparticles: synthesis, surface functional strategies and biomedical applications", 4,28,2015,Science and Technology of Advanced Materials, 16, 43 pages. (Year: 2015).*

Schladt et al., "Synthesis and bio-functionalization of magnetic nanoparticles for medical diagnosis and treatment", Jun. 28, 2011, Datlton Transactions 2011, 40, pp. 6315-6343. (Year: 2011).*

Lee et al., "Surface functionalized manganese ferrite nanocrystals for enhanced uranium sorption and separation in water", Sep. 10, 2015, Journal of Materials Chemistry A, 3, pp. 21930-21939. (Year: 2015).*

An et al., "Synthesis of Uniformly Sized Manganese Oxide Nanocrystals with Various Sizes and Shapes and Characterization of Their T1 Magnetic Resonance Relaxivity", Eur. J. Inorg. Chem., 2012, vol. 12, pp. 2148-2155.

Park et al., "Ultra-large-scale syntheses of monodisperse nanocrystals", Nature Materials, 2004, vol. 3, No. 12, pp. 891-895.

Prakash et al., "Bilayers as Phase Transfer Agents for Nanocrystals Prepared in Nonpolar Solvents", ACS Nano, 2009, vol. 3, No. 8, pp. 2139-2146.

Sun et al., "Monodisperse MFe2O4 (M=Fe, Co, Mn) Nanoparticles", J. Am. Chem. Soc., 2004, vol. 126, No. 1, pp. 273-279.

Yang et al., "Simple small molecule carbon source strategy for synthesis of functional hydrothermal carbon: preparation of highly efficient uranium selective solid phase extractant", J. Mater. Chem. A, 2014, vol. 2, No. 5, pp. 1550-1559.

Yu et al., "Synthesis of monodisperse iron oxide nanocrystals by thermal decomposition of iron carboxylate salts", Chem. Commun., 2004, vol. 20, pp. 2306-2307.

Zeng et al., "Shape Controlled Synthesis and Shape-Induced Texture of MnFe2O4 nanoparticles", J. Am. Chem. Soc., 2004, vol. 126, No. 37, pp. 11458-11459.

International Search Report and Written Opinion for International Application No. PCT/US2016/046591, dated Jun. 1, 2017, 9 pages.

* cited by examiner

ENGINEERED NANOPARTICLES FOR AQUEOUS APPLICATIONS

CROSS-REFERENCE TO RELATED APPLICATIONS

This application claims priority benefit of U.S. Provisional Patent Application Ser. No. 62/205,243, filed on Aug. 14, 2015, which is hereby incorporated by reference in its entirety.

STATEMENT REGARDING FEDERALLY SPONSORED RESEARCH & DEVELOPMENT

This disclosure was made with government support under Grant No. W912HZ-13-2-0009-P00001 awarded by the U.S. Army Corps of Engineers. The government has certain rights in this disclosure.

BACKGROUND OF THE DISCLOSURE

The present disclosure is generally related to engineering nanoparticles for aqueous applications. New synthetic pathways to prepare manganese oxide, manganese iron oxide (manganese ferrite), and manganese ferrite coated iron oxide nanocrystals with varied size and composition are described herein. New designs of (surface) stabilizers on the nanocrystal structures are also disclosed, particularly with respect to the use of phosphate functional group terminated surface coating structures on the nanocrystals. Core/shell type nanomaterials such as, manganese oxide (hausmannite ($Mn_3O_4$) coated manganosite (MnO)), and manganese ferrite coated iron oxide nanocrystals are used herein for uranyl sorption and separation in water. The sorption capacity of uranium disclosed herein is the highest reported to date, which is a vast improvement of uranium sorption capacity over previously-used nanocrystal types. This disclosure also presents effective uranium sorption of the newly-synthesized manganese ferrite nanocrystals in high cationic salts, such as ground water conditions containing sodium and calcium.

Also disclosed herein is an advanced technique for uranium sorption and separation in water using engineered nanocrystals (designed by new synthetic approaches based on (in)organic chemistry and materials science) such as, manganese oxide (hausmannite ($Mn_3O_4$) coated manganosite (MnO)), manganese iron oxide (manganese ferrite, $MnFe_2O_4$), and core@shell type superparamagnetic nanomaterials (manganese ferrite coated iron oxide ($Fe_3O_4$@$MnFe_2O_4$)). Libraries are disclosed which provide information related to nanocrystal design. Design elements include a wide range of size (from about 6 nm to about 30 nm), composition ratios of manganese to iron (from about 0.01 to about 5.0), structure (core/shell type), and surface coating material. Furthermore, the core/shell type nanomaterials described herein are colloidally stable sorbents for uranyl sorption and separation in varied water chemistries (e.g., ionic strength and pH).

The manganese ferrite (and manganese ferrite coated iron oxide) nanocrystals described herein exhibit high uranyl sorption capacities with excellent colloidal stability in environmentally relevant water chemistries. Phosphate functionality (on the surface of the particle) results in uranium sorption capacities over 1.6 grams of uranium per gram of nanocrystals. Furthermore, uranium sorption using phosphate group functionalized manganese ferrite nanocrystals in high cationic salt condition (mimicking ground water containing high concentrations of sodium (over 900 ppm) and calcium (over 50 ppm)) demonstrated that the nanocrystals maintained their colloidal stability (without agglomeration) with high uranyl sorption capacity (over 7.1 mg of uranium per gram of the nanocrystal). The uranyl sorption capacities of manganese ferrite nanocrystals coated with oleylphosphate at similarly high cationic salt conditions exhibited uranyl sorption capacity at over 0.7 grams of uranium per gram of nanocrystals without loss of colloidal stability.

SUMMARY OF THE DISCLOSURE

One aspect of the present disclosure describes a method for synthesizing coated iron oxide (IO) nanocrystals. The method comprises providing a solution of IO nanocrystals, coating the IO nanocrystals with manganese ferrite, and stabilizing the manganese ferrite coated IO nanocrystals with a bilayer surface. In some embodiments, coating the IO nanocrystals comprises decomposing a manganese oleate onto the IO nanocrystals such that an oleic acid layer is formed on the IO nanocrystals. In some embodiments, the stabilizing comprises linking an oleylphosphate outer layer to the oleic acid layer. In some embodiments, linking the oleylphosphate outer layer to the oleic acid layer is performed under probe sonication. In some embodiments, a molar composition ratio of manganese to iron is in the range of from 0.03 to 2.00. In some embodiments, the at least one surfactant is selected from the group consisting of oleic acid, ricinoleic acid, elaidic acid, stearic acid, palmitic acid, myristic acid, lauric acid, decanoic acid, SDP, SDS, SDBS, $C_{12}$TAB, EMPIGEN, dodecyl phosphonate, hexadecyl phosphonate, and dihexadecyl phosphate.

Another aspect of the present disclosure describes an iron oxide (IO) nanocrystal structure. The IO nanocrystal structure comprises an iron oxide core, a manganese ferrite shell layer surrounding the core, and a bilayer coating surrounding the shell layer. The bilayer coating includes an inner oleic acid layer surrounding the shell layer and an outer layer surrounding the inner oleic acid layer, the outer layer comprising at least one surfactant. In some embodiments, the at least one surfactant is selected from the group consisting of oleic acid, ricinoleic acid, elaidic acid, stearic acid, palmitic acid, myristic acid, lauric acid, decanoic acid, SDP, SDS, SDBS, $C_{12}$TAB, EMPIGEN, dodecyl phosphonate, hexadecyl phosphonate, and dihexadecyl phosphate. In some embodiments the outer layer of the IO nanocrystal structure is an outer oleylphosphate layer. In some embodiments the IO nanocrystal structure is colloidally stable.

Yet another aspect of the present disclosure describes a method of synthesizing coated iron oxide (IO) nanocrystals for adsorption of a substance. The method comprises providing a solution of IO nanocrystals, coating the IO nanocrystals with manganese ferrite, stabilizing the manganese ferrite coated IO nanocrystals with a bilayer surface, and utilizing the IO nanocrystals to adsorb the substance. In some embodiments the substance is selected from the group consisting of a heavy metal, a lanthanide and an actinide. In some embodiments the actinide is uranium. In some embodiments, the lanthanide is selected from the group consisting of lanthanum and cerium. In some embodiments the heavy metal is selected from the group consisting of arsenic and chromium. In some embodiments, the IO nanocrystals have a uranium adsorption capacity of at least 50% weight uranium/weight manganese. In some embodiments, the adsorption occurs at a surface of the bilayer coating. In some embodiments, the adsorption occurs underneath the bilayer coating. In some embodiments, the at least one surfactant is selected from the group consisting of oleic acid, ricinoleic acid, elaidic acid, stearic acid, palmitic acid, myristic acid, lauric acid, decanoic acid, SDP, SDS, SDBS, $C_{12}$TAB, EMPIGEN, dodecyl phosphonate, hexadecyl phosphonate, and dihexadecyl phosphate.

In yet another aspect of the present disclosure, a method is described for synthesizing superparamagnetic iron oxide (IO) nanoparticles. The method comprises providing a solution of IO nanoparticles, forming a bilayer coating on the IO nanoparticles, wherein the bilayer coating comprises an organic ligand, and optimizing the bilayer coating based on concentration of the organic ligand. In some embodiments the organic ligand comprises at least one of an anionic surfactant, a cationic surfactant, and a zwitterionic surfactant. In some embodiments the synthesized superparamagnetic iron oxide (IO) nanoparticles form a monodisperse suspension.

DETAILED DESCRIPTION OF THE DISCLOSURE

Figure 1:
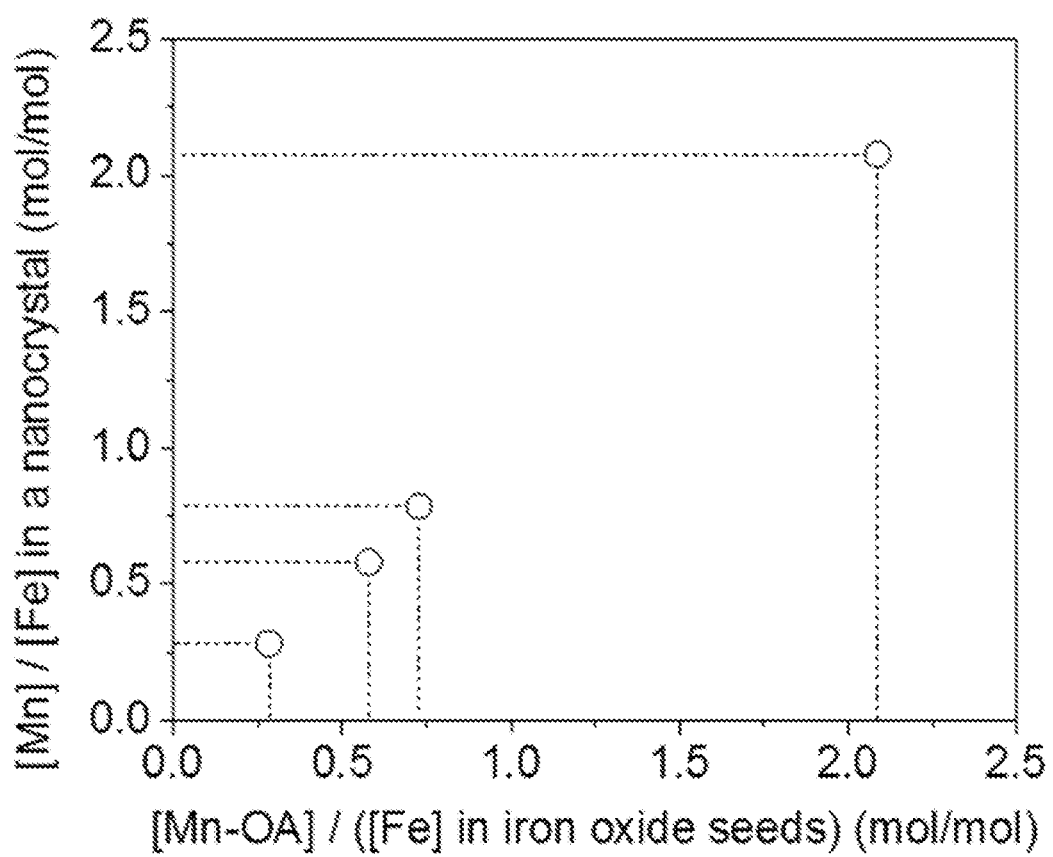
FIG. 1 depicts an exemplary embodiment of composition control of IO@MF nanocrystals in accordance with the present disclosure.

In some embodiments of the present disclosure, a method for synthesizing iron oxide (IO) nanocrystals is disclosed. The method comprises providing a solution of IO nanocrystals; coating the IO nanocrystals with manganese ferrite; and stabilizing the manganese ferrite coated IO nanocrystals with a bilayer surface.

In some embodiments, coating the IO nanocrystals comprises decomposing a manganese oleate onto the IO nanocrystals such that an oleic acid layer is formed on the IO nanocrystals. In some embodiments, the stabilizing comprises linking an oleylphosphate outer layer to the oleic acid layer. In some embodiments, linking the oleylphosphate outer layer to the oleic acid layer is performed under probe sonication.

The molar composition ratio of manganese to iron is in the range of from about 0.01 to about 5.00, from about 0.02 to about 3.00, or from about 0.03 to about 2.00. In some embodiments, the at least one surfactant is selected from the group consisting of oleic acid, ricinoleic acid, elaidic acid, stearic acid, palmitic acid, myristic acid, lauric acid, decanoic acid, SDP, SDS, SDBS, $C_{12}TAB$, EMPIGEN, dodecyl phosphonate, hexadecyl phosphonate, and dihexadecyl phosphate.

In some embodiments of the present disclosure, an iron oxide (IO) nanocrystal structure is disclosed. The structure comprises an iron oxide core; a manganese ferrite shell layer surrounding the core; and a bilayer coating surrounding the shell layer, the bilayer coating including an inner oleic acid layer surrounding the shell layer and an outer layer surrounding the inner oleic acid layer, the outer layer comprising at least one surfactant.

In some embodiments, the outer layer is an outer oleylphosphate layer. In some embodiments, the at least one surfactant is selected from the group consisting of oleic acid, ricinoleic acid, elaidic acid, stearic acid, palmitic acid, myristic acid, lauric acid, decanoic acid, SDP, SDS, SDBS, $C_{12}TAB$, EMPIGEN, dodecyl phosphonate, hexadecyl phosphonate, and dihexadecyl phosphate. In some embodiments, the IO nanocrystal structure is colloidally stable.

In some embodiments of the present disclosure, a method of synthesizing IO nanocrystals for adsorption of a substance is disclosed. The method comprises providing a solution of IO nanocrystals; coating the IO nanocrystals with manganese ferrite; stabilizing the manganese ferrite coated IO nanocrystals with a bilayer surface; and, utilizing the IO nanocrystals to adsorb the substance. In some embodiments, the substance is selected from the group consisting of a heavy metal, a lanthanide and an actinide. In some embodiments, the actinide is uranium. In some embodiments, the lanthanide is selected from the group consisting of lanthanum and cerium. In some embodiments, the heavy metal is selected from the group consisting of arsenic and chromium. In some embodiments, the IO nanocrystals have a uranium adsorption capacity of at least about 40% weight, at least about 50% weight, at least about 60% weight, at least about 70% weight, at least about 80% weight, at least about 90% weight, or at least about 95% weight uranium/weight manganese.

In some embodiments, the adsorption occurs at a surface of the bilayer coating. In some embodiments, the adsorption occurs underneath the bilayer coating. In some embodiments, the at least one surfactant is selected from the group consisting of oleic acid, ricinoleic acid, elaidic acid, stearic acid, palmitic acid, myristic acid, lauric acid, decanoic acid, SDP, SDS, SDBS, $C_{12}TAB$, EMPIGEN, dodecyl phosphonate, hexadecyl phosphonate, and dihexadecyl phosphate.

In some embodiments, a method for synthesizing superparamagnetic iron oxide (IO) nanoparticles is disclosed. The method comprises providing a solution of IO nanoparticles;

forming a bilayer coating on the IO nanoparticles, wherein the bilayer coating comprises an organic ligand; and optimizing the bilayer coating based on concentration of the organic ligand. In some embodiments, the organic ligand comprises an anionic surfactant. In some embodiments, the organic ligand comprises a cationic surfactant. In some embodiments, the organic ligand comprises a zwitterionic surfactant. In some embodiments, the synthesized superparamagnetic iron oxide (IO) nanoparticles form a monodisperse suspension.

Functionalized Manganese Oxide, Manganese Ferrite and Ferrite@ $Fe_3O_4$ Core@Shell Nanocrystals for Ultra-Enhanced Uranium Sorption and Separation in Environmental Relevant Aqueous Matrixes Manganese ferrite coated iron oxide nanocrystals stabilized by phosphate group functionalized bilayer surface coatings exhibit excellent uranium sorption capacity with colloidal stability under high ionic salt conditions. These engineered core@shell nanomaterials may be used as nanosorbents for uranium separation with improved magnetic properties. As used herein, the symbol "@" indicates a core material surrounded at least in part by a shell material. For example, IO@MF indicates an iron oxide (IO) core material surrounded at least in part by a manganese ferrite (MF) shell material.

Iron oxide nanocrystals coated with manganese ferrite (IO@MF) with varying composition ratios of manganese (Mn) to iron (Fe) may be synthesized by decomposing manganese oleate (Mn-OA) on the surface of iron oxide (IO) nanocrystals. These nanocrystals may then be phase transferred to water via a bilayer surface coating method by linking oleylphosphate (the outer layer) to oleic acid (the inner layer) under probe sonication. Environmental sorption properties of the phase transferred IO@MF nanocrystals may be evaluated by uranium (U) sorption and U sorption capacity analyses. These sorption properties of the phase transferred IO@MF nanocrystals are herein compared with other type of superparamagnetic nanocrystals (e.g., IO and MF). The IO@MF nanocrystal showed the best performance in U sorption when the concentration ratio of Mn to Fe in IO@MF nanocrystal was 0.28. However, manganese rich ferrite coating on iron oxide (Mn rich IO@MF: [Mn]/[Fe] was over 2.07) showed lower sorption capacity than pristine iron oxide nanocrystal.

Figure 2:
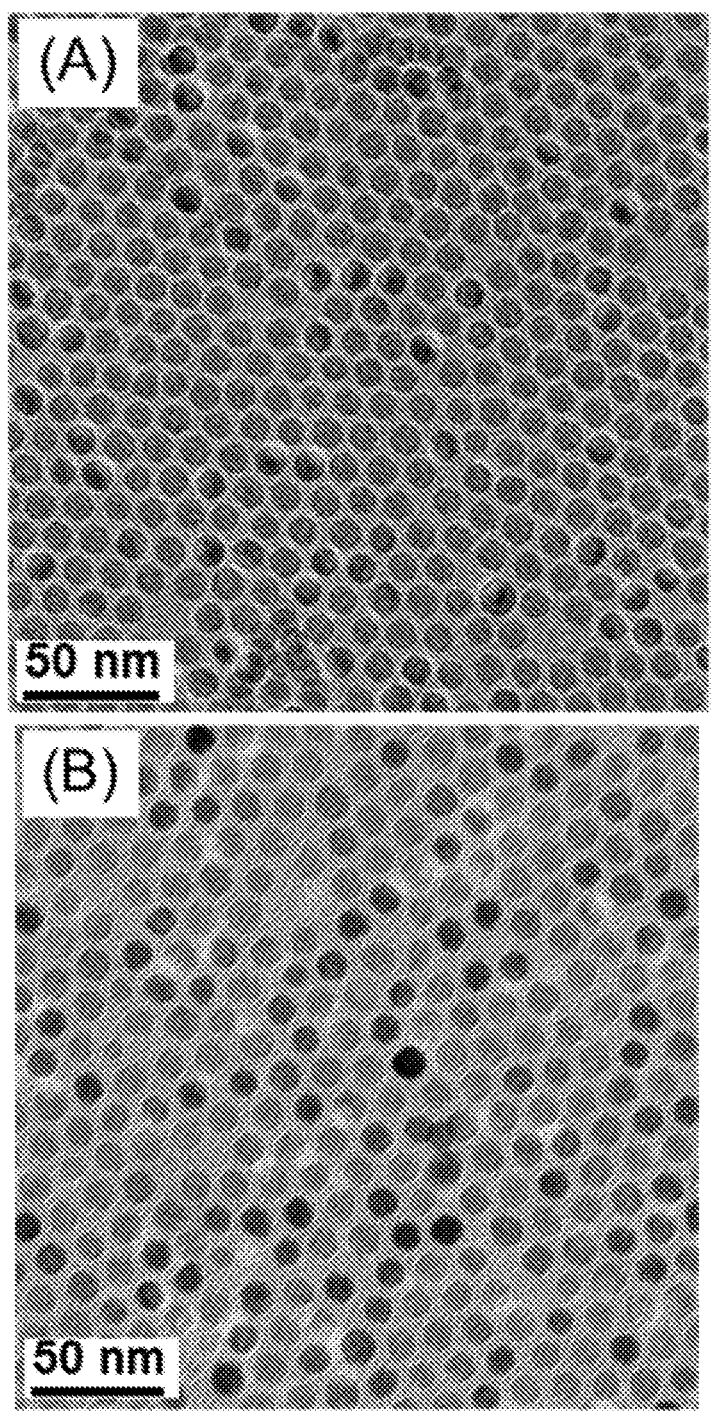
FIG. 2 depicts an exemplary embodiment of TEM images of iron oxide (IO) nanocrystals as seed materials (A) and manganese ferrite coated iron oxide (IO@MF) nanocrystals (B) in accordance with the present disclosure.

Monodisperse iron rich manganese ferrite coated iron oxide nanocrystals (Fe rich IO@MF) may be synthesized by decomposition of Mn-OA (0.11 mmol) as a Mn precursor in the presence of preformed IO (85 mg of seeds) nanocrystals in 1-octadecene at 320° C. for 1 h. The composition control of Mn and Fe in the core@shell type nanocrystal is achieved by varying molar ratio of the starting materials of Fe and Mn in the reactions (FIG. 1). With respect to composition control of IO@MF nanocrystals, the molar concentration of Mn in IO@MF nanocrystal increases with elevated ratio of Mn precursor (Mn-oleate, Mn-Ol) to Fe seed materials (10 nm iron oxide nanocrystals, IO). The average diameters of the resulting core@shell type nanocrystals slightly increased from 10.2 nm to 11.0 nm as a Mn-OA precursor decomposed on the surface of the seed material (IO nanocrystal, d=10.2±0.9 nm), as shown in TEM images of FIG. 2. Iron oxide (IO) nanocrystals as seed materials are shown in FIG. 2(A) and manganese ferrite coated iron oxide (IO@MF) nanocrystals are shown in FIG. 2(B). The average diameters of IO and IO@MF nanocrystals are 10.2±0.9 nm and 11.0±1.0 nm, respectively.

Figure 3:
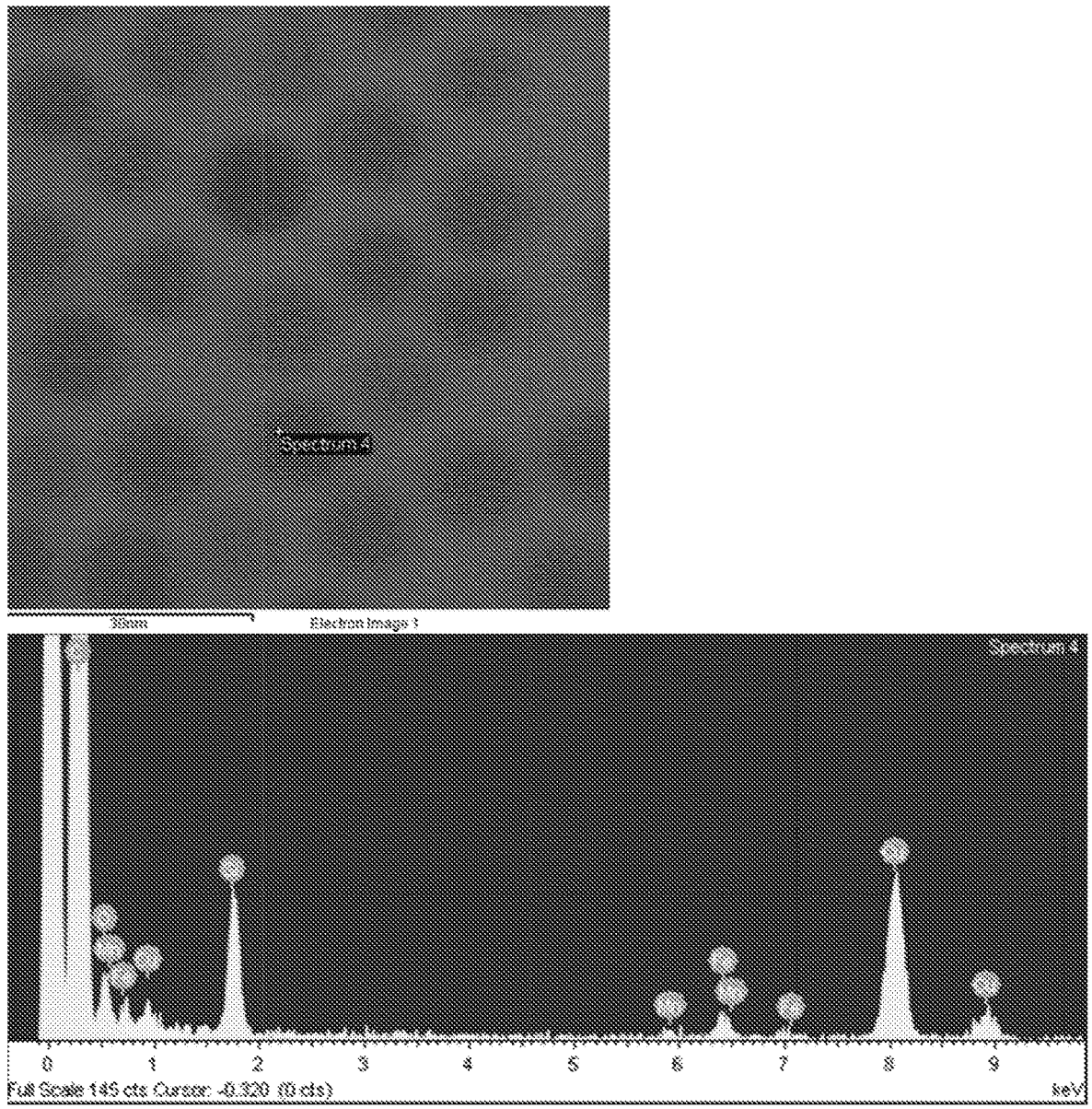
FIG. 3 depicts an exemplary embodiment of EDS information of a center of an IO@MF nanoparticle in accordance with the present disclosure.
Figure 4:
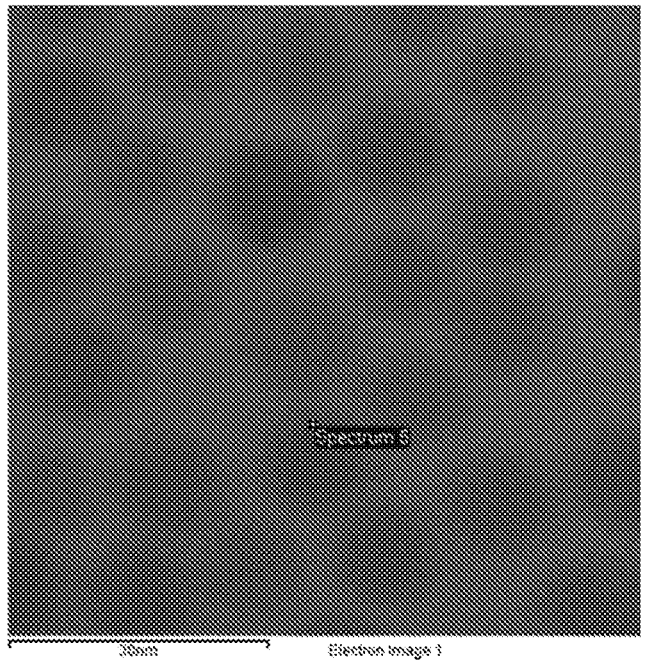
FIG. 4 depicts an exemplary embodiment of EDS information of a side of an IO@MF nanoparticle in accordance with the present disclosure.
Figure 4:
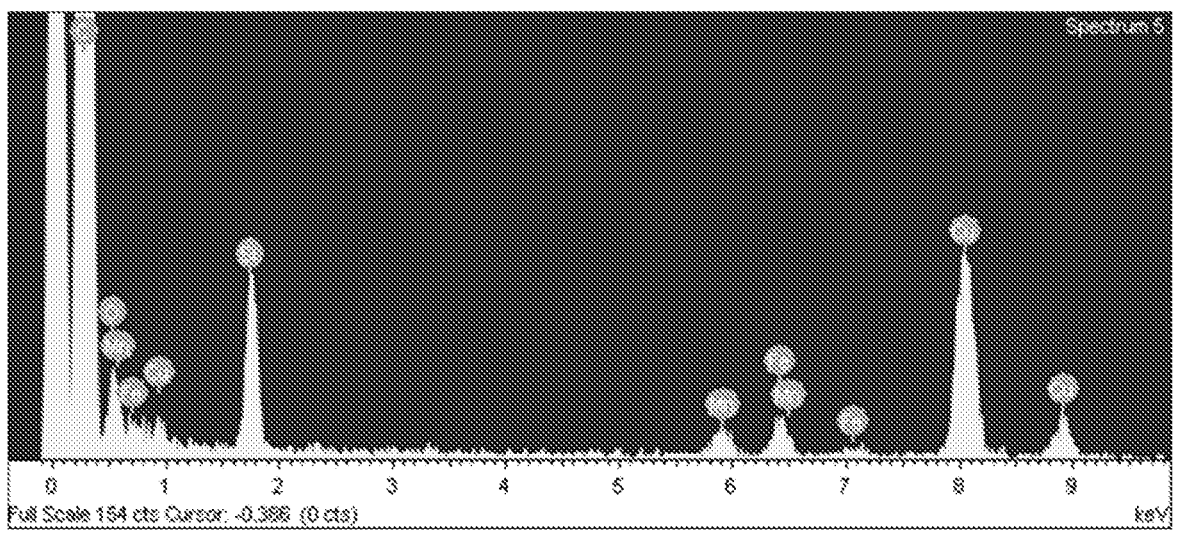
Figure 5:
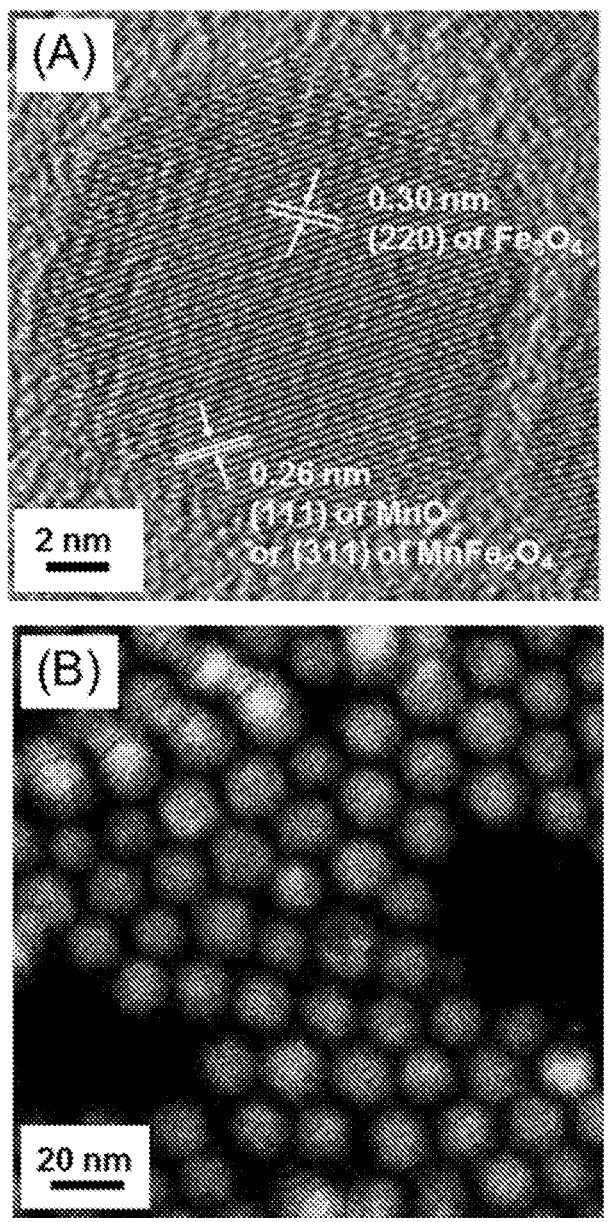
FIG. 5 depicts an exemplary embodiment of TEM images of IO@MF nanocrystals in accordance with the present disclosure.
Figure 6:
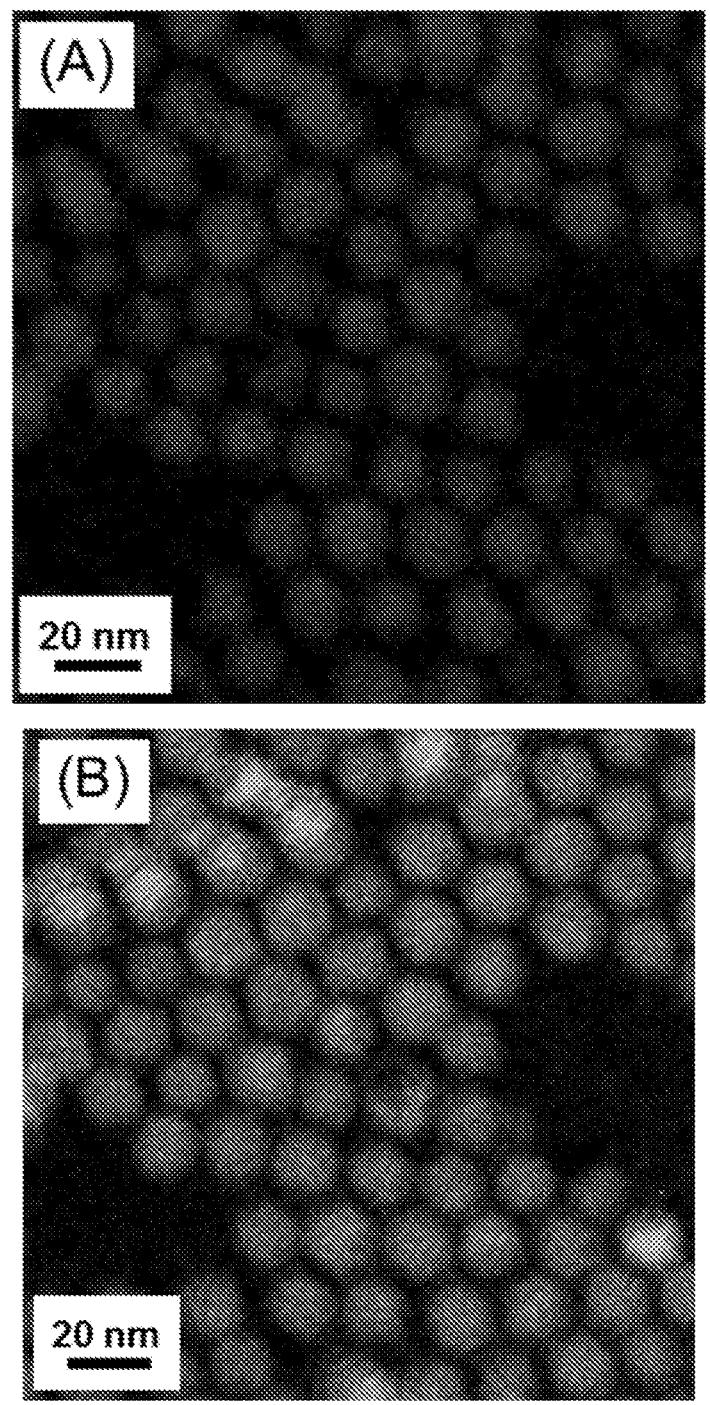
FIG. 6 depicts an exemplary embodiment of EFTEM micrographs of iron (A) and manganese (B) L3 edges in sample nanoparticles in accordance with the present disclosure.
Figure 7:
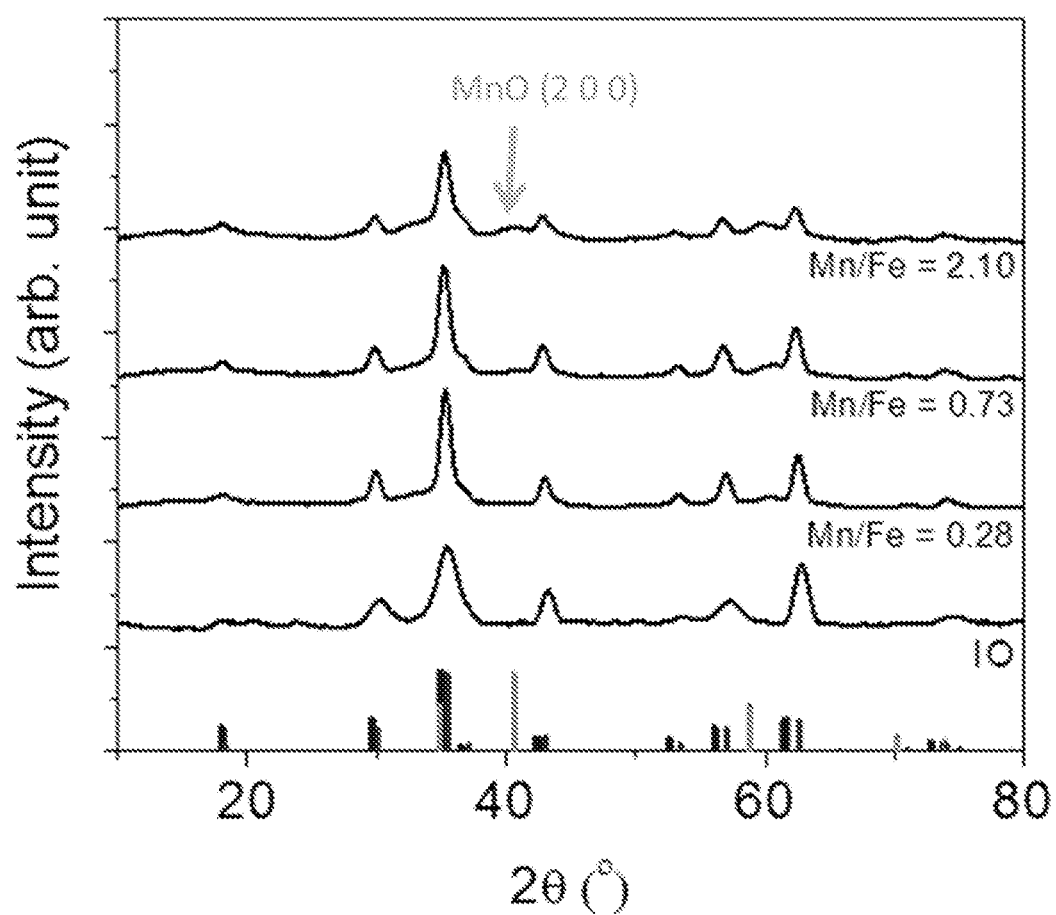
FIG. 7 depicts an exemplary embodiment of XRD of manganese ferrite coated iron oxide (IO@MF) nanocrystals in accordance with the present disclosure.

The composition characterization on both the surface and the core of the individual IO@MF particle is shown in FIG. 3 and FIG. 4. FIG. 3 shows EDS information of the center of an IO@MF nanoparticle. The atomic ratio of manganese to iron is 14.3 to 85.7. FIG. 4 shows EDS information of the side of an IO@MF nanoparticle. The atomic ratio of manganese to iron is 22.2 to 77.8. Higher Mn concentration is associated with the shell portion rather than the core of the particle based on EDS analysis; Fe rich manganese ferrite like composition is associated with the shell with the mole ratio of Mn to Fe of 0.29, though the core of the particle is full of Fe with a few Mn (Mn/Fe=0.17 mol/mol). In addition, no individual (free) manganese oxide nanocrystals are formed in the reaction as shown in GIF (Gatan Image Filter) images of the synthesized nanocrystals. The synthesized nanocrystals were made of both Mn and Fe (FIG. 5 and FIG. 6). FIG. 5(A) shows an HR TEM image of the IO@MF nanocrystal. The lattice fringes of 0.30 nm (center) and 0.26 nm (side) correspond to (220) of $Fe_3O_4$ and (311) of $MnFe_2O_4$ (or (111) of MnO), respectively. FIG. 5(B) is a Gatan Image filter (GIF) image of the IO@MF nanocrystals as an overlay map showing the distribution of iron (red in original color image) and manganese (green in original color image) in the particles. FIG. 6 shows an EFTEM micrograph for iron (A) and manganese (B) L3 edges in the particles. Furthermore, the composition ratio of Mn to Fe of the synthesized nanocrystal sample was 0.28 (mol/mol) which is a similar ratio of Mn/Fe of the starting chemicals (the ratio of Mn from Mn-Ol to Fe from IO in the reaction was 0.24 (mol/mol)). Mn-Ol decomposition in the presence of IO nanocrystals barely changes the crystal structure of IO nanocrystals. FIG. 7 is an XRD of manganese ferrite coated iron oxide (IO@MF) nanocrystals depending on the composition ratio of manganese to iron (from 0 to 2.10). The vertical lines at the bottom of the chart indicate the reference peaks of iron oxide (red in original color image, JCPDS #19-0629), manganese ferrite (blue in original color image, JCPDS #38-0430), and manganese oxide (orange in original color image, JCPDS #07-0230). As shown in FIG. 7, XRD diffraction patterns of IO@MF nanocrystals with varied composition of Mn/Fe in an IO@MF nanocrystal from 0.28 to 0.73 are well matched to the diffraction patterns of magnetite ($Fe_3O_4$; red vertical lines in original color image; JCPDS cards #19-0629); however, MnO (200) phase was found from IO@MF with high ratio of Mn/Fe concentration over 2.1. High ratio of Mn precursor to Fe seed material over 2.08 mol/mol led to the formation of manganese oxide layer on the surface of IO seed materials.

Figure 8:
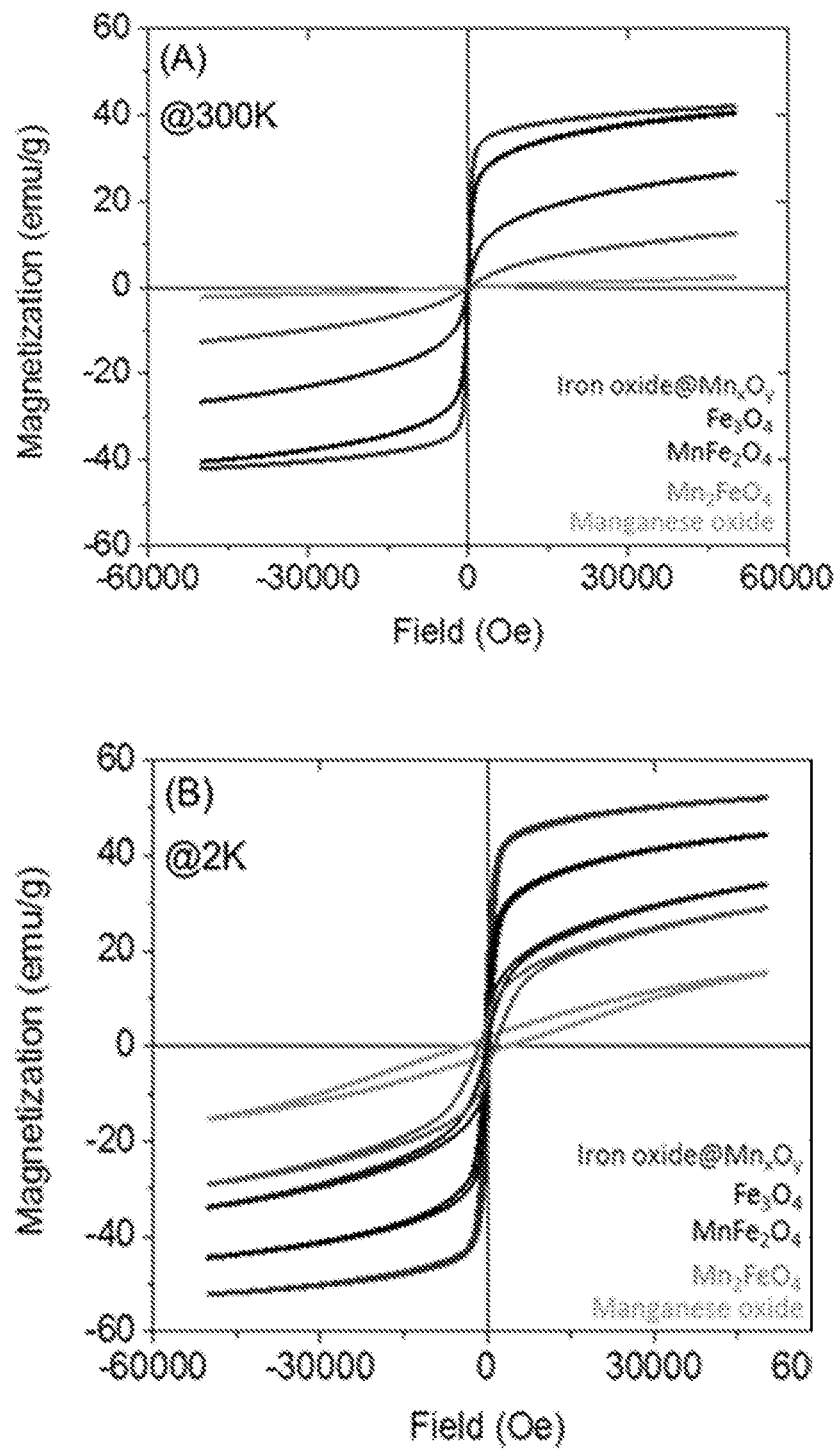
FIG. 8 depicts an exemplary embodiment of magnetic properties of sample nanoparticles synthesized under organic route in accordance with the present disclosure.

The magnetic properties of engineered IO@MF nanocrystals were characterized by SQUID analysis (FIG. 8). FIG. 8 shows magnetic properties of the nanoparticles synthesized under organic route. (A) Hysteresis curves of IO@MF (red in original color image), $Fe_3O_4$ (black in original color image), $MnFe_2O_4$ (blue in original color image), $Mn_2FeO_4$ (green in original color image), manganese oxide (orange in original color image) measured at 300 K. (B) Hysteresis curves of IO@MF (red in original color image), $Fe_3O_4$ (black in original color image), $MnFe_2O_4$ (blue in original color image), $Mn_2FeO_4$ (green in original color image), manganese oxide (orange in original color image) measured at 2K. IO@MF, IO ($Fe_3O_4$), $MnFe_2O_4$, and $Mn_2FeO_4$ nanocrystals synthesized under organic reactions at high temperature of 320° C. showed superparamagnetic behavior with their hysteresis loops exhibiting nearly zero of remanence and coercivity at 300K. For example, 11 nm manganese oxide nanocrystals, which are known as core@shell type materials of MnO@$Mn_3O_4$ (antiferromagnetic core and ferrimagnetic shell), revealed a displacement of hysteresis loop along the magnetic field axis, exchange bias (HE), with −274.6 Oe at 2K. As another example, similar phenomenon was found from IO@MF nanocrystal samples, having inverted soft/hard ferrimagnetic core@shell structures, exhibiting a bit high exchange bias with −20.65 Oe of HE at 2K.

Figure 9:
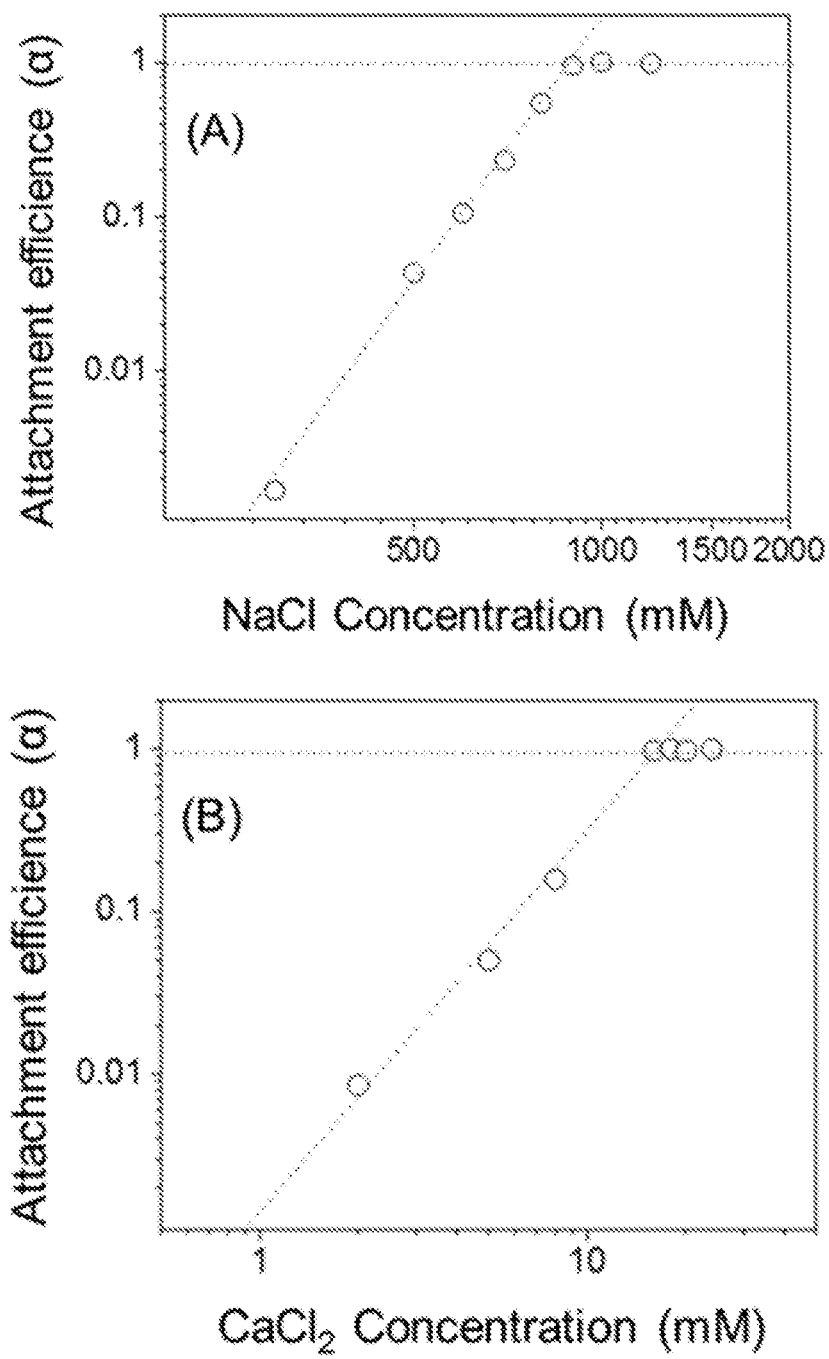
FIG. 9 depicts an exemplary embodiment of attachment efficiencies of oleyl phosphate (OP) coated IO@MF nanocrystals as a function of NaCl (A) and $CaCl_2$ (B) concentrations at pH 7.0 in accordance with the present disclosure.

To evaluate U sorption capacity of IO@MF nanocrystals, the as-synthesized core@shell materials in organic solvents may be phase transferred to water. Strong organic solvents and mixtures thereof may be preferable (e.g., hexane, toluene, and formaldehyde). Using the bilayer technique made the surface of the IO@MF nanocrystals hydrophilic. Oleylphosphate (OP) was used as a phase transfer agent (also as a surface stabilizer), which links to the first layer (oleic acid) on the as-synthesized IO@MF nanocrystals by hydrophobic-hydrophobic interaction. The hydrodynamic diameter (DH) and surface charge for the phase transferred IO@MF@OP nanocrystals were 20.9±3.0 nm with −50.4±1.4 mV. In addition, IO@MF@OP nanocrystals were colloidally stable in water at high ionic salt conditions. Critical coagulation concentration (CCC) values of sodium (Na) and calcium (Ca) for the particles were 892.5 mM of Na and 15.9 mM of Ca for IO@MF@OP (FIG. 9). FIG. 9 shows attachment efficiencies of oleyl phosphate (OP) coated IO@MF nanocrystals as a function of NaCl (A) and $CaCl_2$ (B) concentrations at pH 7.0. The nanocrystal concentration employed was $3.0 \times 10^{12}$ nanocrystals/L. The critical coagulation concentrations (CCC) are 892.5 mM of NaCl and 15.9 mM of $CaCl_2$ for IO@MF@OP nanocrystals.

Figure 10:
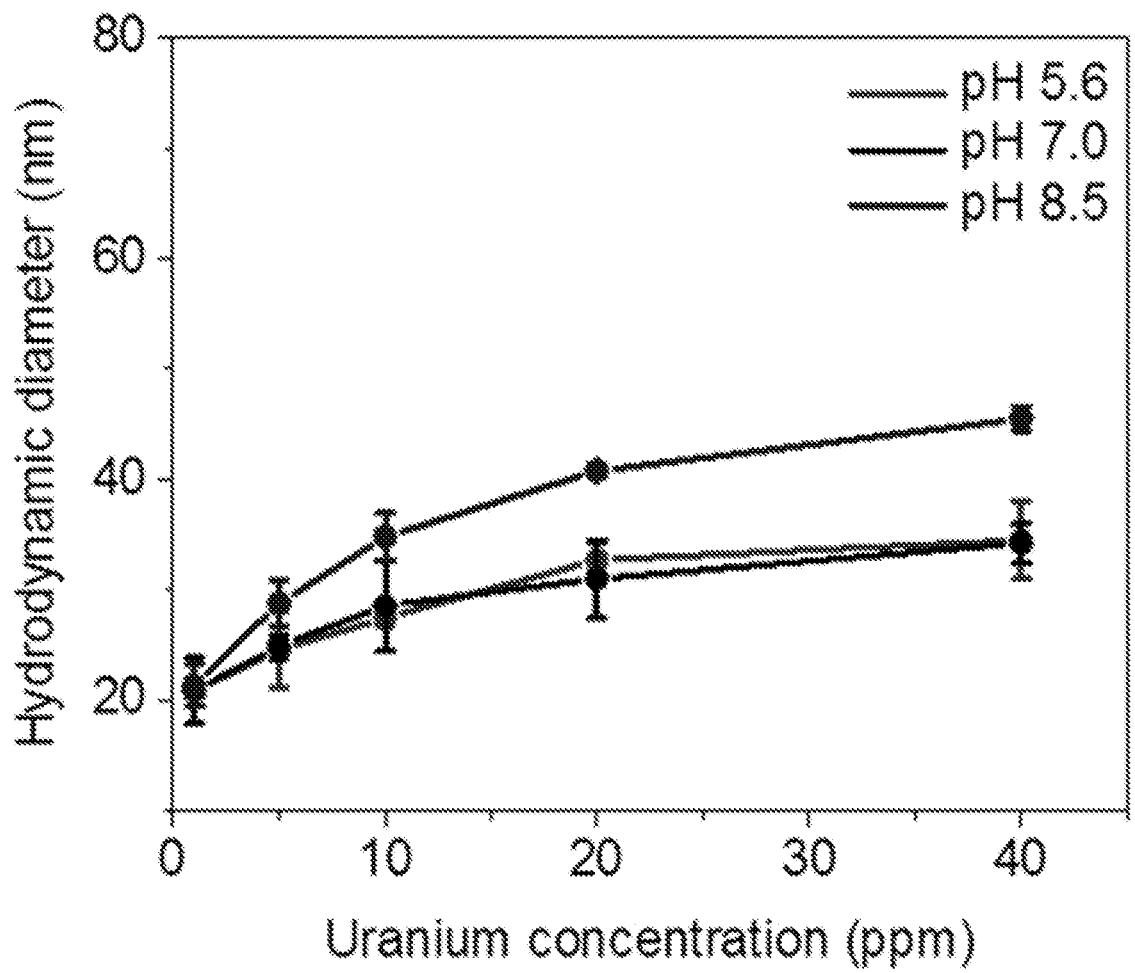
FIG. 10 depicts an exemplary embodiment of hydrodynamic diameters of IO@MF@OP nanocrystals at elevated uranium concentrations in water in accordance with the present disclosure.
Figure 11:
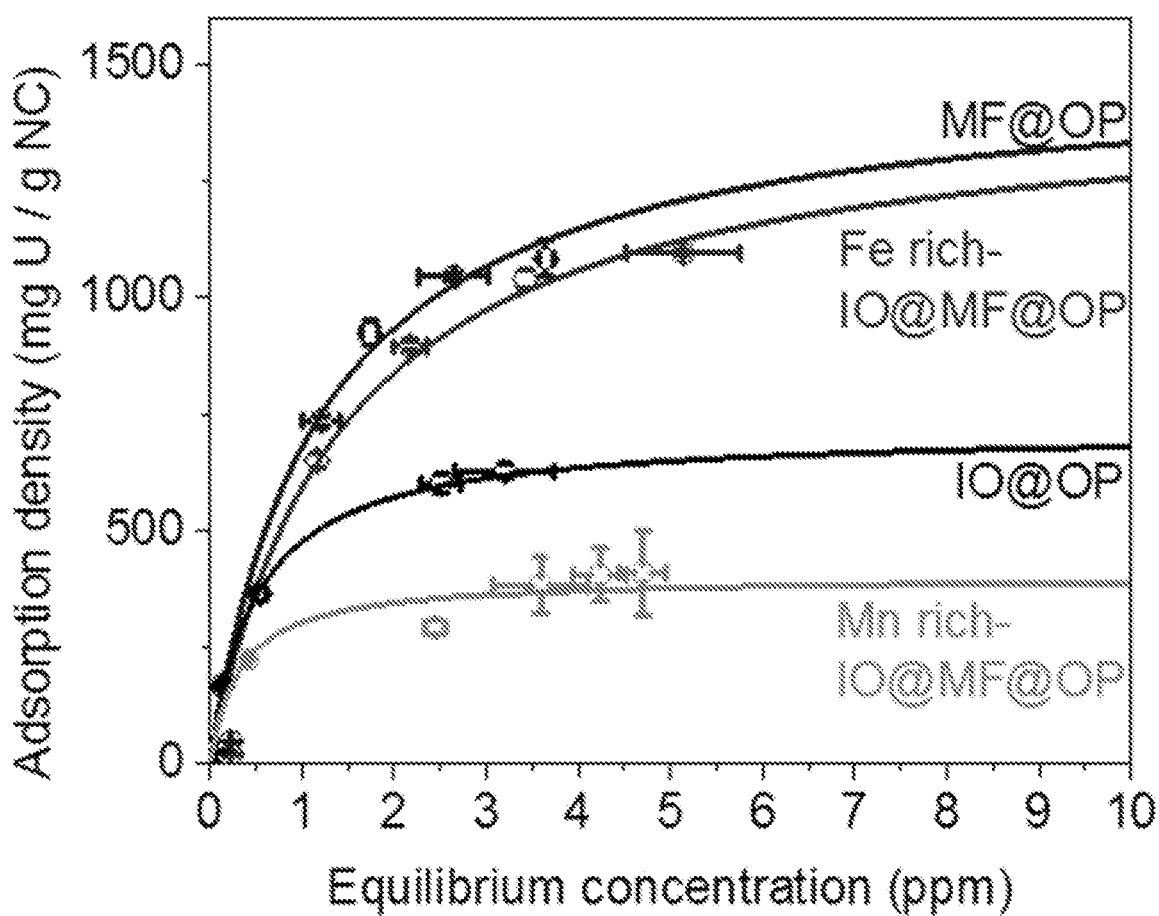
FIG. 11 depicts an exemplary embodiment of uranium sorption isotherms of sample nanocrystals in accordance with the present disclosure.

The colloidally stable phase transferred IO@MF@OP nanocrystals can be applied as nano-sorbents, targeting uranyl (VI) cations ($UO_2^{2+}$ and its hydroxo complexes such as, $(UO_2)_m(OH)_n^{2m-n}$ formed at elevated pH) at varied concentrations in water. IO@MF@OP nanocrystals showed colloidal stability without forming precipitates even at high U concentration (to 40 ppm of U). IO@MF@OP nanocrystals maintained their DH though the nanocrystals were treated with high U concentration over 20 ppm (FIG. 10). FIG. 10 shows the hydrodynamic diameters of IO@MF@OP nanocrystals at elevated uranium concentrations in water (from 0 to 40 ppm of uranium) at pH 5.6, 7.0, and 8.5. DH for IO@MF@OP increased from 20 to 34 nm at pH 5.6 and pH 7.0 as U concentration increased from 0 to 40 ppm. With an outstanding colloidal stability, IO@MF@OP nanocrystals exhibited exceptional U sorption capacities. FIG. 11 shows nanocrystal composition dependent U sorption capacity at pH 7.0 for 24 h, where measured data of sorbed U on the surface of the nanocrystal samples was fitted by the Langmuir isotherm equation). The different types of OP-coated nanocrystal samples shown in FIG. 11 include MF@OP, iron rich-IO@MF, IO@OP, and Mn rich-IO@MF@OP. Table 1, below, gives maximum uranium sorption capacity (qmax, milligram of uranium per gram of nanocrystals), and the adsorption constant (k, liter per milligram) of oleylphosphate stabilized IO@MF, MF, and IO nanocrystals at pH 5.6, 7.0, and 8.5.

With respect to Table 1, maximum sorption capacity (qmax) for IO@MF was similar to the value for MF nanocrystals, which turned out to show the best U sorption performance when the nanocrystals were coated with the same organic surface coatings; qmax for IO@MF@OP ([Mn]/[Fe]=0.25) and the value for manganese ferrite (MF: $Mn0.6Fe2.4O4$, [Mn]/[Fe]=0.30) at pH 7.0 was 1437.6 and 1491.8 milligram of U per gram of nanocrystal (mg U/g NC), respectively.

As shown in FIG. 11, MF coatings on the surface of iron oxide nanocrystals improved U sorption capacities of IO nanocrystals with 2 times higher qmax than the value of pristine IO; however, too much Mn content on the surface of IO nanocrystal formed a thick Mn rich MF coating (with manganese oxide phase as shown in XRD data in FIG. 7) on IO, resulting in decrease of U sorption capacity (FIG. 11). FIG. 11 shows U sorption capacities of IO@MF@OP depending on Mn contents in the nanocrystal samples; as the ratio of Mn to Fe in a core@shell nanocrystal increased from 0.28 to 2.07, qmax of IO@MF@OP nanocrystals decreased from 1437.6 to 400 mg U/g NC, respectively. The decrease of qmax for Mn rich IO@MF nanocrystal ([Mn]/[Fe] in a nanocrystal was 2.07) may be due to the formation of thick manganese oxide (and/or manganese rich ferrite such as, $Mn_2FeO_4$) on iron oxide. Mn precursor decomposition with high concentration in the presence of IO seeds (when [Mn]/[Fe] of the starting materials was over 2.1) formed thick layered $Mn_2FeO_4$, MnO, or $Mn_3O_4$ on the surface of IO nanocrystal (FIG. 7). The thick Mn rich phase layers on IO nanocrystal may prevent high U sorption properties due to a lesser concentration of reduced Fe (Fe(II)), which is a key element for U reduction from U(VI) to U(IV), on the surface of IO seed materials.

Figure 12:
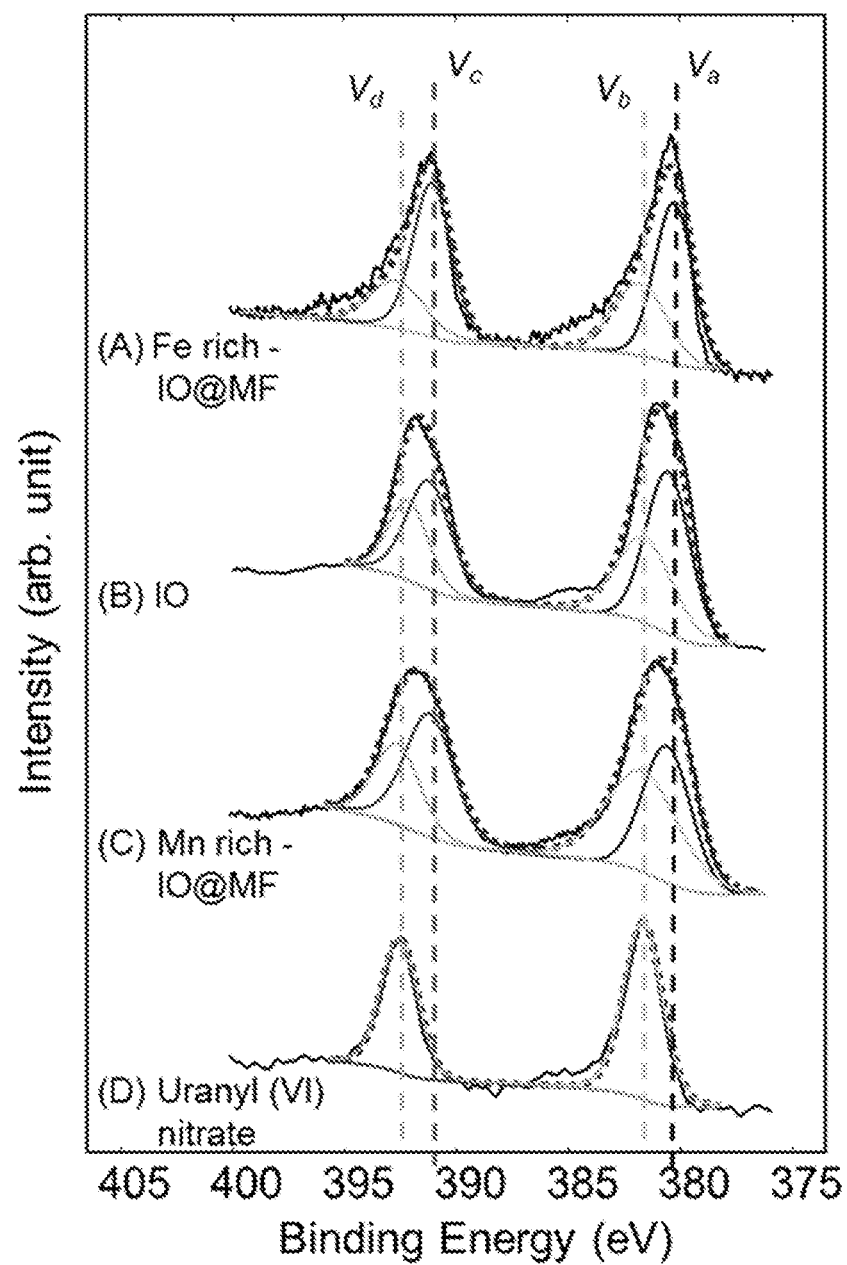
FIG. 12 depicts an exemplary embodiment of XPS spectra of uranium (U) 4f spectra for a nanocrystal sample after uranium sorption in accordance with the present disclosure.

With the best U sorption capacity of Fe rich IO@MF ([Mn]/[Fe] in a nanocrystal was 0.28), the highest U reduction was also found by partial redox reaction between U(VI) and Fe(II) (and Mn(II)). FIG. 12 shows U reduction evaluation depending on the nanocrystal composition, according to XPS spectra of the uranium 4f (U4f) spectra for the sample after uranium sorption. Black lines indicate raw data and red dash lines (in the original color image) indicate fitted curves based on curve fitting using $V_a$ (blue in original color image), $V_b$ (sky blue in original color image), $V_c$ (pink in original color image), and $V_d$ (green in original color image). The ratio of U(IV) to U(VI) was calculated by $(V_a+V_b)/(V_c+V_d)$ in the XPS spectra of U4f from the sample after the uranium sorption measurement and compared with uranyl (VI) nitrate. The highest U reduction (from U(VI) to U (IV)) was found from Fe rich-IO@MF with U(IV) of 65%; the U reduction percentage of IO and Mn rich IO@MF was 58% and 52%, respectively. Fe(II) concentration on the surface of the nanocrystal samples plays a significant role in U reduction. Interestingly, Fe(II) concentration of Fe rich IO@MF

TABLE 1

Maximum sorption capacities and adsorption constants for OP-stabilized nanocrystals.

| | IO@MF@OP | | | MF@OP | | | IO@OP | | |
|---|---|---|---|---|---|---|---|---|---|
| pH | 5.6 | 7.0 | 8.5 | 5.6 | 7.0 | 8.5 | 5.6 | 7.0 | 8.5 |
| $q_{max}$ (mg U/g NC) | 1449.3 | 1437.6 | 1000.0 | 1607.2 | 1491.8 | 1111.1 | 833.3 | 714.3 | 625.0 |
| k (L/mg) | 0.8 | 0.7 | 3.3 | 0.8 | 0.8 | 1.3 | 0.7 | 2.0 | 2.7 | decreased from 75% to 25% after U reduction; Mn(II) of Fe rich IO@MF was also changed from 28% to 14% after U reduction experiment.

Surface Engineering Superparamagnetic Nanoparticles for Aqueous Applications: Design and Characterization of Tailored Organic Bilayers Engineered superparamagnetic nanoparticles (NPs) have broad potential in biotechnologies, high contrast magnetic resonance imaging, and advanced environmental sensing and remediation technologies, among other advantages. For successful environmental, aqueous-based applications, particle stability (as highly monodisperse and single domain nanocrystals) and specific surface functionality are critical to control. In this disclosure, aqueous stabilization of 8 nm superparamagnetic iron oxide NPs is described and optimized using a series of surface engineered bilayers, exploring 13 ionic surfactants, which are systematically varied with regard to hydrophobic tail (size and properties) and polar head groups. As monodispersed aqueous suspensions, material libraries were evaluated through particle-particle aggregation kinetics (with varied ionic types and strengths) and long-term aqueous stabilities (up to one year). Optimal phase transfer approaches are presented, along with corresponding particle stability characterization data sets for each of the 13 ligands studied, which, when taken together, allow for flexible surface design strategies for a variety of superparamagnetic particle-based aqueous applications.

Superparamagnetic monodisperse iron oxide NPs (8 nm in size) may be prepared by pyrolysis of iron carboxylate salts in the presence of oleic acid and 1-octadecene. These particles were correspondingly transferred into water via a tailored ligand addition (bilayer formation) approach, and characterized over a range of transfer conditions, including 13 different ligand types. Bilayer phase transfer was optimized and reported based on transfer yield as a function of sonication amplitude, sonication time and surfactant concentration used for each ligand. Resulting aqueous NPs suspensions were characterized through transmission electron microscope (TEM) and surface charge via zeta (ζ) potential measurements. For each of the 13 surface stabilization strategies (bilayers), NP aggregation kinetics and long-term colloidal stabilities are quantitatively described as a function of ionic strength/type and storage time using time-resolved dynamic light scattering (TR-DLS).

Figure 13:
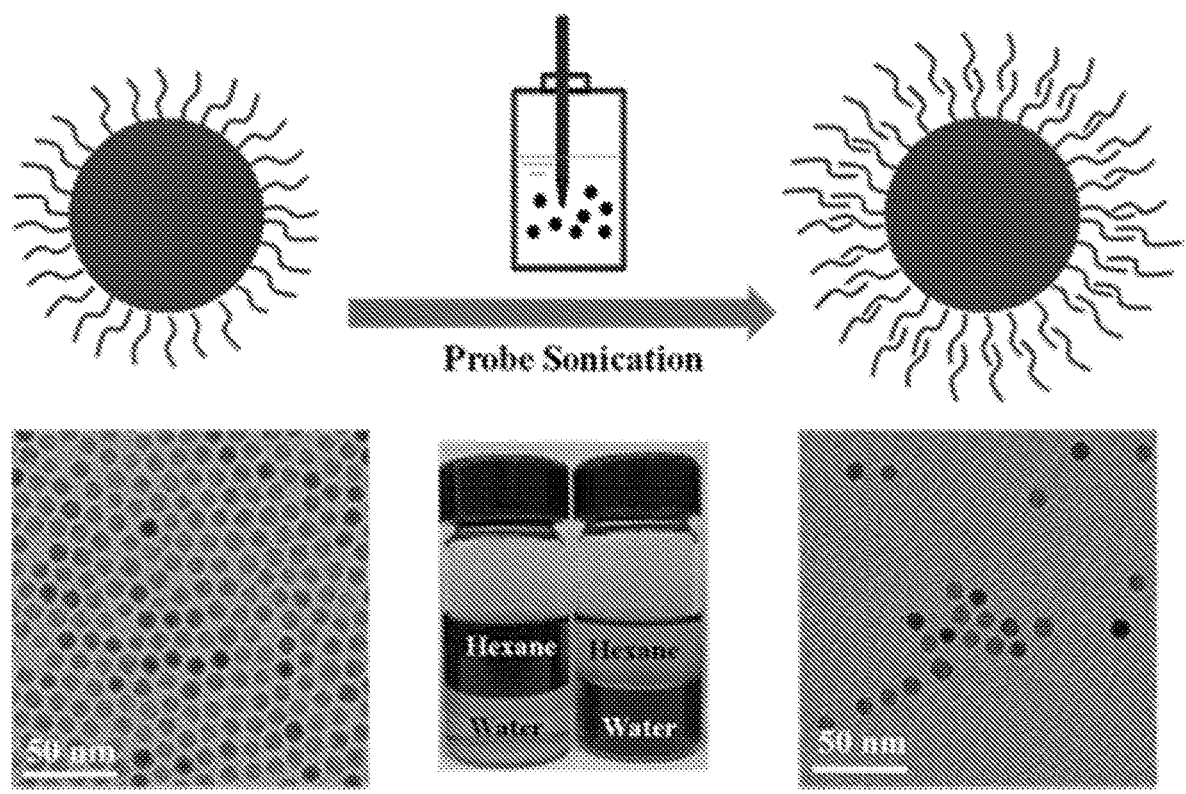
FIG. 13 depicts an exemplary embodiment of a schematic representation for NP phase transfer facilitated by a bilayer structure formation process in accordance with the present disclosure.
Figure 14:
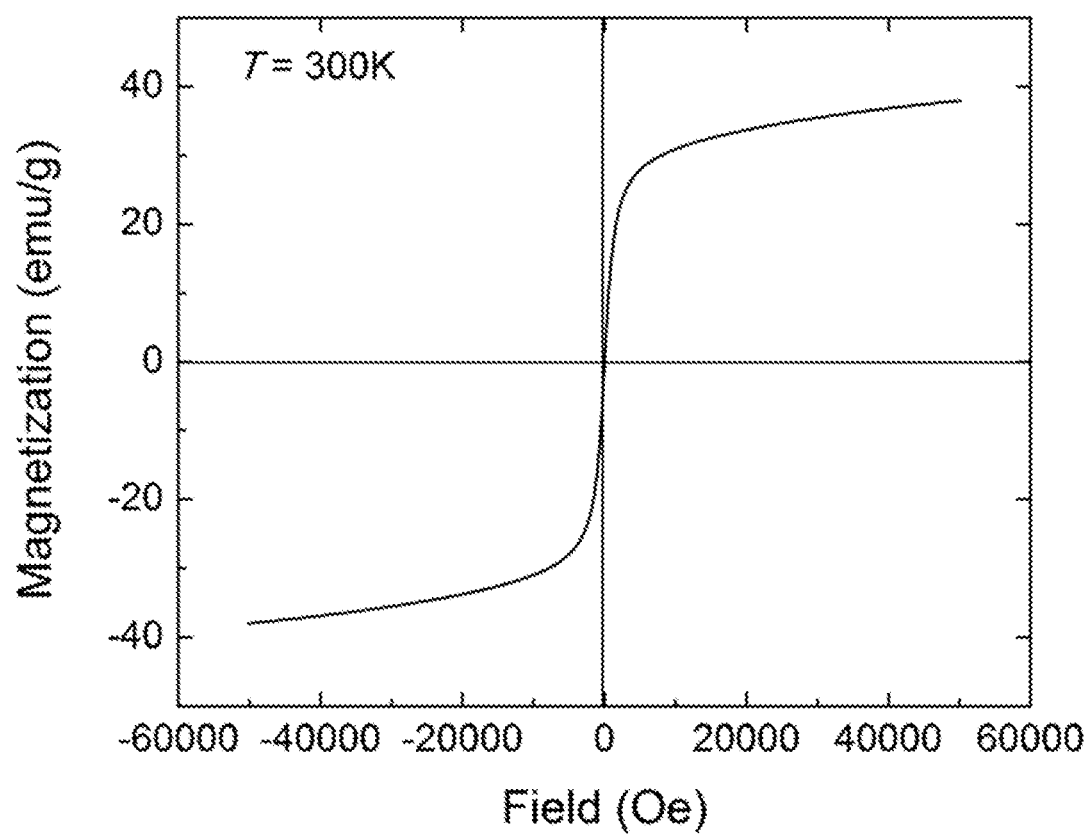
FIG. 14 depicts an exemplary embodiment of hysteresis loops of 8 nm iron oxide NPs in accordance with the present disclosure.

With respect to bilayer phase transfer strategies, FIG. 13 schematically illustrates the general procedure of a bilayer phase transfer approach, from nonpolar solvent to aqueous solution facilitated by a bilayer structure formation process. 8.1±0.6 nm iron oxide NPs were prepared from decomposition of iron carboxylate in organic media (1-octadecene) and surface stabilized (in organic phase) with oleic acid. These materials were chosen as they are not only relevant to environmental sensing and remediation applications, but also because they can be synthesized as highly monodispersed NPs with narrow size distribution as seen from FIG. 13. FIG. 14 shows hysteresis loops of 8 nm iron oxide NPs at 300 K. SQUID data shows the NPs are superparamagnetic at 300 K with no hysteresis, which means the net magnetization of the NPs is zero in the absence of an external magnetic field (FIG. 14).

Figure 15:
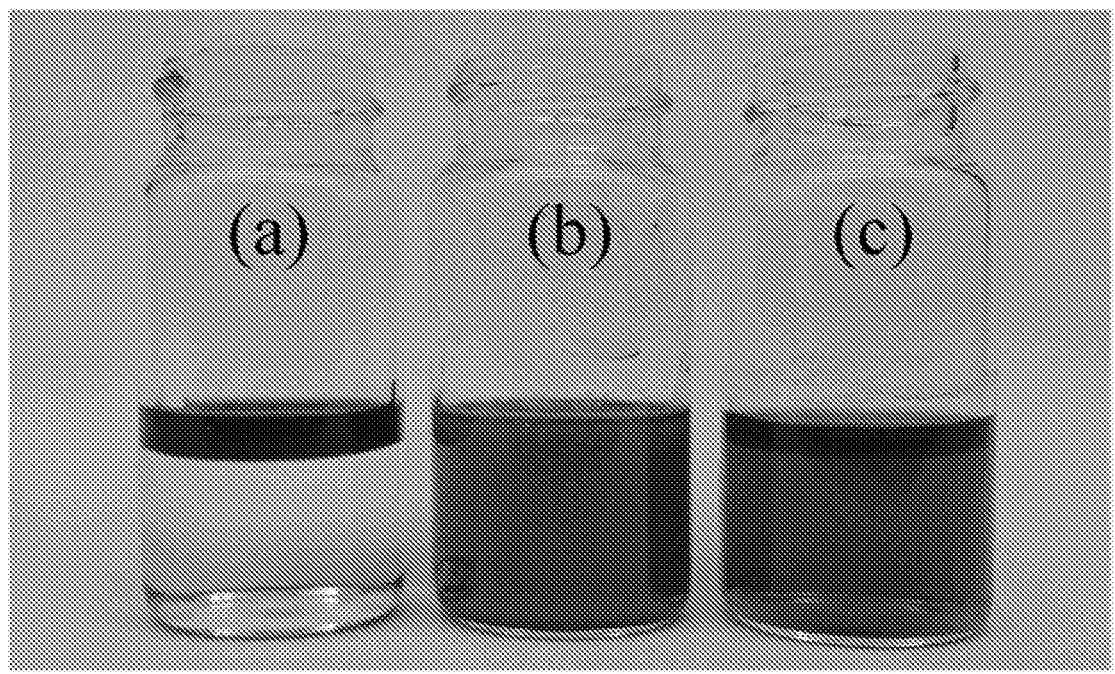
FIG. 15 depicts an exemplary embodiment of a bilayer phase transfer process in accordance with the present disclosure.
Figure 16:
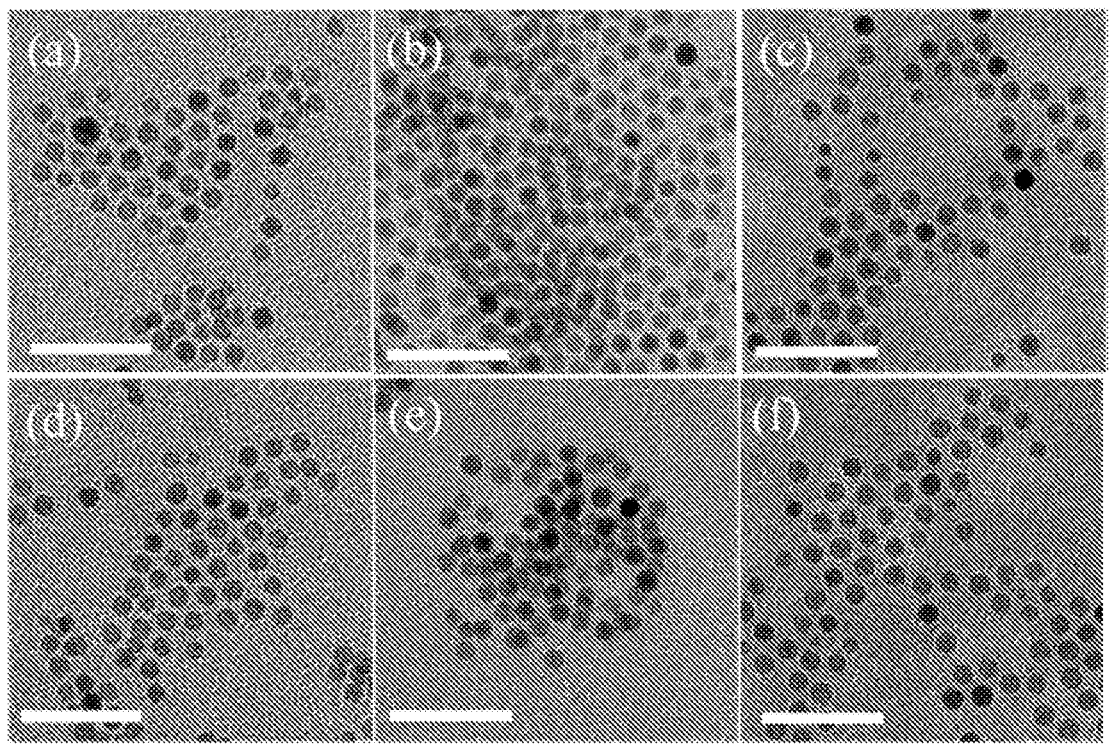
FIG. 16 depicts an exemplary embodiment of representative TEM micrographs of various sample NPs in accordance with the present disclosure.

Bilayer formations were achieved by mixing varied amounts of select surfactant with iron oxide NPs suspension in hexane and ultrapure water (two phases) via probe sonication, as detailed below. This process of particle transfer and subsequent stabilization from hexane into water is visualized in FIG. 15, which shows a bilayer phase transfer process at different stages: (a) at beginning, (b) just after sonication and (c) after 1 day settlement. For all systems described, when NPs are transferred from hexane into water, they remain monodispersed as shown in TEM micrographs (FIG. 13 and FIG. 16) and DLS data (Table 2). With respect to FIG. 16, all scale bars are 50 nm and representative TEM micrographs include (a) RA-NPs, (b) SA-NPs, (c) SDP-NPs, (d) SDS-NPs, (e) C12TAB-NPs, and (f) EMPIGEN-NPs in water.

TABLE 2

Optimized phase transfer conditions for colloidally stable iron oxide NPs using different surfactants.

| Outer layer | Amplitude (%) | Surfactant conc. (mM) | Sonication Time (min) | Hydrodynamic Size (nm) | Maximum Transfer Yield (%) |
|---|---|---|---|---|---|
| Oleic acid | 60 | 10-30 uL | 5 | 15.6 ± 1.3 | 70 |
| Ricinoleic acid | 70 | 10-20 | 5 | 20.9 ± 1.7 | 85 |
| Elaidic acid | 75 | 50 uL | 4-6 | 18.5 ± 4.3 | 26 |
| Stearic acid | 70 | 10 | 5 | 17.1 ± 2.1 | 75 |
| Palmitic acid | 65 | 5-20 | 6 | 23.2 ± 2.8 | 70 |
| Myristic acid | 65 | 5-20 | 4-5 | 20.9 ± 1.4 | 84 |
| Lauric acid | 75 | 10 | 3-4 | 19.2 ± 0.4 | 89 |
| Decanoic acid | 75 | 5-10 | 4-5 | 25.1 ± 0.7 | 59 |
| SDP | 70 | 10 | 3-4 | 23.4 ± 3.5 | 95 |
| SDS | 70 | 5-20 | 3-4 | 20.6 ± 0.7 | 79 |
| SDBS | 70 | 10-20 | 5-6 | 18.2 ± 3.4 | 68 |
| $C_{12}$TAB | 75 | 10 | 4 | 20.7 ± 1.0 | 47 |
| EMPIGEN | 70 | 40 | 5-6 | 17.3 ± 1.5 | 68 |

In broad terms, what is required is a carbon chain within a given length range and an ionizable head group. Preferably, a hydrophobic surfactant with a polar reactive group near the terminus can be used. More specifically, Table 3 depicts the chemical structure for each surfactant. Table 2 summarizes the optimized conditions (taken from Tables 4-15, below) for each of the surfactants listed in Table 3, including 11 negatively charged, 1 positively charged and 1 zwitterionic surfactant as the second, outer layer (oleic acid remains as the first layer). Table 3 includes unsaturated or saturated organic acids containing one- or multi-functional groups, such as oleic acid (OA), ricinoleic acid (RA), elaidic acid (EA), stearic acid (SA), palmitic acid (PA), myristic acid (MA), lauric acid (LA), and decanoic acid (DA), which maintain a carboxylic functional head group. A series of ionic surfactants that are similar in hydrophobic tail size (C12) and properties (saturated, aliphatic) but have systematically varied polar head groups are also evaluated. These surfactants include $C_{12}TAB$ (dodecyltrimethylammonium bromide) which has a positively charged head group; SDS (sodium dodecyl sulfate) with a negatively charged, sulfate head group; EMPIGEN (N,N-dimethyl-N-dodecylglycine betaine), which has a zwitterionic head group; SDBS (sodium dodecylbenzenesulfonate), which contains a benzene ring before the terminal group, lowering the overall (end) charge and providing an aromatic group near surface; and last, SDP (sodium monododecyl phosphate), which has a phosphate head group with a net −2 ionic head charge.

Other relevant surfactants include dodecyl phosphonate, hexadecyl phosphonate, and dihexadecyl phosphate. Surfactants such as tetramethylammonium 11-aminoundecanoate, other bipolar surfactants, sodium bis(2-ethylhexyl)sulfosuccinate, sulfuric lycine, oil-soluble surfactants, water-soluble surfactants, and amphiphilic surfactants may also be considered. With respect to bilayer formation, it is to be understood that the inner layer may be composed of a surfactant other than oleic acid, such as a cationic, anionic, or zwitterionic surfactant. For example, the inner layer may be composed of any surfactant listed in Table 2, as well as any other relevant surfactant disclosed herein with respect to the outer surface layer in the bilayer formation. It is to be further understood that the functional groups on the outer surface need not be homogeneous. Multifunctional nanoparticles can be synthesized by mixing multiple surfactants (e.g., from Table 2) in the organic phase prior to the phase separation. Accordingly, in some embodiments the functional groups on the outer surface are homogeneous, while in other embodiments the functional groups on the outer surface are heterogeneous.

TABLE 3

Chemical structure of utilized surfactants.

| Outer layer | Type | Chemical Structure |
|---|---|---|
| Oleic acid | anionic | |
| Ricinoleic acid | anionic | |
| Elaidic acid | anionic | |
| Stearic acid | anionic | |
| Palmitic acid | anionic | |
| Myristic acid | anionic | |
| Lauric acid | anionic | |
| Decanoic acid | anionic | |

TABLE 3-continued

Chemical structure of utilized surfactants.

| Outer layer | Type | Chemical Structure |
|---|---|---|
| SDP | anionic | 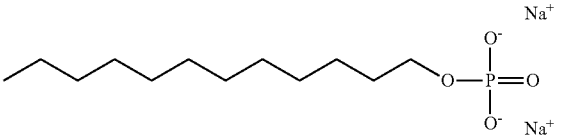 [SMILES: [Na+] ; CCCCCCCCCCCCOP(=O)([O-])[O-] ; [Na+]] |
| SDS | anionic | 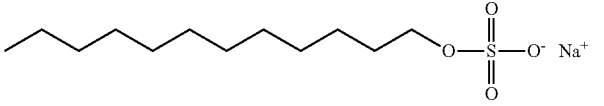 [SMILES: CCCCCCCCCCCCOS(=O)(=O)[O-] ; [Na+]] |
| SDBS | anionic | 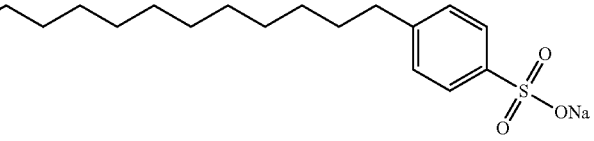 |
| $C_{12}$TAB | cationic | 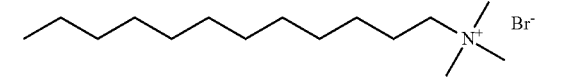 [SMILES: CCCCCCCCCCCC[N+](C)(C)C ; [Br-]] |
| EMPIGEN | zwitterionic | 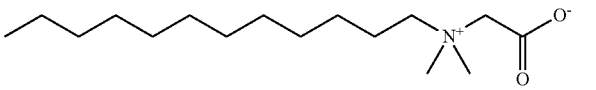 [SMILES: CCCCCCCCCCCC[N+](C)(C)CC(=O)[O-]] |

For each ligand, Tables 4-15 show the detailed hydrodynamic diameter and transfer yield as a function of sonication amplitude, sonication time and surfactant concentration tested. The sonication amplitude used in our study ranges between 60% and 75% (UP 50H, 50 watts, 30 kHz). It was not efficient to transfer these NPs from hexane into water when the sonication amplitude was below 50%, and while under high sonication amplitude (>90%), aggregates of NPs were seen during the transfer process. Typically, phase transfer process was completed in a short time (3-6 min), and longer sonication time did not further improve the phase transfer efficiencies. After phase transfer and purification (ultracentrifugation, ultrafiltration and syringe filtration described above), aqueous NP suspensions were characterized by DLS at room temperature and stored in the dark. For most, the hydrodynamic diameter of NPs coated with bilayered surface stabilizers are around 20 nm, indicating these NPs have a very thin and compact (bilayer) coating structures. Oleic acid (OA) bilayer coated NPs have the smallest hydrodynamic size of 15.6±1.3 nm while the decanoic acid (DA) coated NPs have the largest hydrodynamic size of 25.1±0.7 nm. Phase transfer yield (%) was calculated by measuring the total iron concentration transferred to water compared to initial iron concentration added to the hexane solution. The highest yield was 95% for SDP coated NPs, which as a phosphate has the highest formal charge (−2) head group of all ligands evaluated, while $C_{12}$TAB and elaidic acid surfactant reached a maximum of 47% and 26%, respectively. Generally, most of the surfactants allow for relatively high transfer efficiencies but never reaching 100% due to the difficulty to mixing limitations and interfacial partitioning of/at the two different phases. The total organic carbon (TOC) concentrations of 13 surfactants coated iron oxide NPs are within the range of 80-105 ppm when the iron oxide NPs concentration is 50 ppm (as Fe, Table 16). The similar values of coating amount allow direct comparison of the outer layer on NPs surface charge, aggregation kinetics and colloidal stability.

TABLE 4

Detailed hydrodynamic diameter and transfer yield as functions of sonication amplitude, sonication time and surfactant concentration tested for ricinoleic acid (RA) coated NPs.

| Dependent Variable | Time Tested (min) | Conc. Tested (mM) | Amplitude Tested | Hydrodynamic Diameter (nm) | Transfer Yield (%) |
|---|---|---|---|---|---|
| Amplitude | 4 | 10 | Dependent Variable | | |
| 50% | | | | 20.4 ± 6.6 | 47.3 ± 1.3 |
| 60% | | | | 23.7 ± 2.1 | 72.0 ± 3.1 |
| 70% | | | | 22.4 ± 0.5 | 81.2 ± 2.2 |
| 80% | | | | 21.3 ± 0.6 | 84.1 ± 1.9 |
| Time (min) | Dependent Variable | 10 | 70% | | |
| 2 | | | | 23.6 ± 0.9 | 53.7 ± 2.5 |
| 4 | | | | 21.8 ± 1.8 | 81.2 ± 2.2 |
| 6 | | | | 20.9 ± 1.7 | 75.9 ± 2.0 |
| 8 | | | | 23.1 ± 3.3 | 77.3 ± 1.0 |
| Conc. (mM) | 5 | Dependent Variable | 70% | | |
| 2.5 | | | | 24.3 ± 0.7 | 62.5 ± 1.5 |
| 5 | | | | 24.2 ± 0.8 | 78.6 ± 2.2 |
| 10 | | | | 21.8 ± 1.2 | 83.5 ± 1.6 |
| 15 | | | | 21.3 ± 1.8 | 85.1 ± 3.5 |
| 20 | | | | 22.2 ± 5.5 | 84.3 ± 1.5 |

TABLE 5

Detailed hydrodynamic diameter and transfer yield as functions of sonication amplitude, sonication time and surfactant concentration tested for elaidic acid (EA) coated NPs.

| Dependent Variable | Time Tested (min) | Conc. Tested (uL) | Amplitude Tested | Hydrodynamic Diameter (nm) | Transfer Yield (%) |
|---|---|---|---|---|---|
| Amplitude | 4 | 50 | Dependent Variable | | |
| 50% | | | | 45.4 ± 2.9 | 13.4 ± 1.5 |
| 60% | | | | 41.2 ± 3.0 | 19.3 ± 2.3 |
| 70% | | | | 24.7 ± 5.7 | 26.2 ± 1.1 |
| 80% | | | | 22.7 ± 5.8 | 25.7 ± 3.2 |
| Time (min) | Dependent Variable | 50 | 75% | | |
| 2 | | | | 31.4 ± 4.6 | 16.5 ± 1.7 |
| 4 | | | | 18.5 ± 4.3 | 26.6 ± 2.2 |
| 6 | | | | 20.5 ± 4.1 | 25.2 ± 1.4 |
| 8 | | | | 19.8 ± 2.7 | 21.3 ± 0.5 |
| Conc. (uL) | 6 | Dependent Variable | 75% | | |
| 12.5 | | | | 39.4 ± 10.5 | 17.7 ± 0.4 |
| 25 | | | | 30.4 ± 5.2 | 21.1 ± 1.8 |
| 50 | | | | 19.5 ± 5.5 | 25.8 ± 2.1 |
| 75 | | | | 25.2 ± 4.2 | 24.1 ± 1.4 |
| 100 | | | | 32.6 ± 2.7 | 16.0 ± 0.9 |

TABLE 6

Detailed hydrodynamic diameter and transfer yield as functions of sonication amplitude, sonication time and surfactant concentration tested for stearic acid (SA) coated NPs.

| Dependent Variable | Time Tested (min) | Conc. Tested (mM) | Amplitude Tested | Hydrodynamic Diameter (nm) | Transfer Yield (%) |
|---|---|---|---|---|---|
| Amplitude | 4 | 10 | Dependent Variable | | |
| 50% | | | | 14.9 ± 3.4 | 41.7 ± 3.2 |
| 60% | | | | 21.4 ± 2.5 | 65.1 ± 2.0 |
| 70% | | | | 18.6 ± 1.4 | 65.2 ± 1.7 |
| 80% | | | | 17.1 ± 2.1 | 71.5 ± 3.5 |
| Time (min) | Dependent Variable | 10 | 70% | | |
| 2 | | | | 25.0 ± 10.4 | 47.4 ± 2.7 |
| 4 | | | | 26.4 ± 8.0 | 63.3 ± 1.6 |
| 6 | | | | 23.0 ± 3.5 | 75.4 ± 2.5 |
| Conc. (mM) | 5 | Dependent Variable | 70% | | |
| 2.5 | | | | 17.7 ± 6.2 | 37.4 ± 0.3 |
| 5 | | | | 33.5 ± 3.8 | 51.3 ± 2.4 |
| 10 | | | | 20.8 ± 2.6 | 73.3 ± 4.0 |

TABLE 7

Detailed hydrodynamic diameter and transfer yield as functions of sonication amplitude, sonication time and surfactant concentration tested for palmitic acid (PA) coated NPs.

| Dependent Variable | Time Tested (min) | Conc. Tested (mM) | Amplitude Tested | Hydrodynamic Diameter (nm) | Transfer Yield (%) |
|---|---|---|---|---|---|
| Amplitude | 4 | 10 | Dependent Variable | | |
| 50% | | | | 24.7 ± 4.8 | 35.2 ± 1.3 |
| 60% | | | | 30.6 ± 2.6 | 61.0 ± 2.4 |
| 70% | | | | 26.2 ± 0.7 | 62.7 ± 5.1 |
| 80% | | | | 27.4 ± 3.3 | 71.4 ± 3.7 |
| Time (min) | Dependent Variable | 10 | 65% | | |
| 2 | | | | 29.2 ± 3.5 | 57.3 ± 2.5 |
| 4 | | | | 31.9 ± 3.9 | 63.3 ± 0.8 |
| 6 | | | | 20.7 ± 7.4 | 67.4 ± 3.1 |
| 8 | | | | 23.2 ± 2.8 | 67.2 ± 2.3 |
| Conc. (mM) | 6 | Dependent Variable | 65% | | |
| 2.5 | | | | 31.2 ± 1.2 | 57.1 ± 3.3 |
| 5 | | | | 33.5 ± 3.7 | 66.3 ± 3.4 |
| 10 | | | | 33.2 ± 7.7 | 68.4 ± 1.7 |
| 15 | | | | 30.8 ± 1.4 | 68.6 ± 3.2 |
| 20 | | | | 23.7 ± 11.1 | 70.7 ± 1.9 |

TABLE 8

Detailed hydrodynamic diameter and transfer yield as functions of sonication amplitude, sonication time and surfactant concentration tested for myristic acid (MA) coated NPs.

| Dependent Variable | Time Tested (min) | Conc. Tested (mM) | Amplitude Tested | Hydrodynamic Diameter (nm) | Transfer Yield (%) |
|---|---|---|---|---|---|
| Amplitude | 4 | 10 | Dependent Variable | | |
| 50% | | | | 24.3 ± 7.7 | 70.5 ± 2.3 |
| 60% | | | | 24.0 ± 2.7 | 81.0 ± 3.6 |
| 70% | | | | 24.3 ± 0.3 | 82.1 ± 3.9 |
| 80% | | | | 22.8 ± 0.6 | 80.0 ± 1.2 |

TABLE 8-continued

Detailed hydrodynamic diameter and transfer yield as functions of sonication amplitude, sonication time and surfactant concentration tested for myristic acid (MA) coated NPs.

| Dependent Variable | Time Tested (min) | Conc. Tested (mM) | Amplitude Tested | Hydrodynamic Diameter (nm) | Transfer Yield (%) |
|---|---|---|---|---|---|
| Time (min) | Dependent Variable | 10 | 65% | | |
| 1 | | | | 26.7 ± 1.1 | 73.3 ± 1.2 |
| 2 | | | | 24.2 ± 1.8 | 82.5 ± 5.6 |
| 4 | | | | 21.8 ± 1.0 | 83.9 ± 1.9 |
| 6 | | | | 21.4 ± 0.3 | 80.4 ± 2.8 |
| Conc. (mM) | 4 | Dependent Variable | 65% | | |
| 2.5 | | | | 25.4 ± 2.8 | 60.4 ± 2.1 |
| 5 | | | | 24.2 ± 2.0 | 67.5 ± 1.8 |
| 10 | | | | 21.5 ± 1.9 | 74.1 ± 2.3 |
| 15 | | | | 20.9 ± 1.4 | 77.3 ± 2.7 |
| 20 | | | | 21.1 ± 1.1 | 75.5 ± 4.4 |

TABLE 9

Detailed hydrodynamic diameter and transfer yield as functions of sonication amplitude, sonication time and surfactant concentration tested for lauric acid (LA) coated NPs.

| Dependent Variable | Time Tested (min) | Conc. Tested (mM) | Amplitude Tested | Hydrodynamic Diameter (nm) | Transfer Yield (%) |
|---|---|---|---|---|---|
| Amplitude | 3 | 5 | Dependent Variable | | |
| 50% | | | | 23.2 ± 10.4 | 58.4 ± 0.8 |
| 60% | | | | 25.7 ± 8.6 | 61.5 ± 3.6 |
| 70% | | | | 26.5 ± 2.1 | 77.4 ± 5.4 |
| 80% | | | | 25.6 ± 2.7 | 84.5 ± 3.6 |
| 90% | | | | 24.3 ± 0.5 | 87.3 ± 4.1 |
| Time (min) | Dependent Variable | 5 | 75% | | |
| 1 | | | | 37.6 ± 4.8 | 80.3 ± 4.1 |
| 2 | | | | 31.6 ± 2.6 | 86.5 ± 2.6 |
| 3 | | | | 20.8 ± 4.0 | 88.2 ± 3.3 |
| 4 | | | | 28.0 ± 1.7 | 84.2 ± 3.9 |
| 5 | | | | 22.4 ± 9.0 | 88.5 ± 2.6 |
| Conc. (mM) | 3 | Dependent Variable | 75% | | |
| 1.25 | | | | 34.5 ± 0.7 | 70.1 ± 2.8 |
| 2.5 | | | | 31.6 ± 2.5 | 74.5 ± 1.7 |
| 5 | | | | 26.9 ± 1.7 | 85.1 ± 4.4 |
| 7.5 | | | | 25.2 ± 1.7 | 88.8 ± 2.6 |
| 10 | | | | 19.2 ± 0.4 | 87.6 ± 1.9 |

TABLE 10

Detailed hydrodynamic diameter and transfer yield as functions of sonication amplitude, sonication time and surfactant concentration tested for decanoic acid (DA) coated NPs.

| Dependent Variable | Time Tested (min) | Conc. Tested (mM) | Amplitude Tested | Hydrodynamic Diameter (nm) | Transfer Yield (%) |
|---|---|---|---|---|---|
| Amplitude | 4 | 10 | Dependent Variable | | |
| 50% | | | | 24.4 ± 2.5 | 26.7 ± 3.1 |
| 60% | | | | 27.5 ± 1.5 | 30.8 ± 5.0 |

TABLE 10-continued

Detailed hydrodynamic diameter and transfer yield as functions
of sonication amplitude, sonication time and surfactant concentration
tested for decanoic acid (DA) coated NPs.

| Dependent Variable | Time Tested (min) | Conc. Tested (mM) | Amplitude Tested | Hydrodynamic Diameter (nm) | Transfer Yield (%) |
|---|---|---|---|---|---|
| 70% | | | | 26.1 ± 2.3 | 40.6 ± 2.4 |
| 80% | | | | 28.4 ± 0.6 | 59.3 ± 4.2 |
| Time (min) | Dependent Variable | 10 | 75% | | |
| 2 | | | | 28.4 ± 0.4 | 55.4 ± 2.0 |
| 4 | | | | 26.5 ± 0.6 | 54.3 ± 2.4 |
| 6 | | | | 25.1 ± 0.7 | 55.0 ± 1.8 |
| 8 | | | | 25.4 ± 0.8 | 59.3 ± 3.6 |
| Conc. (mM) | 4 | Dependent Variable | 75% | | |
| 2.5 | | | | 30.4 ± 8.9 | 38.4 ± 0.7 |
| 5 | | | | 28.9 ± 0.7 | 40.4 ± 2.1 |
| 10 | | | | 28.5 ± 0.6 | 46.4 ± 1.1 |
| 15 | | | | 27.4 ± 1.9 | 45.6 ± 1.6 |
| 20 | | | | 28.9 ± 0.3 | 53.4 ± 3.0 |

TABLE 11

Detailed hydrodynamic diameter and transfer yield as functions
of sonication amplitude, sonication time and surfactant concentration
tested for sodium monododecyl phosphate (SDP) coated NPs.

| Dependent Variable | Time Tested (min) | Conc. Tested (mM) | Amplitude Tested | Hydrodynamic Diameter (nm) | Transfer Yield (%) |
|---|---|---|---|---|---|
| Amplitude | 3 | 5 | Dependent Variable | | |
| 50% | | | | 44.5 ± 0.5 | 51.2 ± 3.4 |
| 60% | | | | 41.6 ± 2.4 | 67.4 ± 3.9 |
| 70% | | | | 39.1 ± 2.9 | 85.6 ± 4.6 |
| 80% | | | | 36.2 ± 0.6 | 93.1 ± 4.9 |
| 90% | | | | 39.0 ± 1.0 | 91.4 ± 5.5 |
| Time (min) | Dependent Variable | 5 | 70% | | |
| 1 | | | | 53.2 ± 3.2 | 67.4 ± 1.3 |
| 2 | | | | 43.7 ± 1.6 | 79.3 ± 5.7 |
| 3 | | | | 38.7 ± 0.8 | 90.9 ± 4.7 |
| 4 | | | | 39.0 ± 1.0 | 92.7 ± 3.2 |
| 5 | | | | 38.4 ± 2.5 | 95.2 ± 1.9 |
| Conc. (mM) | 3 | Dependent Variable | 70% | | |
| 1.25 | | | | 54.9 ± 3.3 | 66.9 ± 1.1 |
| 2.5 | | | | 43.1 ± 2.3 | 77.3 ± 2.2 |
| 5 | | | | 40.6 ± 1.2 | 87.6 ± 3.9 |
| 7.5 | | | | 34.3 ± 0.2 | 85.2 ± 6.7 |
| 10 | | | | 23.4 ± 3.5 | 90.1 ± 2.3 |

TABLE 12

Detailed hydrodynamic diameter and transfer yield as functions of sonication amplitude, sonication time and surfactant concentration tested for sodium monododecyl sulfate (SDS) coated NPs.

| Dependent Variable | Time Tested (min) | Conc. Tested (mM) | Amplitude Tested | Hydrodynamic Diameter (nm) | Transfer Yield (%) |
|---|---|---|---|---|---|
| Amplitude | 5 | 5 | Dependent Variable | | |
| 50% | | | | 20.9 ± 3.0 | 40.8 ± 0.6 |
| 60% | | | | 20.4 ± 1.1 | 50.4 ± 1.2 |
| 70% | | | | 19.0 ± 1.0 | 64.3 ± 3.6 |
| 80% | | | | 20.2 ± 1.6 | 72.3 ± 7.4 |
| 90% | | | | 20.3 ± 0.1 | 70.7 ± 0.9 |
| Time (min) | Dependent Variable | 5 | 70% | | |
| 1 | | | | 22.6 ± 10.4 | 55.2 ± 2.0 |
| 2 | | | | 20.9 ± 2.6 | 59.7 ± 1.0 |
| 3 | | | | 21.9 ± 0.2 | 73.6 ± 4.0 |
| 4 | | | | 22.1 ± 1.3 | 79.1 ± 0.7 |
| 5 | | | | 22.2 ± 1.5 | 74.1 ± 1.8 |
| Conc. (mM) | 3 | Dependent Variable | 70% | | |
| 1.0 | | | | 28.1 ± 1.0 | 57.5 ± 2.7 |
| 2.5 | | | | 25.0 ± 0.5 | 76.2 ± 2.1 |
| 5 | | | | 20.6 ± 0.7 | 75.9 ± 3.2 |
| 7.5 | | | | 19.7 ± 0.3 | 78.2 ± 3.1 |
| 10 | | | | 16.6 ± 0.7 | 76.0 ± 1.8 |

TABLE 13

Detailed hydrodynamic diameter and transfer yield as functions of sonication amplitude, sonication time and surfactant concentration tested for sodium dodecylbenzenesulfonate (SDBS) coated NPs.

| Dependent Variable | Time Tested (min) | Conc. Tested (mM) | Amplitude Tested | Hydrodynamic Diameter (nm) | Transfer Yield (%) |
|---|---|---|---|---|---|
| Amplitude | 4 | 10 | Dependent Variable | | |
| 50% | | | | 16.4 ± 3.1 | 36.3 ± 0.7 |
| 60% | | | | 15.0 ± 0.6 | 58.4 ± 2.2 |
| 70% | | | | 17.1 ± 1.5 | 63.3 ± 0.4 |
| 80% | | | | 16.2 ± 1.9 | 66.6 ± 1.7 |
| Time (min) | Dependent Variable | 10 | 70% | | |
| 2 | | | | 21.0 ± 2.7 | 53.0 ± 1.7 |
| 4 | | | | 16.6 ± 1.9 | 67.5 ± 1.6 |
| 6 | | | | 15.1 ± 3.0 | 68.4 ± 1.6 |
| Conc. (mM) | 5 | Dependent Variable | 70% | | |
| 5 | | | | 18.9 ± 0.3 | 45.5 ± 1.4 |
| 10 | | | | 17.2 ± 0.8 | 62.8 ± 1.0 |
| 20 | | | | 15.2 ± 4.1 | 66.1 ± 1.4 |
| 30 | | | | 18.2 ± 3.4 | 64.9 ± 5.5 |
| 40 | | | | 17.9 ± 0.3 | 64.5 ± 2.3 |

TABLE 14

Detailed hydrodynamic diameter and transfer yield as functions of sonication amplitude, sonication time and surfactant concentration tested for dodecyltrimethylammonium bromide (C12TAB) coated NPs.

| Dependent Variable | Time Tested (min) | Conc. Tested (mM) | Amplitude Tested | Hydrodynamic Diameter (nm) | Transfer Yield (%) |
|---|---|---|---|---|---|
| Amplitude | 4 | 10 | Dependent Variable | | |
| 50% | | | | 22.3 ± 4.1 | 28.7 ± 3.4 |
| 60% | | | | 19.7 ± 1.7 | 33.8 ± 2.2 |
| 70% | | | | 21.3 ± 1.3 | 35.5 ± 5.2 |
| 80% | | | | 21.5 ± 0.8 | 42.8 ± 2.3 |
| Time (min) | Dependent Variable | 10 | 75% | | |
| 2 | | | | 19.6 ± 1.0 | 38.5 ± 0.7 |
| 4 | | | | 20.7 ± 1.0 | 45.1 ± 1.9 |
| 6 | | | | 20.3 ± 2.3 | 47.4 ± 1.4 |
| Conc. (mM) | 4 | Dependent Variable | 75% | | |
| 5 | | | | 34.5 ± 0.4 | 30.2 ± 2.9 |
| 10 | | | | 20.7 ± 1.0 | 44.6 ± 1.6 |
| 20 | | | | 36.1 ± 0.6 | 41.1 ± 3.5 |
| 30 | | | | 43.8 ± 11.5 | 42.6 ± 2.2 |
| 40 | | | | 59.2 ± 3.4 | 40.4 ± 4.5 |

TABLE 15

Detailed hydrodynamic diameter and transfer yield as functions of sonication amplitude, sonication time and surfactant concentration tested for N,N-Dimethyl-N-dodecylglycine betaine (EMPIGEN) coated NPs.

| Dependent Variable | Time Tested (min) | Conc. Tested (mM) | Amplitude Tested | Hydrodynamic Diameter (nm) | Transfer Yield (%) |
|---|---|---|---|---|---|
| Amplitude | 5 | 20 | Dependent Variable | | |
| 50% | | | | 29.0 ± 9.8 | 30.2 ± 2.7 |
| 60% | | | | 36.9 ± 8.1 | 38.4 ± 1.2 |
| 70% | | | | 36.0 ± 6.9 | 42.3 ± 3.3 |
| 80% | | | | 33.1 ± 13.7 | 46.3 ± 4.5 |
| 90% | | | | 38.3 ± 1.9 | 46.1 ± 2.3 |
| Time (min) | Dependent Variable | 20 | 70% | | |
| 2 | | | | 36.1 ± 0.9 | 46.4 ± 3.5 |
| 4 | | | | 33.8 ± 9.9 | 42.4 ± 1.2 |
| 5 | | | | 30.8 ± 7.4 | 50.5 ± 2.3 |
| 6 | | | | 30.0 ± 0.9 | 55.8 ± 3.6 |
| 8 | | | | 32.1 ± 0.7 | 52.8 ± 2.8 |
| Conc. (mM) | 6 | Dependent Variable | 70% | | |
| 10 | | | | 56.8 ± 6.6 | 37.1 ± 1.3 |
| 20 | | | | 31.5 ± 2.9 | 46.4 ± 2.6 |
| 30 | | | | 27.9 ± 3.5 | 54.9 ± 1.9 |
| 40 | | | | 17.3 ± 1.5 | 65.4 ± 4.3 |
| 50 | | | | 21.6 ± 1.0 | 67.9 ± 3.1 |

TABLE 16

Total organic carbon (TOC) concentrations of
bilayer coated iron oxide NPs (50 ppm Fe).

| Outer layer | TOC (ppm) |
| --- | --- |
| Oleic acid (OA) | 102.8 ± 0.3 |
| Ricinoleic acid (RA) | 100.1 ± 0.9 |
| Elaidic acid (EA) | 85.0 ± 0.2 |
| Stearic acid (SA) | 99.8 ± 0.9 |
| Palmitic acid (PA) | 99.4 ± 0.2 |
| Myristic acid (MA) | 94.3 ± 0.5 |
| Lauric acid (LA) | 87.2 ± 0.5 |
| Decanoic acid (DA) | 81.3 ± 0.3 |
| SDP | 86.7 ± 0.5 |
| SDS | 88.8 ± 0.4 |
| SDBS | 100.5 ± 1.9 |
| $C_{12}TAB$ | 95.0 ± 0.1 |
| EMPIGEN | 98.3 ± 1.6 |

Figure 17:
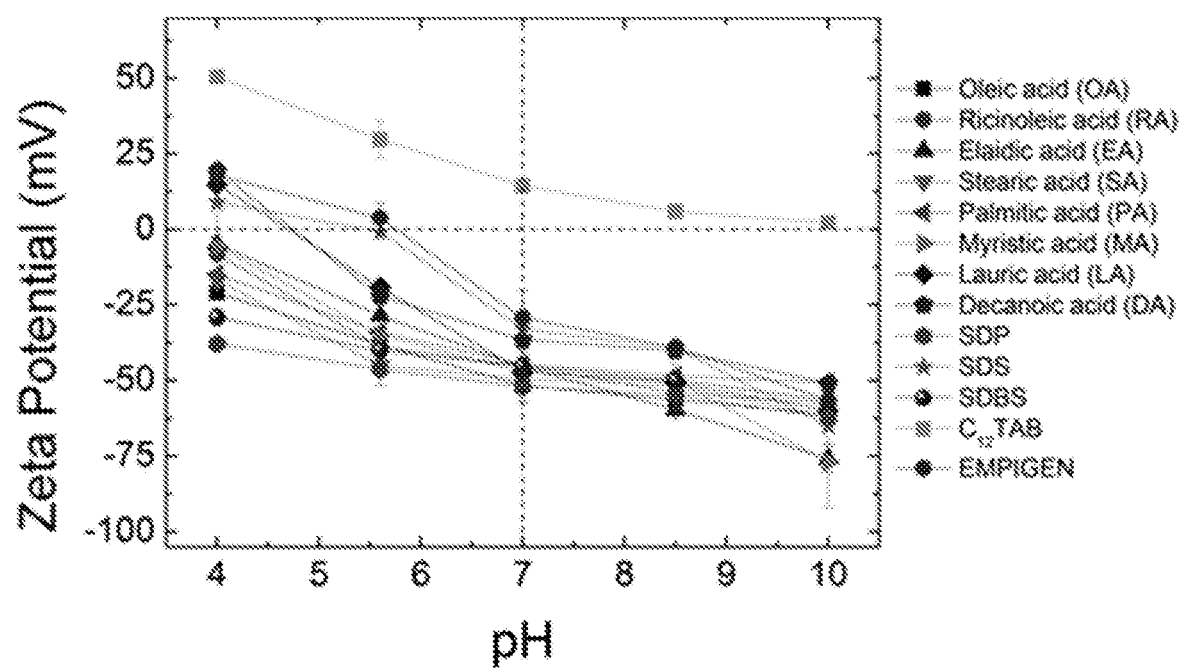
FIG. 17 depicts an exemplary embodiment of zeta potentials of bilayer coated NPs in accordance with the present disclosure.

Surface Charge. Zeta potential measurements were conducted at pH 4.0, pH 5.6, pH 7.0, pH 8.5 and pH 10.0 at room temperature (22±0.5° C.) for each (optimized) aqueous suspension of bilayer coated NPs (FIG. 17). As expected, at elevated pH, NPs surface charge relatively increases (for negatively charged particles) while at lower pH, they become more positively charged. For example, ζ-potential values of lauric acid coated NPs (LA-NPs) went from −60.0±2.24 mV to +14.9±1.38 mV as pH decreased from 10 to 4.0. The outer coatings can also affect the surface charge of NPs to varying degrees. While ζ-potentials of OA, RA, EA, SA, PA, MA, SDP, and SDBS coated NPs remain negatively charged for the entire range of pH values examined in this study and, ζ-potentials of $C_{12}TAB$ remain positive. For LA, DA, SDS and EMPIGEN coated NPs, ζ-potentials changed from positive to negative as pH increased from 4.0 to 10.0. Under neutral pH condition, the absolute zeta potential values of all the bilayer coated NPs are far from zero, which is key for aqueous stability via electrostatic repulsion forces.

Figure 18:
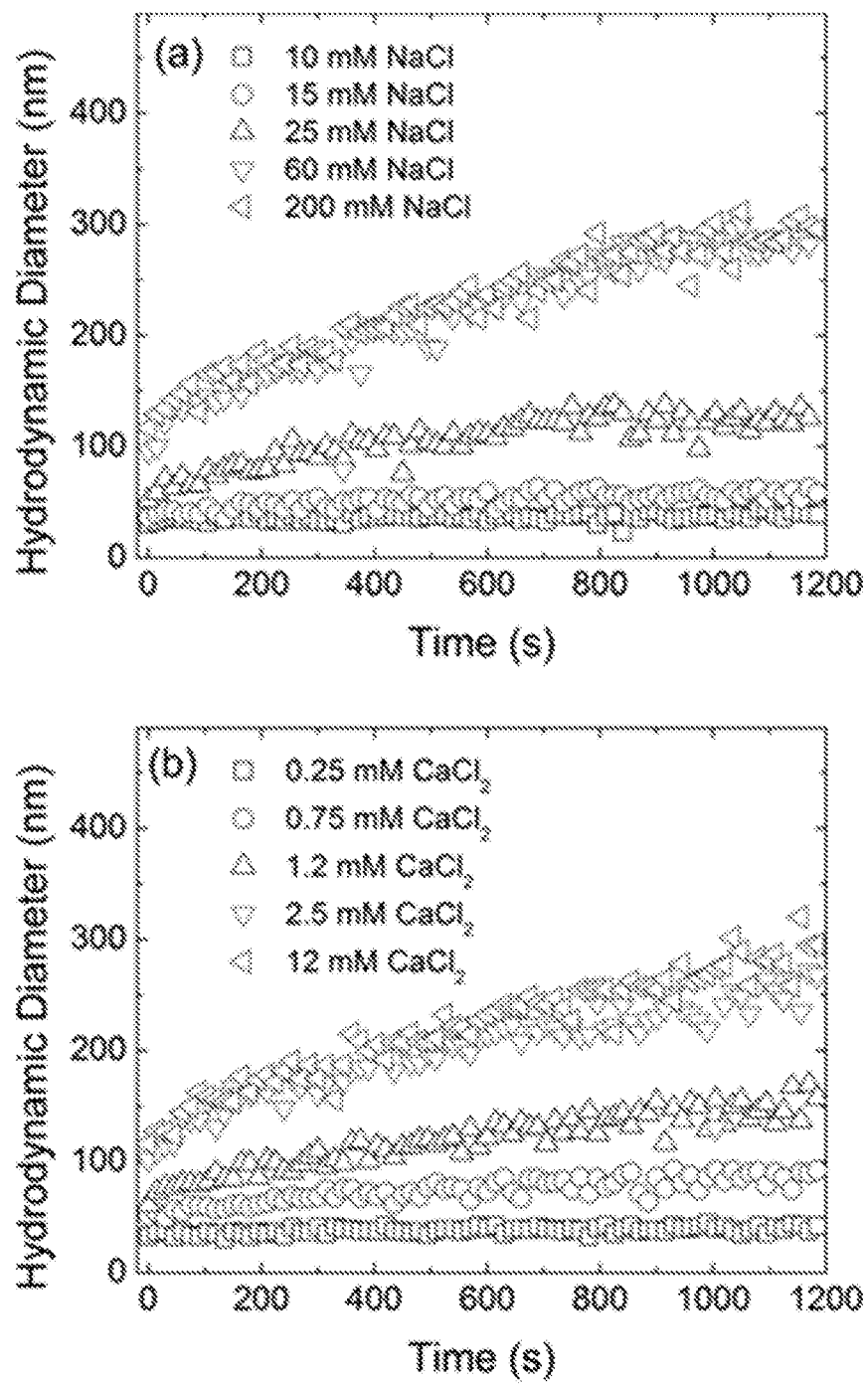
FIG. 18 depicts an exemplary embodiment of aggregation profiles of DA-NPs in accordance with the present disclosure.

Aggregation Kinetics. Time resolved dynamic light scattering (TR-DLS) is widely used to compare and describe aggregation behavior of engineered NPs. Here, as an example, FIG. 18 shows the aggregation profiles of decanoic acid coated iron oxide NPs (DA-NPs) in the presence of varied (a) NaCl and (b) $CaCl_2$ concentrations at pH 7.0. A linear increase in the hydrodynamic diameter of NPs occurs during the early aggregation stage and the aggregation rate then decreases as the particle concentration correspondingly decreases (with aggregation occurrence). The initial aggregation rate of DA-NPs increased from 0.015 nm/s to 0.212 nm/s when the NaCl concentration was increased from 10 mM to 25 mM. However, the aggregations rates are similar at 60 mM NaCl (0.282 nm/s) and 200 mM NaCl (0.293 nm/s) concentrations, indicating the aggregate rate is invariant to the additional increase in higher salt concentration. In the presence of a divalent cation ($Ca^{2+}$), similar behavior was seen at relatively lower cation concentrations. The aggregation rate was calculated as 0.156 nm/s in the presence of 1.2 mM $Ca^{2+}$, which is more than 10-fold of the aggregation rate in the presence of 10 mM Nat Due to the effective charge neutralization capacity/association by divalent cation, $Ca^{2+}$ is more efficient in destabilizing the NPs.

Figure 19:
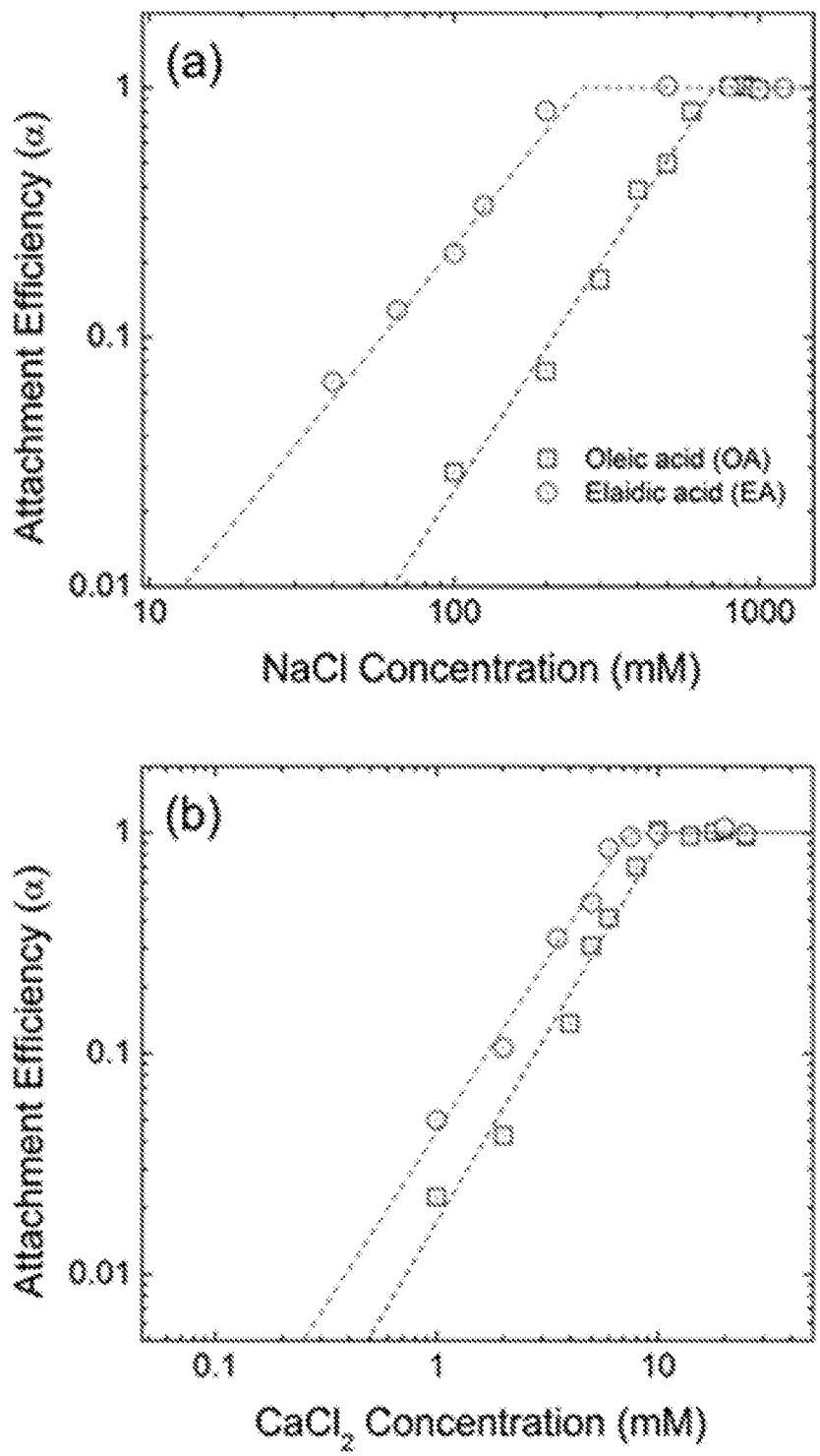
FIG. 19 depicts an exemplary embodiment of attachment efficiencies of OA-NPs and EA-NPs in accordance with the present disclosure.

Isomeric Effect. The aggregation attachment efficiencies (α) of oleic acid (OA) and elaidic acid (EA), which are cis and trans with regard to the C8-C9 double bond, respectively, coated NPs as a function of electrolyte concentrations (NaCl and $CaCl_2$) are shown in FIG. 19. FIG. 19 represents attachment efficiencies of OA-NPs and EA-NPs as functions of (a) NaCl and (b) $CaCl_2$ concentrations at pH 7.0. Aggregation profiles described herein clearly follow classical DLVO type interactions where electrostatic repulsion and van der Waals attraction forces dominate particle stability. At low salt concentration (reaction-limited regime), an increase in the electrolyte concentration provides more cations to effectively neutralize the surface charge of NPs, leading to an increase in the attachment efficiency value due to decreased energy barriers to aggregation between charged NPs. EA-NPs' α value increased from 0.066 to 0.807 when NaCl was increased from 40 mM to 200 mM. When the salt concentration was high enough to suppress the energy barrier for aggregation, a reached 1, meaning virtually all collisions between NPs results in aggregation. This regime is defined as diffusion-limited regime. Similar aggregation behaviors were also found in other bilayer coated NPs. The critical coagulation concentration (CCC) value is derived from the intersection of the extrapolation from the diffusion-limited (fast aggregation) and reaction-limited (slow aggregation) regimes. For reference, a summary of CCC values for all 13 bilayers described, as a function of NaCl and $CaCl_2$, is presented in Table 17.

TABLE 17

Summary of CCC values for bilayer coated iron oxide NPs.

| | Critical Coagulation Concentration | |
| --- | --- | --- |
| Outer layer | NaCl (mM) | $CaCl_2$ (mM) |
| Oleic acid (OA) | 710 | 10.6 |
| Ricinoleic acid (RA) | 746 | 10.8 |
| Elaidic acid (EA) | 260 | 7.4 |
| Stearic acid (SA) | 452 | 9.3 |
| Palmitic acid (PA) | 257 | 5.3 |
| Myristic acid (MA) | 94 | 3.9 |
| Lauric acid (LA) | 16 | 0.5 |
| Decanoic acid (DA) | 27 | 1.6 |
| SDP | 250 | 3.6 |
| SDS | 45 | 1.4 |
| SDBS | 46 | 6.0 |
| $C_{12}TAB$ | 555 | 11.1 |
| EMPIGEN | 766 | 11.3 |

The CCC values for OA-NPs are 710 mM for NaCl and 10.6 mM for $CaCl_2$, while the CCC values for EA-NPs are 260 mM for NaCl and 7.4 mM $CaCl_2$. The α value for OA-NPs is comparatively smaller than that of EA-NPs under the same electrolyte concentration in the reaction-limited regime. The cis (oleyl) forms of unsaturated-unsaturated oleyl carbon chains may lead to enhancement in bilayer stability due, in part, to stronger van der Waals (primarily as London type forces) interactions, as the tails are sterically aligned, with lower (molecular) degree(s) of freedom, compared to the relatively straighter EA-(trans-)unsaturated-OA-(cis-)unsaturated carbon chain.

Figure 20:
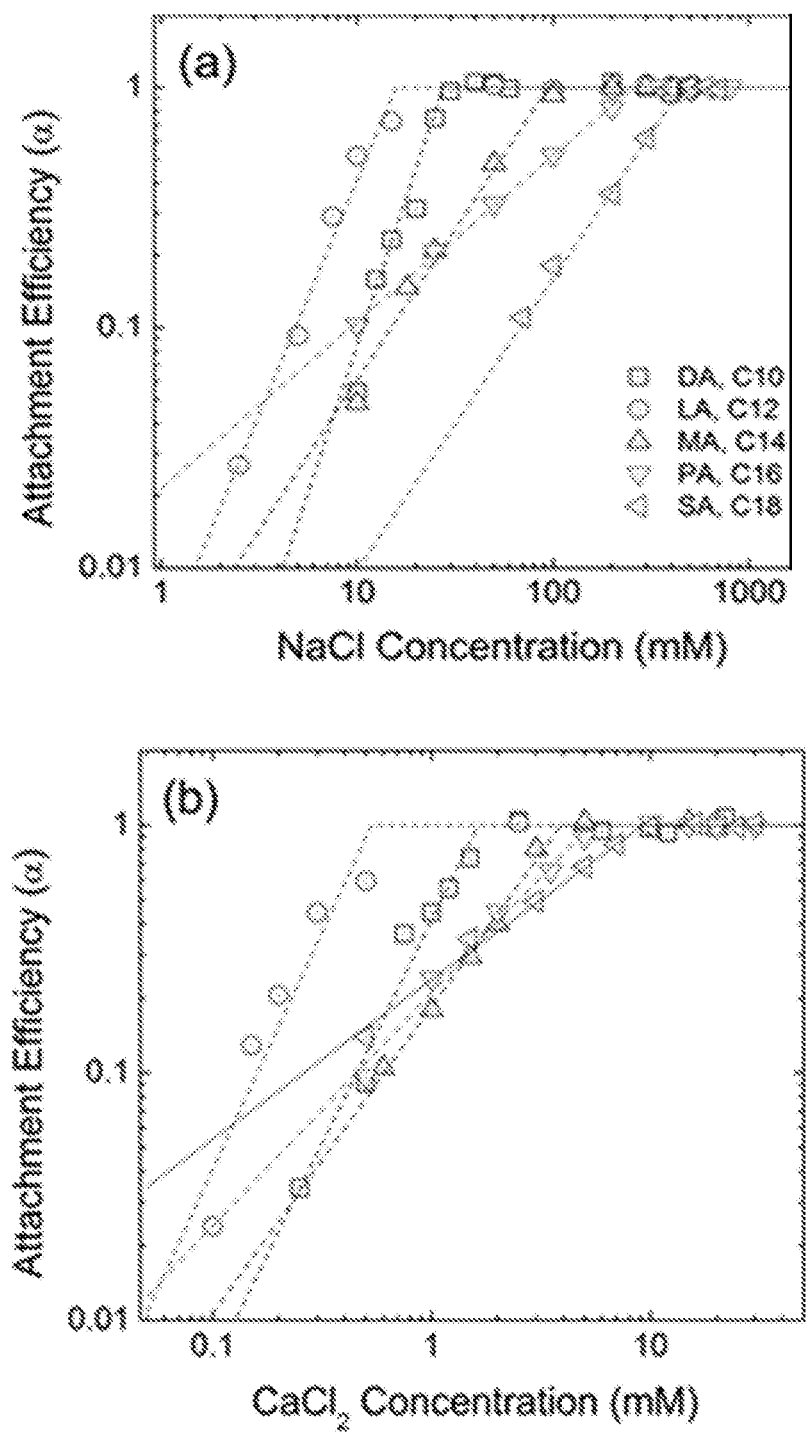
FIG. 20 depicts an exemplary embodiment of attachment efficiencies of various sample NPs in accordance with the present disclosure.

Effect of Chain Length. A series of saturated fatty acids differing in chain length, but with the identical carboxylic acid head groups, were applied and evaluated as the second, outwardly facing layer(s). Decanoic acid (DA, C10), lauric acid (LA, C12), myristic acid (MA, C14), palmitic acid (PA, C16), and stearic acid (SA, C18) are similar n-alkanoic acids with 10-18 carbons. The progressive increase in the carbon number allows us to directly compare the effect of second layer chain length on the colloidal stability. FIG. 20 represents the aggregation attachment efficiencies of DA-NPs (C10), LA-NPs (C12), MA-NPs (C14), PA-NPs (C16), and SA-NPs (C18) as functions of (a) NaCl and (b) $CaCl_2$ concentrations at pH 7.0. The CCC values in the presence of NaCl are 27 mM, 16 mM, 94 mM, 257 mM and 452 mM for DA-NPs, LA-NPs, MA-NPs, PA-NPs, and SA-NPs, respectively. The CCC values in the presence of $CaCl_2$ are 1.6 mM, 0.5 mM, 3.9 mM, 5.3 mM and 9.3 mM for DA-NPs, LA-NPs, MA-NPs, PA-NPs, and SA-NPs, respectively. Except for DA-NPs, the CCC values increases as the carbon chain length increases from C12 to C18. The longer the alkyl chain length of surfactant, the stronger (net increase) hydrophobic and/or van der Waals (primarily as London type) interactions between the first and second layer tail groups.

Figure 21:
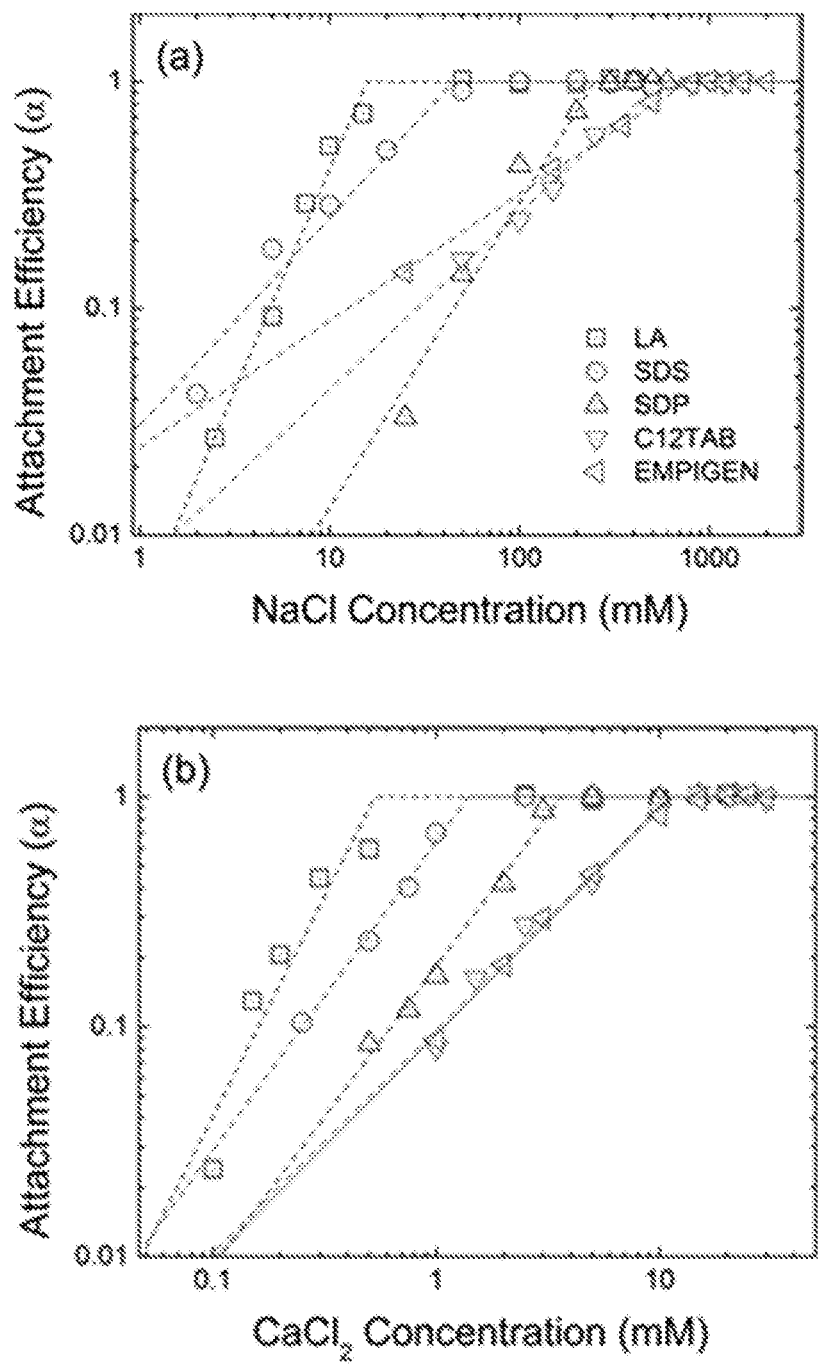
FIG. 21 depicts an exemplary embodiment of attachment efficiencies of various sample NPs in accordance with the present disclosure.

Head Group Functionality. The effect of head group functionality on NPs colloidal stability is compared in FIG. 21. FIG. 21 represents the attachment efficiencies of LA-NPs, SDS-NPs, SDP-NPs, $C_{12}TAB$-NPs, and EMPIGEN-NPs as functions of (a) NaCl and (b) $CaCl_2$ concentrations at pH 7.0. LA, SDS, SDP, $C_{12}TAB$, and EMPIGEN have similar size (C12) and type (unsaturated, aliphatic) of hydrophobic tails but vary with regard to functional head groups. Carboxylate group functionalized LA-NPs have CCC values of 16 mM NaCl and 0.5 mM $CaCl_2$. SDS coated NPs with a sulfate functional head group has CCC values of 45 mM NaCl and 1.4 mM $CaCl_2$. With phosphate based hydrophilic head group, SDP-NPs have a higher CCC values in NaCl (250 mM) and $CaCl_2$ (3.6 mM). The highest CCC values were obtained when positive and zwitterionic functionalized second layer was applied. $C_{12}TAB$ and EMPIGEN coated NPs have the CCC values of 555 mM and 766 mM for NaCl, 11.1 mM and 11.3 mM for $CaCl_2$, respectively.

Figure 22:
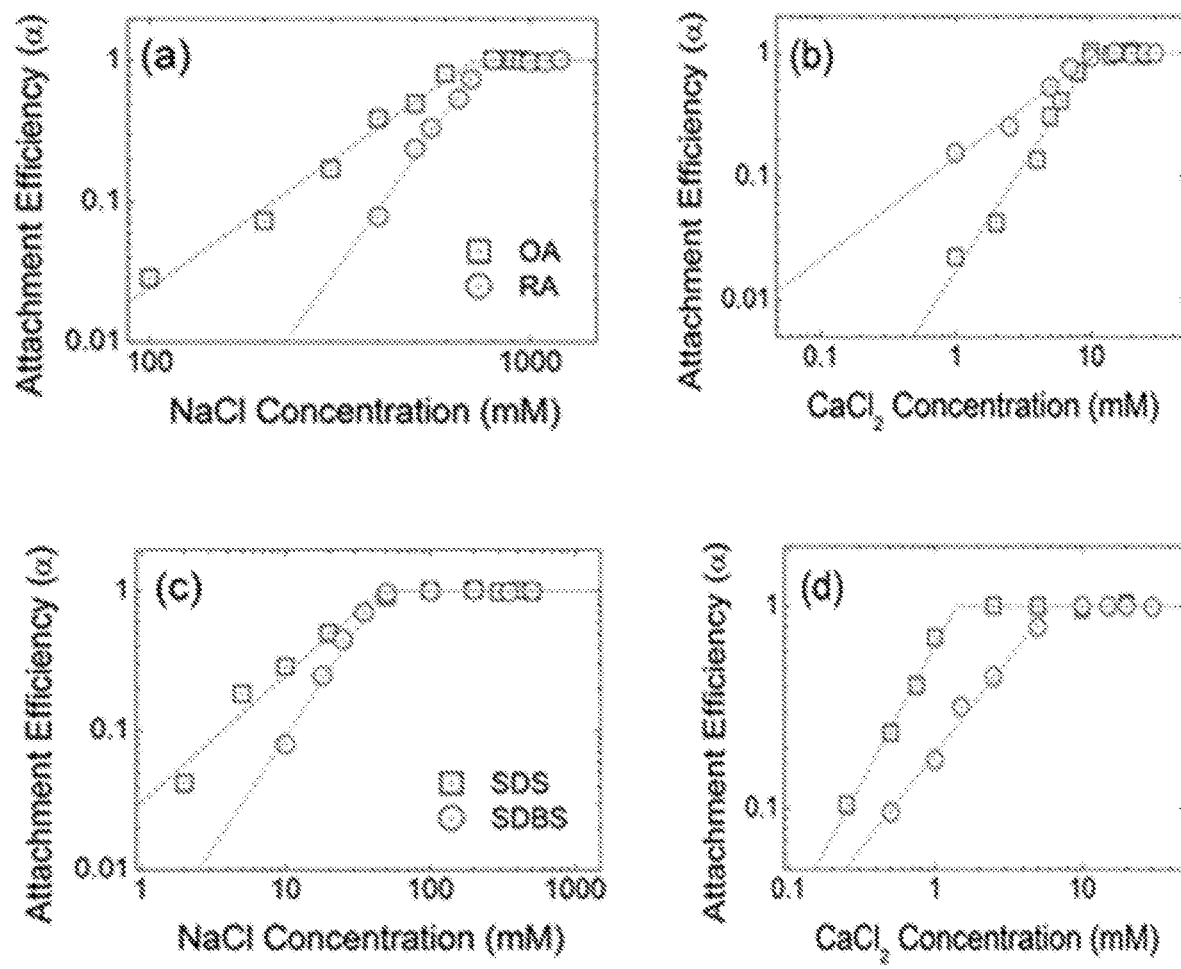
FIG. 22 depicts an exemplary embodiment of attachment efficiencies of OA-NPs and RA-NPs in accordance with the present disclosure.

Co-functional Surfactants. FIG. 22 compares the attachment efficiencies of oleic acid (OA), ricinoleic acid (RA), sodium dodecyl sulfate (SDS) and sodium dodecylbenzenesulfonate (SDBS) coated NPs similarly over a range of ionic strengths and types. FIG. 22 represents attachment efficiencies at pH 7 of OA-NPs and RA-NPs as functions of (a) NaCl and (b) $CaCl_2$ concentrations, and of SDS-NPs and SDBS-NPs as functions of (c) NaCl and (d) $CaCl_2$ concentrations. Ricinoleic acid has one more hydroxyl group compared to oleic acid, offering additional negative charge and additional Debye forces within the bilayer. The CCC values of RA-NPs (746 mM NaCl and 10.8 mM $CaCl_2$) are higher than that of OA-NPs (710 mM NaCl and 10.6 mM $CaCl_2$). The CCC value of SDS-NPs (45 mM) is similar to that of SDBS-NPs (46 mM) for NaCl. However, in the presence of $CaCl_2$, the CCC value of SDBS-NPs (6 mM) is relatively higher than that of SDS coated NPS (1.4 mM). This may be due to the cation-π interaction between electron rich benzene group from the SDBS and divalent calcium cation. The aggregation kinetics and CCC values of bilayer coated iron oxide NPs are dramatically different from each other, highlighting the significant importance of the capping layer on the surface functionality and colloidal stability of engineered NPs.

Figure 23:
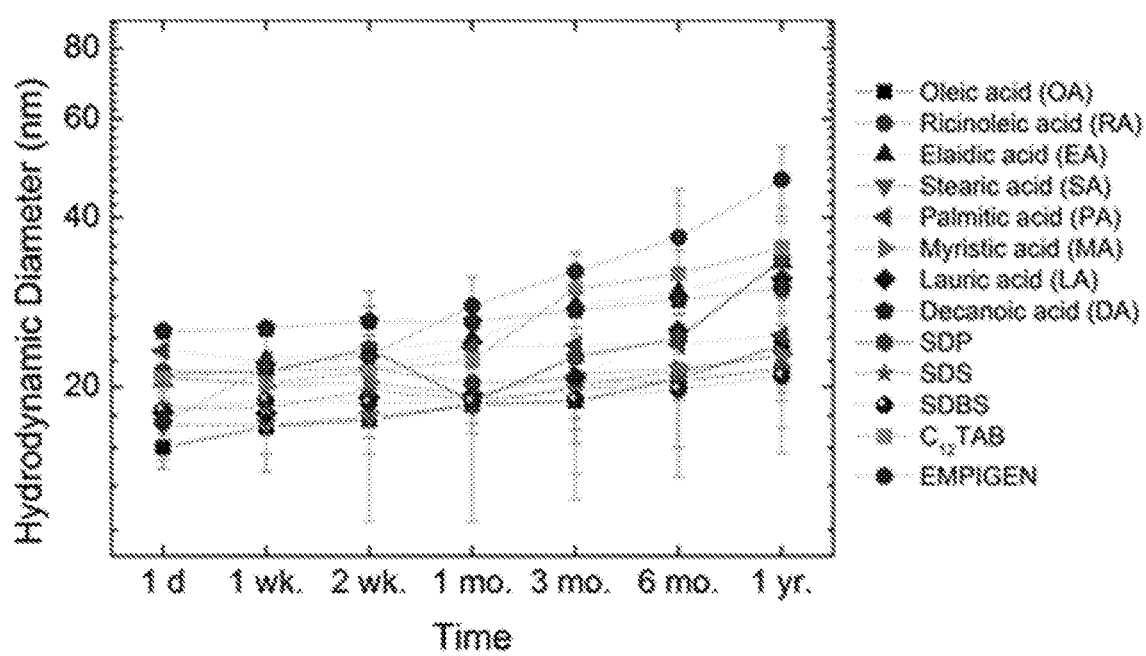
FIG. 23 depicts an exemplary embodiment of long-term stability of bilayer coated NPs in accordance with the present disclosure.

Long-term Stability. In addition to short-term aggregation, long-term stability of all materials in water is also disclosed herein. Libraries of samples were sealed and stored in the dark at room temperature and DLS size measurements were taken at 1 day (d), 1-2 weeks (wk), 1-6 months (mo) and 1 year (yr). FIG. 23 shows the change in hydrodynamic diameter of NPs as a function of time and reflects the long-term stability of the bilayer coated NPs in ultrapure water. The initial hydrodynamic diameters for these NPs were around 20 nm and the sizes were still below 50 nm after one year of storage. For example, RA coated NPs demonstrate negligible size change (<2 nm) during the entire time (one year).

Sorption Density of Iron Oxide Nanocrystals: Other Metals

In some embodiments, the aqueous applications of the nanocrystals can be applied to other metals besides uranium. That is, the nanocrystals can be used for sorption of, for example, lanthanides and rare earth elements (such as lanthanum and cerium), actinides (such as uranium), and heavy metals, such as arsenic and/or chromium.

Figure 24:
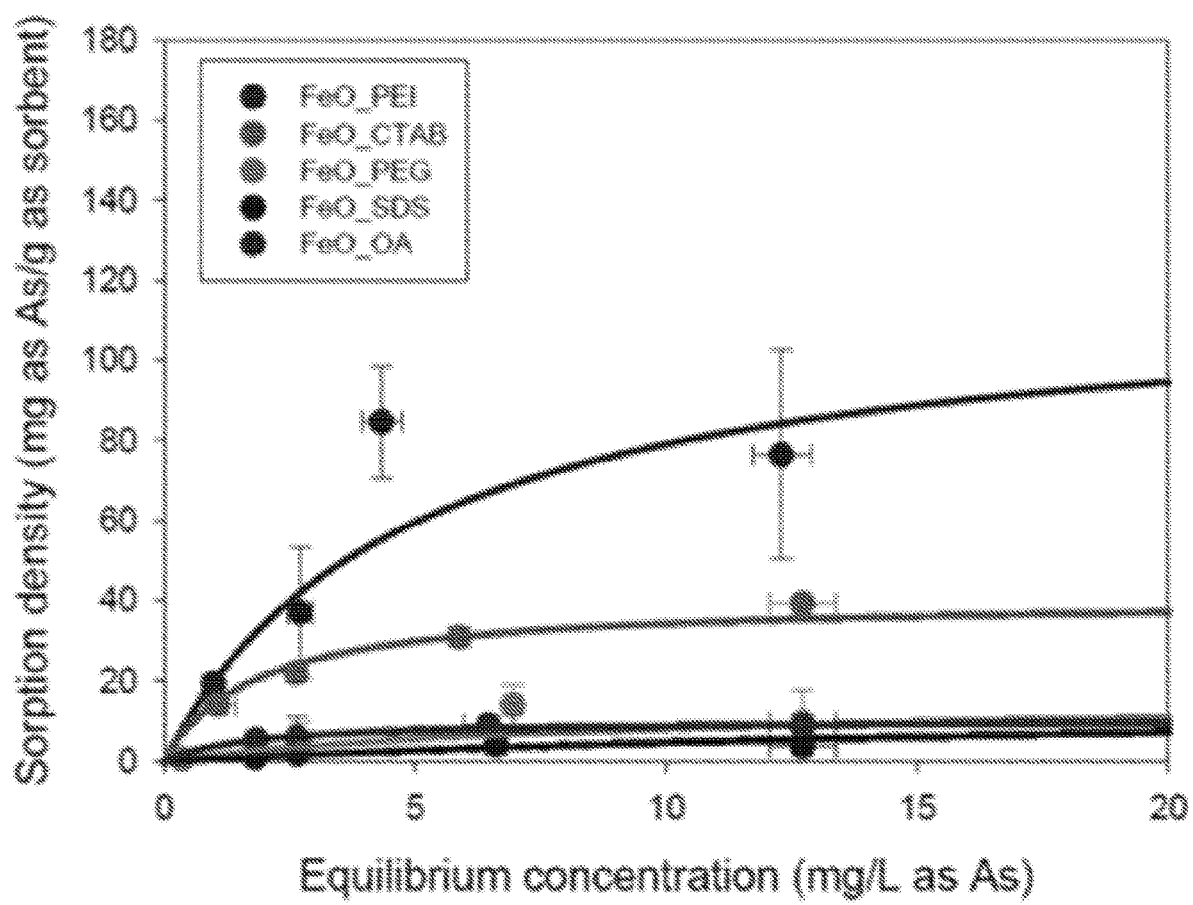
FIG. 24 depicts an exemplary embodiment of sorption density of arsenic (As) for iron oxide nanocrystals (functional group dependent sorption behavior @ pH 7) in accordance with the present disclosure.

FIG. 24 shows sorption density of iron oxide nanocrystals with respect to arsenic (As). The functional group dependent sorption behavior @ pH 7 shows that iron oxide encapsulated by a cationic polymer matrix performed better with respect to As sorption density than the particles coated with anionic (or negatively charged) surface stabilizers. Functional group dependent As sorption capacity information is given in Table 18.

TABLE 18

Sorption behavior of arsenic (As) @ pH 7 for iron oxide nanocrystals with different functional groups.

|  | $Q_{max}$ | $K_L$ | $R_{square}$ |
| --- | --- | --- | --- |
| CTAB | 40.37 | 0.56 | 0.966 |
| PEG | 15.29 | 0.12 | 0.973 |
| SDS | 16.37 | 0.04 | 0.940 |
| OA | 10.33 | 0.58 | 0.928 |
| PEI | 117.63 | 0.20 | 0.976 |

Figure 25:
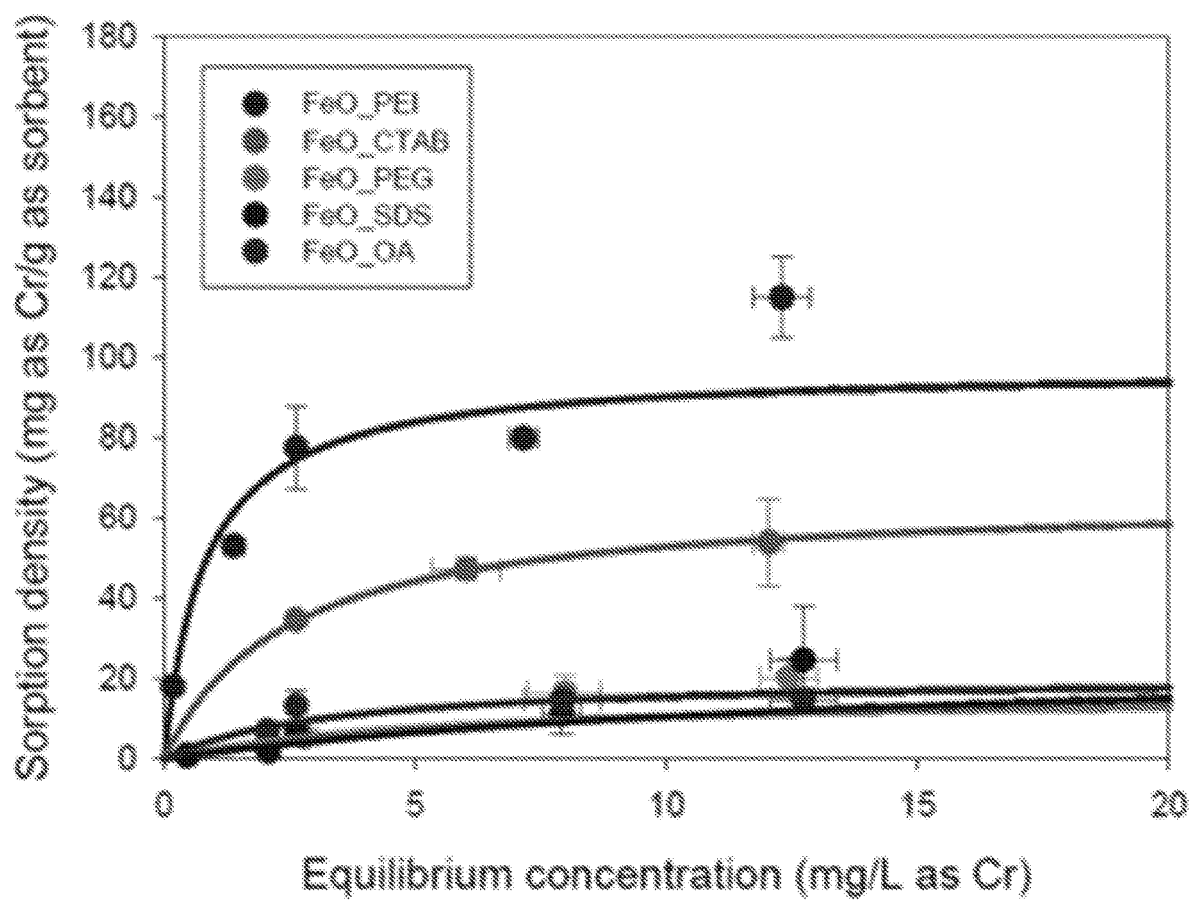
FIG. 25 depicts an exemplary embodiment of sorption density of chromium (Cr) for iron oxide nanocrystals (functional group dependent sorption behavior @ pH 7) in accordance with the present disclosure.

FIG. 25 shows sorption density of iron oxide nanocrystals with respect to chromium (Cr). The functional group dependent sorption behavior @ pH 7 shows that iron oxide encapsulated by a cationic polymer matrix performed better with respect to Cr sorption density than the particles coated with anionic (or negatively charged) surface stabilizers. Functional group dependent Cr sorption capacity information is given in Table 19.

TABLE 19

Sorption behavior of chromium (Cr) @ pH 7 for iron oxide nanocrystals with different functional groups.

|  | $Q_{max}$ | $K_L$ | $R_{square}$ |
| --- | --- | --- | --- |
| CTAB | 65.4 | 0.41 | 0.997 |
| PEG | 16.58 | 0.17 | 0.960 |
| SDS | 26.32 | 0.07 | 0.954 |
| OA | 20.62 | 0.30 | 0.566 |
| PEI | 97.44 | 1.28 | 0.993 |

Figure 26:
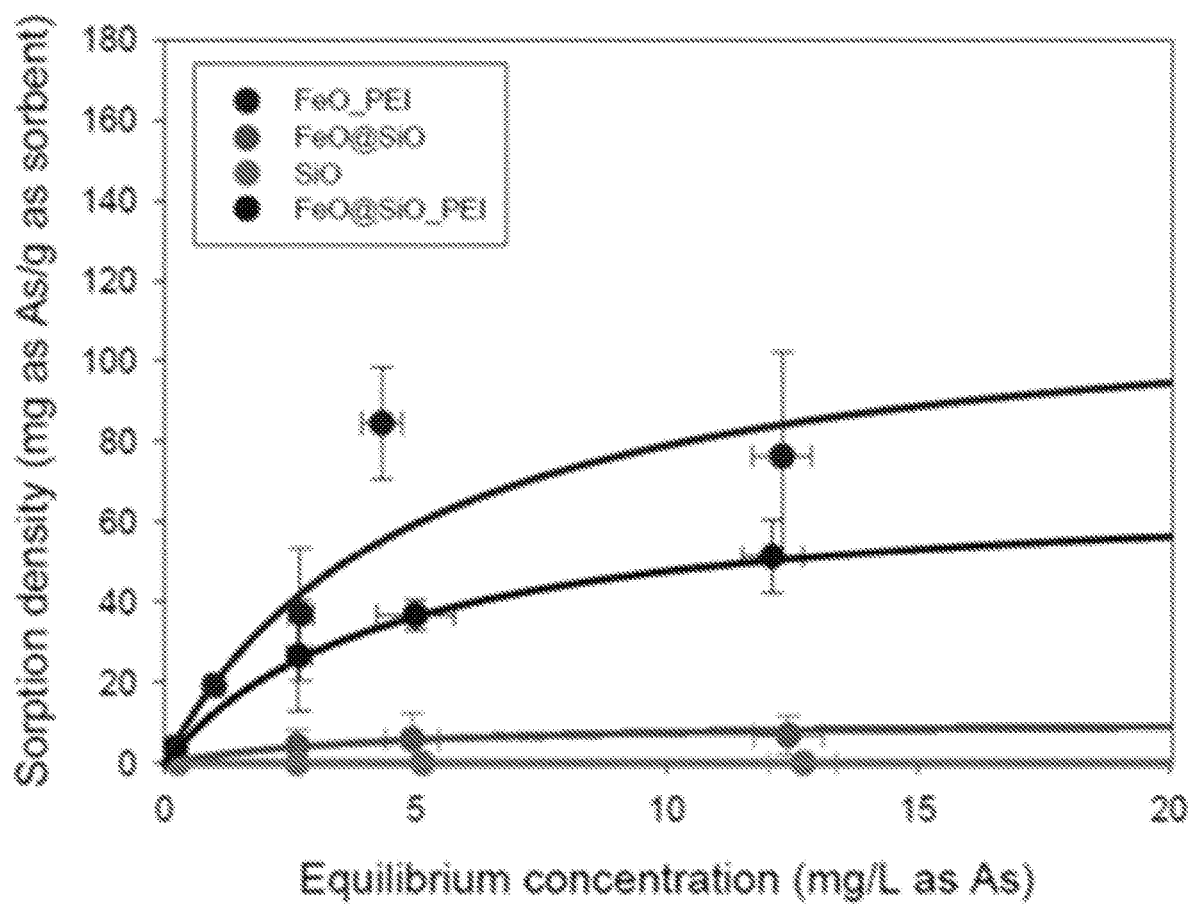
FIG. 26 depicts an exemplary embodiment of sorption density of arsenic (As) for iron oxide nanocrystals (bare silica vs. surface modified silica sorption behavior @ pH 7) in accordance with the present disclosure.

FIG. 26 shows a comparison of arsenic (As) sorption density of iron oxide nanocrystals between bare silica surface and modified silica surface. Silica coating on the nanocrystal (completely) prevented As sorption on the particle. However, the silica modified with cationic polymer enhanced As sorption capacity. Quantitative analysis of localized As may also be calculated. Bare silica surface versus modified silica surface dependent As sorption capacity is given in Table 20.

TABLE 20

Sorption density of iron oxide nanocrystals: arsenic (As). Sorption behavior @ pH 7; bare silica vs. surface modified silica.

|  | $Q_{max}$ | $K_L$ |
| --- | --- | --- |
| Bare $SiO_2$ | 0.64 | 0.01 |
| FeO@$SiO_2$ | 11.20 | 0.21 |

TABLE 20-continued

Sorption density of iron oxide nanocrystals: arsenic (As). Sorption behavior @ pH 7; bare silica vs. surface modified silica.

| | $Q_{max}$ | $K_L$ |
|---|---|---|
| Fe$_3$O$_4$@PEI25K | 117.63 | 0.20 |
| Fe$_3$O$_4$@ SiO$_2$@PEI25K | 68.97 | 0.22 |

Figure 27:
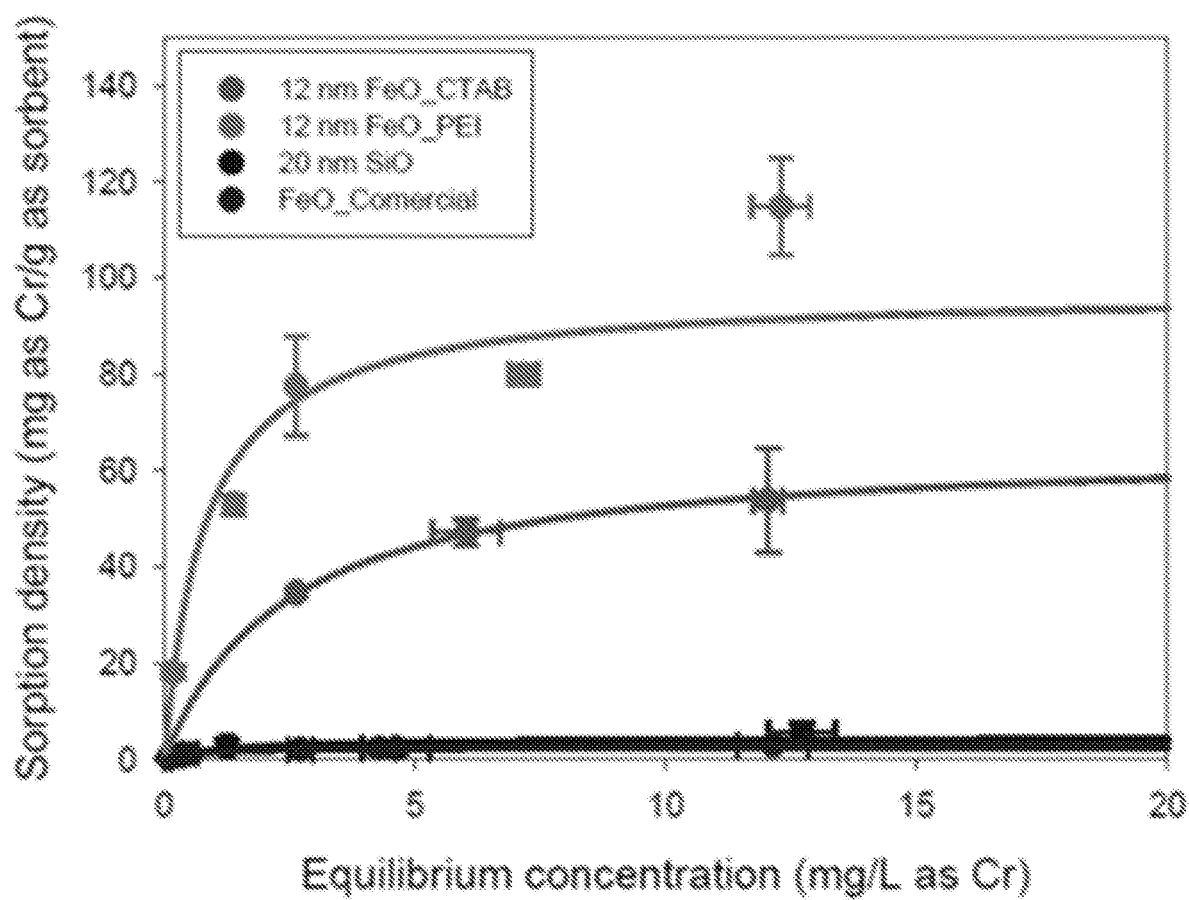
FIG. 27 depicts an exemplary embodiment of sorption density of chromium (Cr) for iron oxide nanocrystals (bare silica vs. surface modified silica sorption behavior @ pH 7) in accordance with the present disclosure.

FIG. 27 shows a comparison of chromium (Cr) sorption density of iron oxide nanocrystals between bare silica surface and modified silica surface. Quantitative analysis of the localized As may also be calculated. Bare silica surface versus modified silica surface dependent Cr sorption capacity is given in Table 21.

TABLE 21

Sorption density of iron oxide nanocrystals: chromium (Cr). Sorption behavior @ pH 7; bare silica vs. surface modified silica.

| | $Q_{max}$ | $K_L$ |
|---|---|---|
| 12 nm Fe$_3$O$_4$@CTAB | 65.4 | 0.41 |
| 12 nm Fe$_3$O$_4$@PEI25K | 97.4 | 1.24 |
| Bare SiO$_2$ | 4.41 | 0.82 |
| Fe$_3$O$_4$_Commercial | 2.56 | 1.37 |

Figure 50:
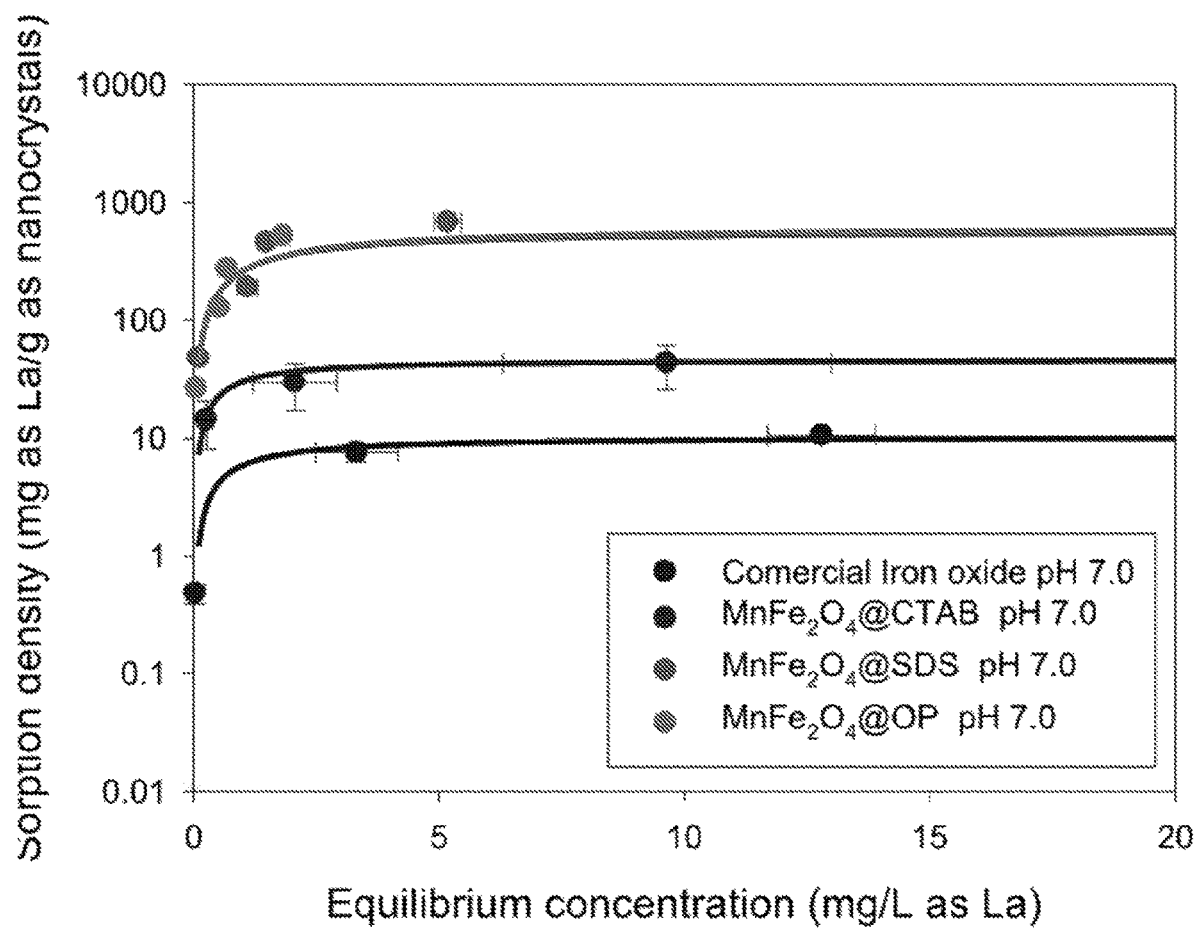
FIG. 50 depicts an exemplary embodiment of sorption density of lanthanum (La) for iron oxide nanocrystals (functional group dependent sorption behavior @ pH 7) in accordance with the present disclosure.
Figure 51:
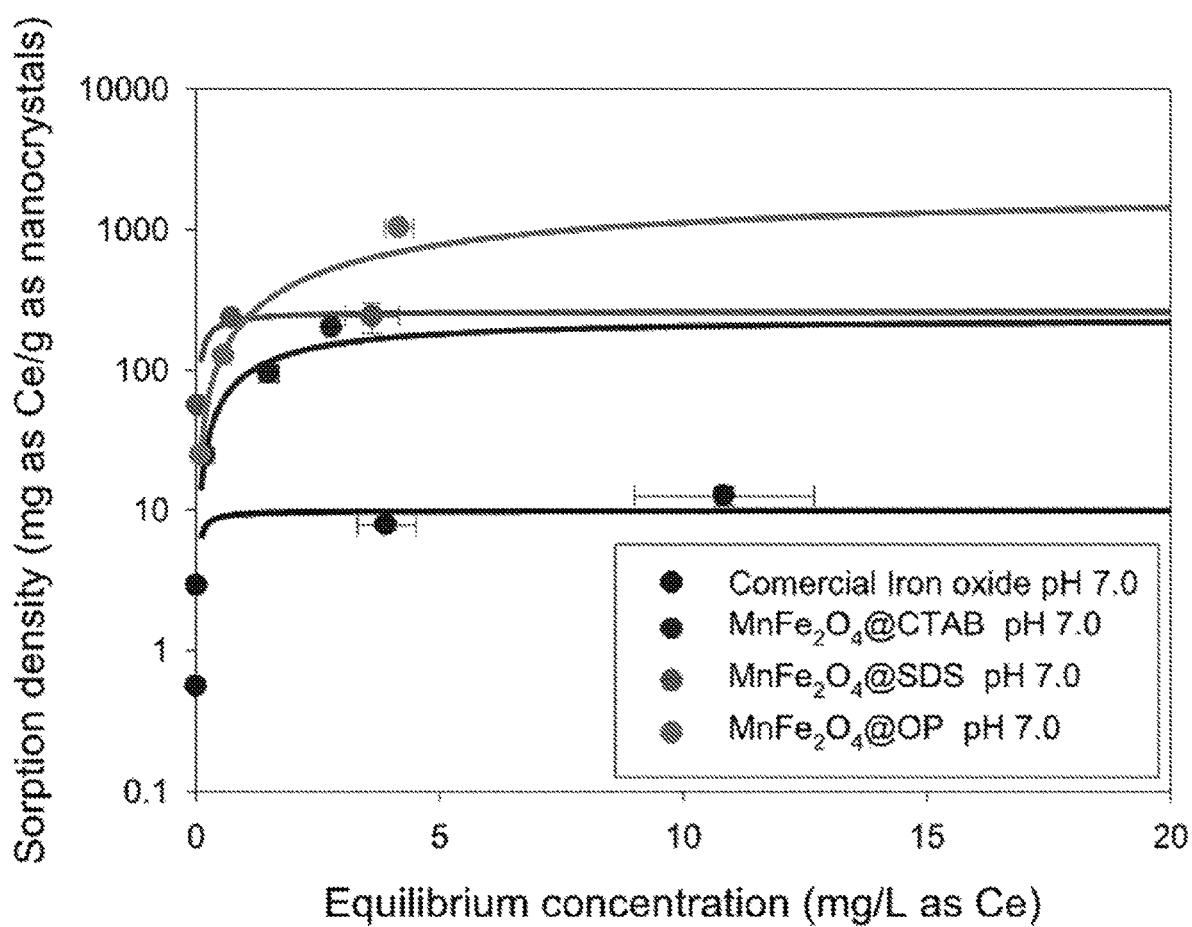
FIG. 51 depicts an exemplary embodiment of sorption density of cerium (Ce) for iron oxide nanocrystals (functional group dependent sorption behavior @ pH 7) in accordance with the present disclosure.

Additionally, FIG. 50 shows sorption density of iron oxide nanocrystals with respect to lanthanum (La). FIG. 51 shows sorption density of iron oxide nanocrystals with respect to cerium (Ce). Lanthanum and cerium may be categorized as both lanthanides and rare earth elements, and can be mined from waste material such as coal fly ash.

Surface Functionalized Manganese Ferrite Nanocrystals for Enhanced Uranium Sorption and Separation in Water Developments in nanoscale engineering allows for molecular scale optimization of reactivity, sorption, and magnetism, among other properties, for advanced, material-based environmental applications, including sorption, separation, and sensing of radionuclides. As described herein, monodisperse nanoscale manganese ferrite crystals (MnFe$_2$O$_4$) are engineered for ultra-high capacity environmental sorption and subsequent separation of uranyl in water. System optimization was explored as a function of nanocrystal (core) composition, surface coating(s), and water chemistry. 11 nm MnFe$_2$O$_4$ nanocrystals, which were colloidally stabilized via engineered oleyl-based surface bilayers, exhibit extreme, yet specific, uranium binding capacities while remaining monomerically stable under environmentally relevant conditions (water chemistries), which are key for application. In particular, MnFe$_2$O$_4$ cores with oleyl phosphate (as the outer facing layer) bilayers demonstrate preferential uranium binding of >150% (uranium weight)/(particle system weight) while being highly water stable in elevated ionic strengths/types and pH (up to 235.4 ppm (10.24 mM) of NaCl and 51.3 ppm (1.28 mM) of CaCl$_2$, in addition to 60 ppm of Uranyl, pH 5-9). Further, when normalized for size and surface coatings, MnFe$_2$O$_4$ nanocrystals have significantly enhanced sorption capacities compared to Mn$_2$FeO$_4$, Fe$_3$O$_4$ and manganese oxide core analogs. Mechanistically, uranium sorption enhancement is not only due to thermodynamically favorable interfacial interactions (for both particle and selected bilayer coatings), but is also due to significant uranyl reduction at the particle interface itself. Uranium sorption capacities for optimized systems described are the highest of any material reported to date.

Uranium sorption behavior is described herein for serially developed engineered monodisperse manganese ferrite nanocrystals (MnFe$_2$O$_4$), and which are water stabilized via ordered organic surface coatings. Decomposition of metal oleate precursors (both manganese and iron oleates) at 320° C. resulted in monodisperse manganese ferrite nanocrystals with varying composition ratios of manganese to iron (from iron rich manganese ferrite (Mn$_{0.2}$Fe$_{2.8}$O$_4$) to manganese rich manganese ferrite (Mn$_{2.9}$Fe$_{0.1}$O$_4$)). Synthesized nanocrystals were phase transferred to water through ligand (ordered bilayers) encapsulation and ligand (single layer) exchange methods for aqueous-based uranium sorption evaluation(s) under environmentally relevant aqueous chemistries (e.g., pH and ionic strength/type). Materials surface stabilized with oleyl (based) molecules demonstrated significant, yet specific, uranium sorption capacities in addition to high colloidal stabilities in model waters. Mechanistically, in addition to ligand and surface (ligand) binding, uranyl (VI) undergoes significant reduction to U(IV) at the ferrite interface. Uranyl sorption capacities for these materials are the highest of any material reported to date.

Figure 28:
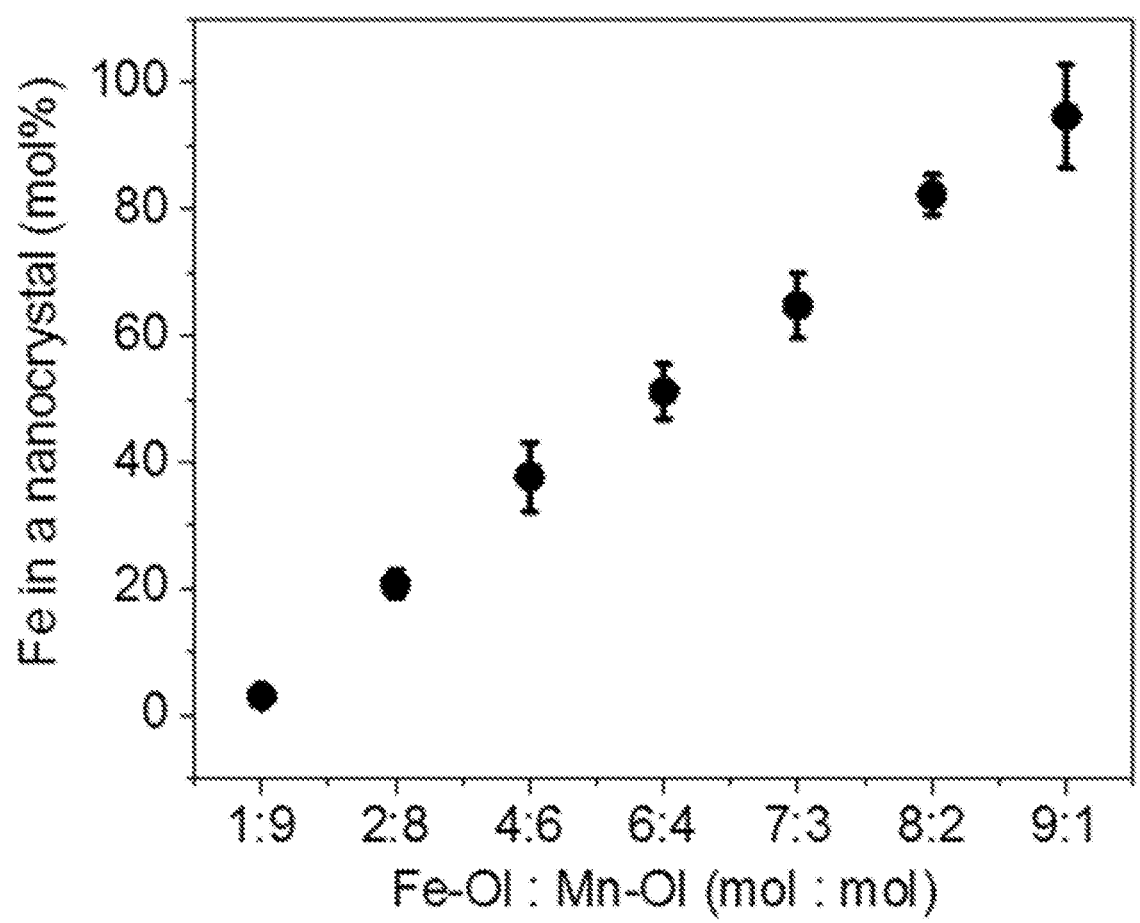
FIG. 28 depicts an exemplary embodiment of composition control of manganese iron oxide nanocrystals in accordance with the present disclosure.
Figure 29:
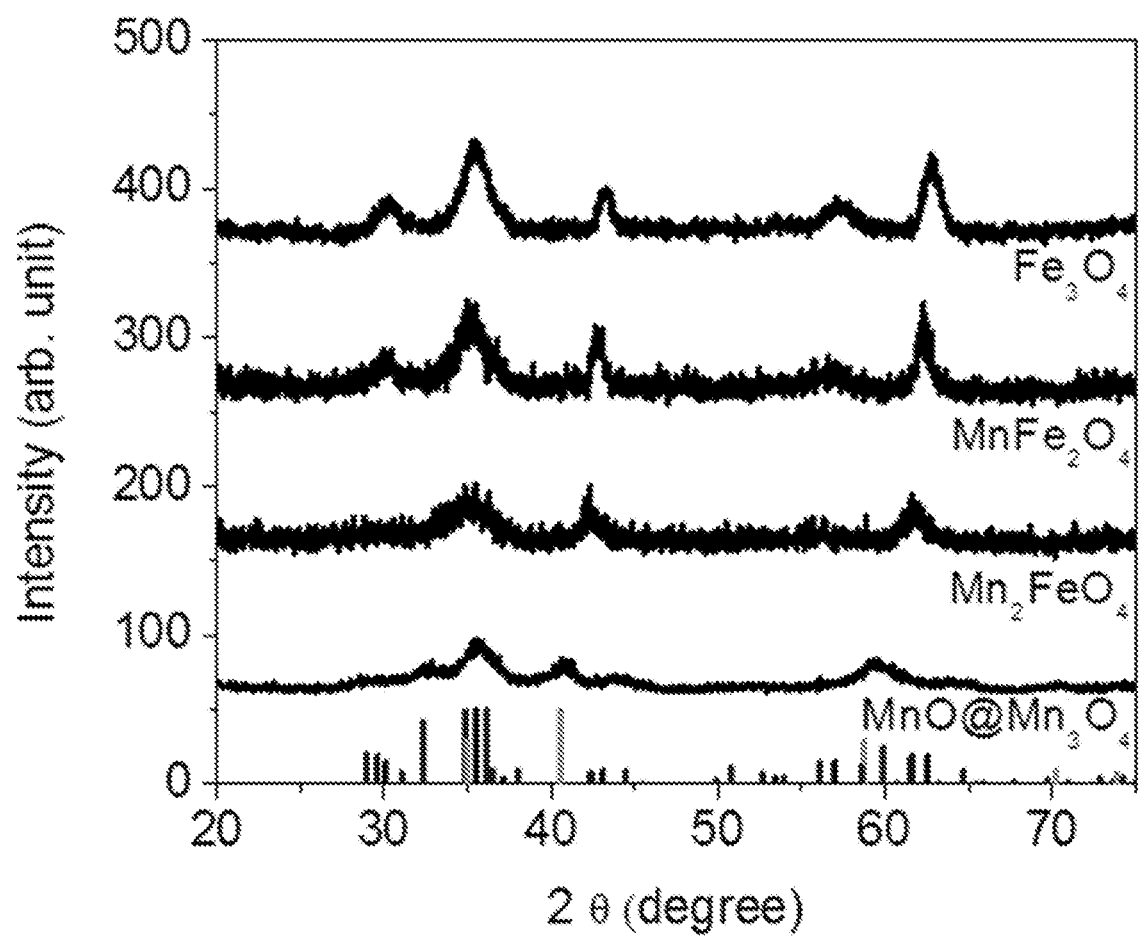
FIG. 29 depicts an exemplary embodiment of crystal structures of composition controlled manganese iron oxide nanocrystal samples in accordance with the present disclosure.

Synthesis and Phase Transfer of Manganese Ferrite Nanocrystals. Manganese iron oxides (manganese ferrites) may be precisely synthesized via incorporation of divalent manganese, Mn$^{2+}$, into the spinel lattice structure of an iron oxide via thermal decomposition of manganese and iron precursors at a temperature over 300° C. This procedure is similar to the synthetic method of various binary ferrite nanocrystals (M$_x$Fe$_y$O$_4$, M=Mg, Cr, Fe, Co, Ni, and Zn) through non-aqueous, high temperature processes. For materials described herein, mixed metal precursors of iron and manganese oleates can be used in the presence of oleic acid, which acts as a surface stabilizer (in 1-octadecene). Both manganese and iron oleates, begin decomposing at elevated temperature (240~260° C.) with monodispersed nanocrystals (under 10% dispersity) forming at 320° C., while allowing for controllable molar ratios between (final) manganese and iron particle content(s). As synthesized, MnFe$_2$O$_4$ nanocrystals (e.g., 11.0±1.0 nm) are Mn—Fe alloyed crystal structures. The composition between manganese and iron of the nanocrystal may be systematically controlled by the ratio of manganese oleate to iron oleate during synthesis; increasing ratio of manganese to iron precursors results in a higher ratio of manganese to iron in the final nanocrystals (FIG. 28). FIG. 28 illustrates composition control of manganese iron oxide nanocrystals. The molar percentage iron in the nanocrystal increases with elevated ratio of iron precursor (iron oleate, Fe-Ol) to manganese precursor (manganese oleate, Mn-Ol). High resolution-transmission electron microscopy (HR-TEM) images of manganese ferrite nanocrystals indicated a high degree of crystallinity with a lattice distance plane of 0.252 nm, for example. XRD diffraction analysis indicated that iron rich manganese ferrite (MnFe$_2$O$_4$) and manganese rich ferrite (MnFe$_2$O$_4$) nanocrystals are similar in structure to parent Fe$_3$O$_4$ and manganese oxide (Mn$_x$O$_y$ as MnO@Mn$_3$O$_4$) but shifted, as expected, when mixed (FIG. 29). Crystal structures of composition controlled manganese iron oxide nanocrystal samples are shown in FIG. 29. Peaks of manganese iron oxide samples (MnFe$_2$O$_4$ and Mn$_2$FeO$_4$) shifted more to manganese ferrite (MnFe$_2$O$_4$; JCPDS #38-0430 (blue in original color image)) manganese oxide phase (MnO@ Mn$_3$O$_4$; JCPDS #07-0230 (yellow in original color image) for MnO and JCPDS #24-0734 (wine in original color image) for Mn$_3$O$_4$) from iron oxide phase (Fe$_3$O$_4$;

JCPDS #19-0629 (black in original color image)) as the composition ratio of manganese to iron in the nanocrystal structure increased.

Figure 30:
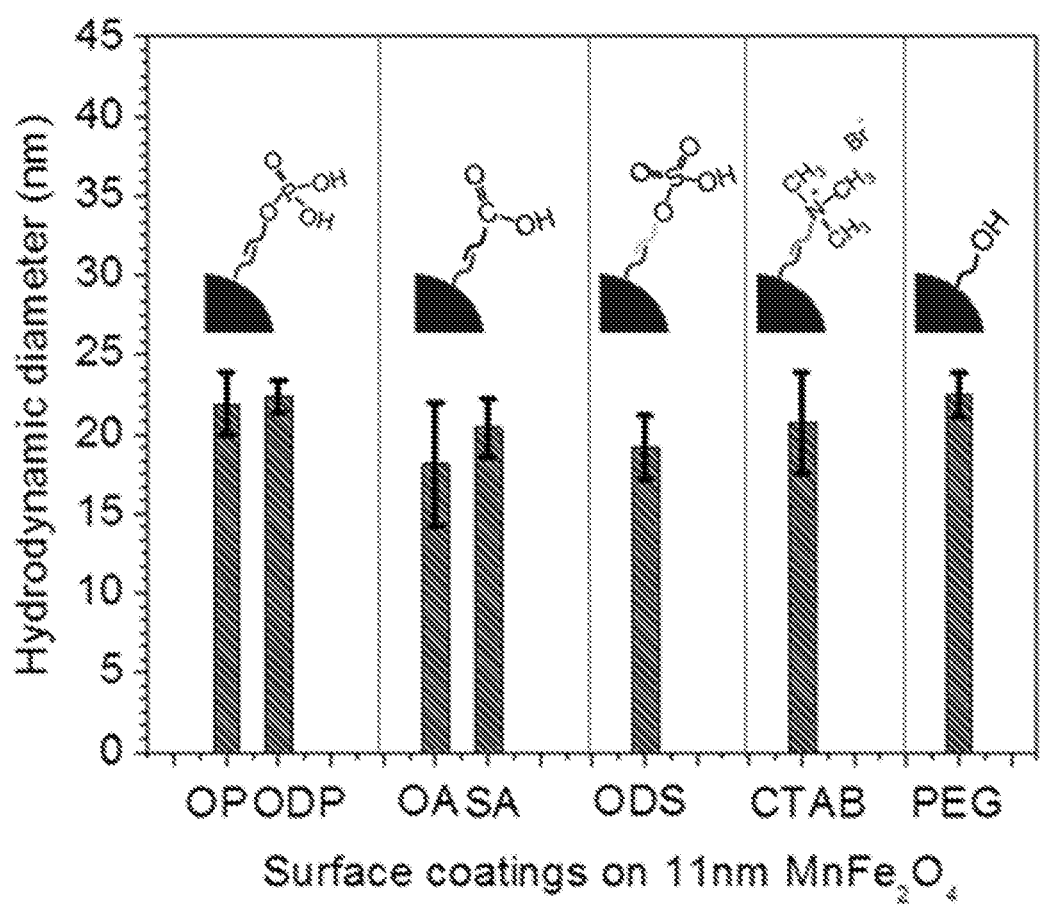
FIG. 30 depicts an exemplary embodiment of hydrodynamic diameters of phase transferred manganese iron oxide ($MnFe_2O_4$) nanocrystals in accordance with the present disclosure.

For aqueous applications, synthesized materials must be phase transferred from the organic reaction matrix into water. Ligand encapsulation and exchange methods can be used to render the surface of the nanocrystals effectively hydrophilic. By capping nanocrystals with oleic acid (hydrophobic tail facing outwards) in nonpolar organic solvents (1-octadecene and/or hexane), as-synthesized nanocrystal can be subsequently surface tailored with a second organic layer (forming a bilayer complex). Strong organic solvents and mixtures thereof may be preferred (e.g., 1-octadecene, hexane, toluene, and formaldehyde). The second, outward facing molecular layer, which is typically a long chain (C8-C20) organic acid (head group), is stabilized through van der Waals forces with the hydrophobic tail of the oleic acid, with outward facing, hydrophilic head (functional) groups (phosphate, carboxyl, sulfonyl, amine group, etc.) as depicted in FIG. 30. FIG. 30 illustrates hydrodynamic diameters of phase transferred manganese iron oxide ($MnFe_2O_4$) nanocrystals. 12 nm nanocrystals measured by TEM images were coated with various surface stabilizers; bilayered surface coating structures were achieved by surface encapsulation method using phosphonic acid functionalized (oleyl phosphate (OP) and octadecylphosphonic acid (ODP)), carboxylic acid functionalized (oleic acid (OA) and stearic acid (SA)), sulfate functionalized (octadecyl sulfate (ODS)), and amine group functionalized (CTAB) surface stabilizers. Single layered surface coating structures were formed by ligand exchange method using polyethylene glycol (PEG200). The average hydrodynamic diameters of all phase transferred nanocrystal samples were from 18 to 22 nm. Additionally, the hydrophobic surface coatings (oleic acids) on as-synthesized nanocrystal can simply be replaced at the surface with hydrophilic surface coating materials, such as poly (ethylene glycol), via ligand exchange methods. Based on such strategies, not only can engineered nanocrystal surfaces be systematically 'flipped' from hydrophobic to hydrophilic, but can also allow for controlled surface coating thickness, functionality (head) group, and net surface charge. Such flexibility is demonstrated using oleyl phosphate (OP), octadecyl phosphonic acid (ODP), oleic acid (OA), stearic acid (SA), octadecyl sulphate (ODS), cetyltrimethylammonium bromide (CTAB), and polyethylene glycol (PEG) with a molecular weight of 200 (PEG200).

FIG. 30 depicts the structure and surface functionality of prepared material libraries with single and double (bi-) layered surface coatings. Resulting water-stable particles were characterized by dynamic light scattering (DLS) and zeta potential measurements to determine the hydrodynamic size and surface charge, respectively. DLS measurements indicate thin and compact surface structures for all coatings evaluated (organic acid containing 18 carbon chains (both saturated and unsaturated carbon chains) and low molecular weight polyethylene glycol (PEG 200)). Oleyl phosphate, octadecylphosphonic acid, oleic acid, stearic acid, octadecyl sulfate, CTAB, and PEG200 coated nanocrystalline manganese ferrites of 11 nm core diameter showed hydrodynamic diameters of 21.9±2.0, 22.4±1.0, 18.1±3.9, 20.4±1.8, 19.2±2.0, 20.7±3.2, and 22.5±1.4 nm, respectively. The zeta potential of oleyl phosphate, octadecylphosphonic acid, oleic acid, stearic acid, octadecyl sulfate, CTAB, and PEG200 coated manganese oxide nanocrystals were −62.9±1.7, −43.0±1.9, −46.7±0.7, −37.9±4.7, −48.5±3.3, 54.8±1.5, and −14.7±1.6 mV, respectively.

Figure 31:
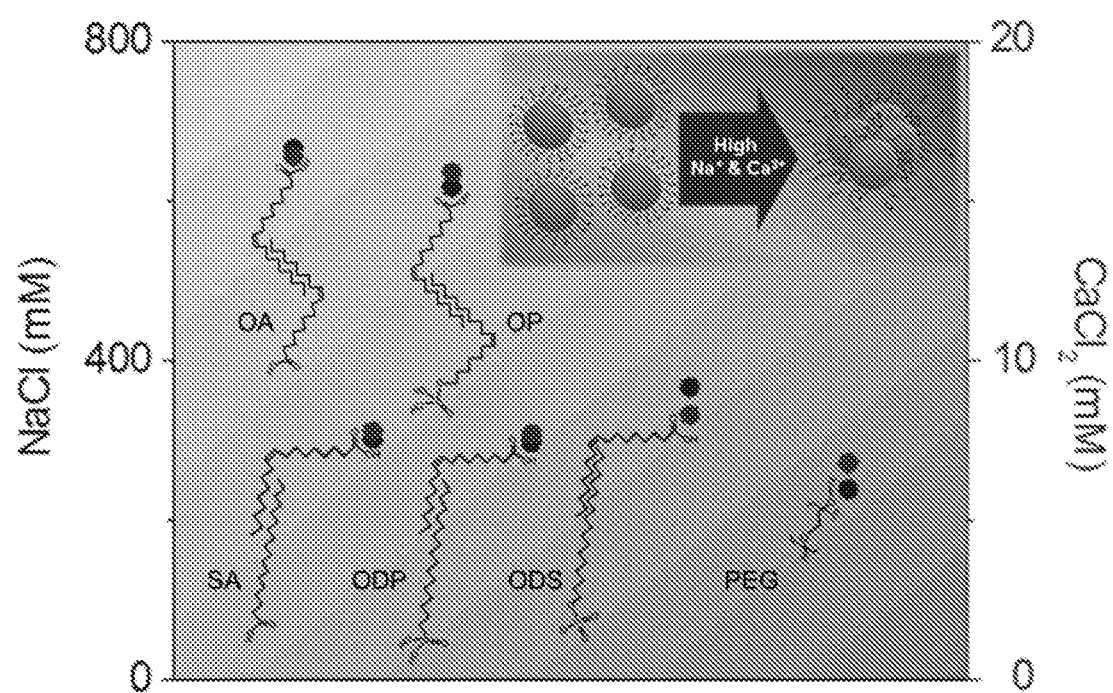
FIG. 31 depicts an exemplary embodiment of attachment efficiency (a) as a function of mono-/di-valent salt concentrations for both bilayered- and pegylated-$MnFe_2O_4$ nanocrystals in accordance with the present disclosure.

Colloidal stability, which is key for aqueous applicability, of stabilized nanocrystalline manganese ferrites was examined in terms of nanocrystal aggregation kinetics in the presence of environmentally relevant salts. FIG. 31 represents attachment efficiency (a) as a function of mono-/divalent salt concentrations (NaCl (blue in original color image) and $CaCl_2$ (red in original color image)) for both bilayered- and pegylated-$MnFe_2O_4$ nanocrystals. The attachment efficiency (a) for each nanocrystal sample was calculated by measuring the aggregation rates of the particles as a function of time and salt concentrations. The nanocrystal concentration employed was $2.5 \times 10^{12}$ nanocrystals/L. The inset image shows nanocrystal aggregation at high ionic strength condition. As shown in FIG. 31, the hydrodynamic diameter of the nanocrystals were monitored as a function of time in the presence of increasing ionic strengths (using sodium and calcium) to determine the critical coagulation concentrations (CCC) for each nanocrystal sample. Relatively high CCC values (i.e. high particle stability) in the presence of NaCl and $CaCl_2$ were observed for ferrite nanocrystals coated with unsaturated-unsaturated (C9-C10 double bond, typical for a number of oleyl-based molecules) carbon chain linked bilayered surface coating structures, such as oleic acid bilayered $MnFe_2O_4$ ($MnFe_2O_4$@OA) and oleic acid-oleylphosphate linked $MnFe_2O_4$ ($MnFe_2O_4$@OP), as depicted in FIG. 31. However, unsaturated-saturated carbon chain (oleic acid, which is the 1st (inner) layer formed by organic reaction, lined with saturated carbon chain composed of sp3 C18) linked bilayer structures, (such as, $MnFe_2O_4$@SA, $MnFe_2O_4$@ODP, and $MnFe_2O_4$@ODS) and pegylated-nanocrystals revealed lower CCC values for both NaCl and $CaCl_2$. The cis (oleyl) forms of unsaturated-unsaturated oleyl carbon chains enhance bilayer structure stability due, in part, to increased order and van der Waals interactions, and thus lower (molecular) degree(s) of freedom for the second layer, compared to unsaturated-saturated carbon chains. High colloidal stability of similar unsaturated-unsaturated carbon chain linked bilayered surfaces (compact oleic acid bilayer surface coatings) for nanocrystalline oxide materials at varied pH (from 4 to 10), ionic strength (from 0.01 to 1 M), and temperature (from 10 to 100° C.) has been shown. As shown in FIG. 31, CCC values of NaCl and $CaCl_2$ for each nanocrystal structure were 665.8 mM of NaCl and 16.4 mM of $CaCl_2$ for $MnFe_2O_4$@OA, 617.4 mM of NaCl and 15.9 mM of $CaCl_2$ for $MnFe_2O_4$@OP, 301.8 mM of NaCl and 7.8 mM of $CaCl_2$ for $MnFe_2O_4$@SA, 297.9 mM of NaCl and 7.7 mM of $CaCl_2$ for $MnFe_2O_4$@ODP, 367.0 mM of NaCl and 8.3 mM of $CaCl_2$ for $MnFe_2O_4$@ODS, and 239.0 mM of NaCl and 6.8 mM of $CaCl_2$ for $MnFe_2O_4$@PEG.

Figure 32:
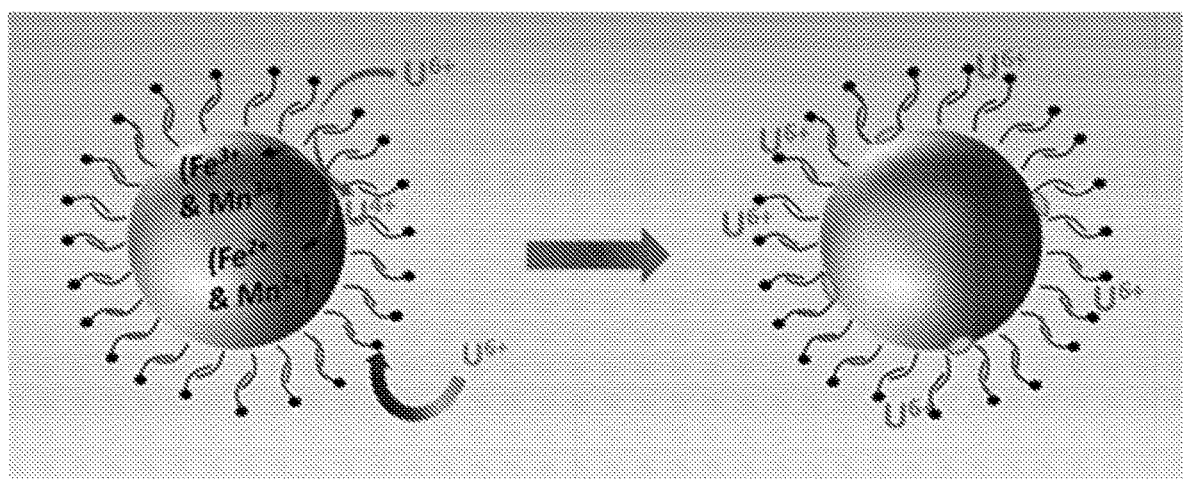
FIG. 32 depicts an exemplary embodiment of uranium adsorption on nanocrystalline $MnFe_2O_4$ in accordance with the present disclosure.

Uranium Sorption. Water stabilized monodisperse manganese ferrite nanocrystals were evaluated for uranium adsorption and separation performance under environmentally relevant, aqueous conditions (at varied pH and ionic strength conditions). For example, uranium adsorption (by 11 nm $MnFe_2O_4$@OP) was qualitatively observed by elemental mapping analysis (GIF analysis), visualizing each element (manganese, iron, and uranium) after separation at the end of a sorption experiment (24 h batch sorption experiment). To systematically quantify sorption, batch isotherm experiments, exploring the roles of surface coating and the ferrite composition under environmentally relevant aquatic conditions, were compared. Uranyl may be sorbed by both the surface coating (e.g. a functional group) via electrostatic interaction and also bound to the surface inorganic core by coordinated physical-chemical sorption, which can be enhanced through redox reactions (FIG. 32). Uranium adsorption on nanocrystalline $MnFe_2O_4$ is shown in FIG. 32. Uranium species with high oxidation state (uranyl; U(VI), green in original color image) may bind to the negatively charged surface functional group of the nanocrystal by electrostatic interaction. When uranium (VI) meets with divalent metal ions (Fe (II) and/or Mn (II)) on the surface of the inorganic core of the nanocrystal structure, uranium (VI) is reduced, forming un-soluble precipitate (U(IV), orange in original color image).

Figure 33:
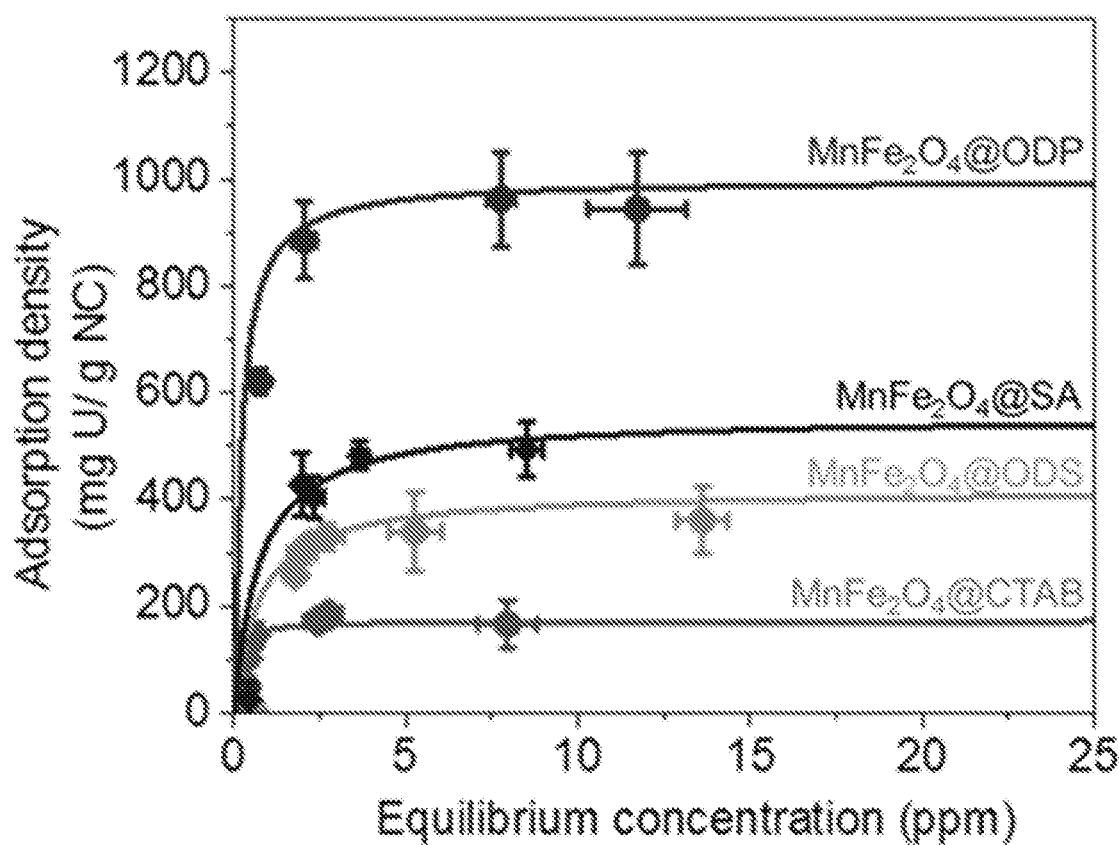
FIG. 33 depicts an exemplary embodiment of uranium sorption isotherms on bilayer structured $MnFe_2O_4$ nanocrystals in accordance with the present disclosure.

For functional group and charge dependent uranium adsorption measurements, the $MnFe_2O_4$ core was coated with varied bilayered surface structures (as phosphonic acid, carboxylic acid, sulfate and amine group functionalized) and evaluated at pH 5-9 (pH 7 results are shown in FIG. 33). Uranium sorption isotherms for bilayer structured (unsaturated-saturated carbon chain linked) $MnFe_2O_4$ nanocrystals are shown in FIG. 33. Uranium sorption measurements were performed on the nanocrystal samples coated with octadecylphosphonic acid (ODP, red in original color image), stearic acid (SA, blue in original color image), octadecylsulfate (ODS, yellow in original color image), and CTAB (green in original color image). Typical nanocrystal concentration was $2.3 \times 10^{15}$ nanocrystals/L in each sample at uranium (U(VI)) concentration from 0.1 to 40 mg/L at pH 7.0. All calculated uranium sorption capacity values were fitted by Langmuir isotherm equation (solid lines). The highest uranium sorption capacity of ca. 1000 mg U/g NC (milligram of U per gram of nanocrystals) was found to occur with a phosphonic acid group functionalized manganese ferrites ($MnFe_2O_4$@ODP); other negatively charged nanocrystal samples such as, stearic acid (SA) and octadecylsulphate (ODS) coated nanocrystals showed 555.6, and 400.0 mg U/g NC, respectively (Tables 22 and 23). The lowest adsorption value of uranium (172.4 mg U/g NC) was from the positively charged manganese ferrite nanocrystals ($MnFe_2O_4$@CTAB). Strong binding affinities of uranyl ($UO_2^{2+}$ and $UO_2(OH)^+$) to phosphonic acid and carboxyl groups are based on both electrostatic potentials and favorable uranyl-phosphate complexation chemistries.

When the phase (surface) transfer agents (phosphonic acid or carboxyl group containing organic acid) are in the form of an unsaturated carbon (oleyl-like) chains, $MnFe_2O_4$ nanocrystals revealed higher uranium sorption capacities as compared to saturated analogs: 1250 mg U/g NC for oleyl phosphate coated- and 666.7 mg U/g NC of oleic acid coated-bilayer structured $MnFe_2O_4$ nanocrystals at pH 7 and upwards of 1667 mg U/g NC at pH 5 ($MnFe_2O_4$, with oleyl phosphate outer layer) as shown in FIG. 34(A) and Table 24. Such an increase in sorption is, in part, due to the enhanced particle stabilities for oleyl-based bilayer structures, as discussed above.

TABLE 22

The maximum uranium sorption capacity (qmax, milligram of uranium per gram of nanocrystals), and the adsorption constant (k, liter per milligram) of pegylated and commercialized $MnFe_2O_4$ nanocrystal samples at pH 5.6, 7.0, and 8.5.

| | $MnFe_2O_4$@PEG200 | | | Commercial $MnFe_2O_4$ | | |
|---|---|---|---|---|---|---|
| pH | 5.6 | 7.0 | 8.5 | 5.6 | 7.0 | 8.5 |
| $q_{max}$ (mg of U/g of NC) | 217.4 | 140.8 | 91.7 | 7.5 | 6.6 | 4.9 |
| K (L/mg) | 0.8 | 1.3 | 1.6 | 1.6 | 7.2 | 0.5 |

TABLE 23

The maximum uranium sorption capacity (qmax, milligram of uranium per gram of nanocrystals), and the adsorption constant (k, liter per milligram) of bilayer structured (unsaturated- saturate carbon chain linked) $MnFe_2O_4$ nanocrystal samples coated with octadecylphosphonic acid (ODP), stearic acid (SA), octadecylsulfate (ODS), and CTAB at pH 5.6, 7.0, and 8.5.

| | $MnFe_2O_4$@ODP | | | $MnFe_2O_4$@SA | | | $MnFe_2O_4$@ODS | | | $MnFe_2O_4$@CTAB | | |
|---|---|---|---|---|---|---|---|---|---|---|---|---|
| pH | 5.6 | 7.0 | 8.5 | 5.6 | 7.0 | 8.5 | 5.6 | 7.0 | 8.5 | 5.6 | 7.0 | 8.5 |
| $q_{max}$ (mg of U/g of NC) | 1111.1 | 1000 | 909.1 | 666.7 | 555.6 | 416.7 | 416.7 | 400.0 | 285.7 | 178.6 | 172.4 | 151.5 |
| K (L/mg) | 4.5 | 5 | 2.2 | 0.8 | 1.4 | 4.8 | 1.3 | 1.4 | 0.4 | 6.2 | 9.6 | 9.4 |

TABLE 24

The maximum uranium sorption capacity (qmax, milligram of uranium per gram of nanocrystals), and the adsorption constant (k, liter per milligram) of bilayer structured (unsaturated-unsaturate carbon chain linked) $MnFe_2O_4$ nanocrystal samples coated with oleyl phosphate (OP) and oleic acid (OA) at pH 5.6, 7.0, and 8.5.

| | $MnFe_2O_4$@OP | | | $MnFe_2O_4$@OA | | |
|---|---|---|---|---|---|---|
| pH | 5.6 | 7.0 | 8.5 | 5.6 | 7.0 | 8.5 |
| $q_{max}$ (mg of U/g of NC) | 1666.7 | 1250 | 1000 | 909.1 | 666.7 | 434.8 |
| K (L/mg) | 0.9 | 1.4 | 0.7 | 1.1 | 1.1 | 0.2 |

Figure 34:
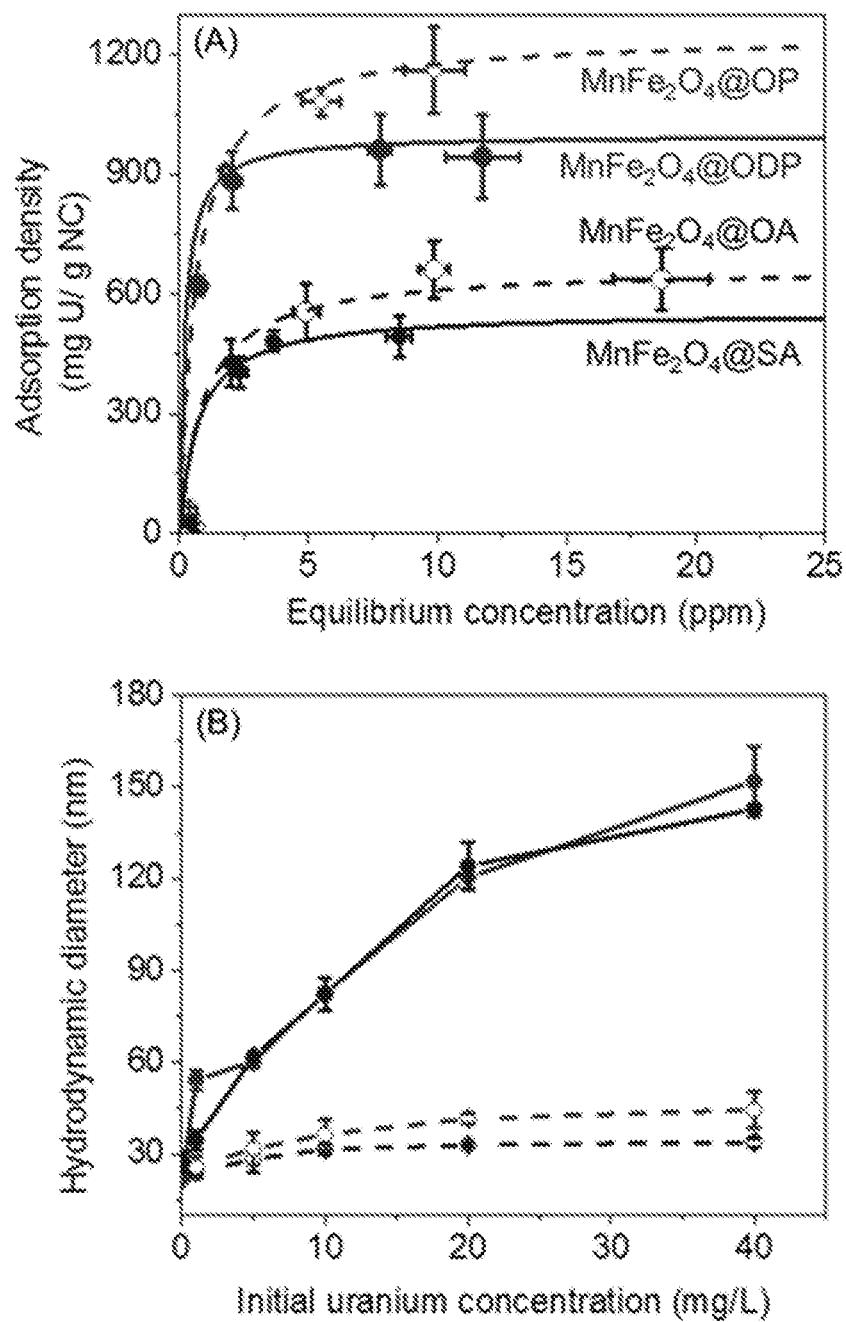
FIG. 34 depicts an exemplary embodiment of comparison of uranium adsorption on bilayer structured $MnFe_2O_4$ nanocrystals (unsaturated-saturated vs. unsaturated-unsaturated) in accordance with the present disclosure.

FIG. 34 compares uranium adsorption on bilayer structured (unsaturated-saturated (red and blue solid lines) vs. unsaturated-unsaturated (red and blue dotted lines) carbon chain linked) $MnFe_2O_4$ nanocrystals. (A) Uranium sorption measurements were performed with nanocrystal samples coated with oleyl phosphate (OP, red dot line in original color image), octadecylphosphonic acid (ODP, red solid line in original color image), oleic acid (OA, blue dot line in original color image), and stearic acid (SA, blue solid line in original color image); typical nanocrystal concentration was $2.3 \times 10^{15}$ nanocrystals/L with uranium (U(VI)) concentration from 0.1 to 40 mg/L at pH 7.0. All calculated uranium sorption capacity values were fitted by Langmuir isotherm equation. (B) Hydrodynamic diameters of each sample was monitored at elevated uranium concentration from 0.1 to 40 ppm of U(VI). As shown in FIG. 34(B), the hydrodynamic diameters of both the saturated-unsaturated and the unsaturated-unsaturated carbon chains linked bilayered $MnFe_2O_4$ nanocrystals were monitored as a function of uranium concentrations ranging from 0.1 to 40 ppm (from $4.25 \times 10^4$ to 0.17 mM after 24 h batch experiments. Both oleylphosphate-oleic acid and oleic acid-oleic acid linked bilayered $MnFe_2O_4$ nanocrystals maintained their colloidal stability over all concentrations evaluated.

Conversely, the saturated-unsaturated (ODP, SA) carbon chains linked bilayered nanocrystals readily aggregated in the presence of positively charged uranyl with resulting hydrodynamic diameters over 150 nm. This is consistent with the critical coagulation concentration values in the presence of mono-/di-valent ($Na^+/Ca^{2+}$) cations for libraries of the phase transferred nanocrystalline $MnFe_2O_4$. The highest (i.e. most stable) critical coagulation concentration values (over 600 mM of $Na^+$ and 16 mM of $Ca^{2+}$) were seen with unsaturated carbon chain linked bilayered $MnFe_2O_4$ nanocrystals (both oleyl phosphate coated- and oleic acid coated-bilayered nanocrystals) (FIG. 31).

Figure 35:
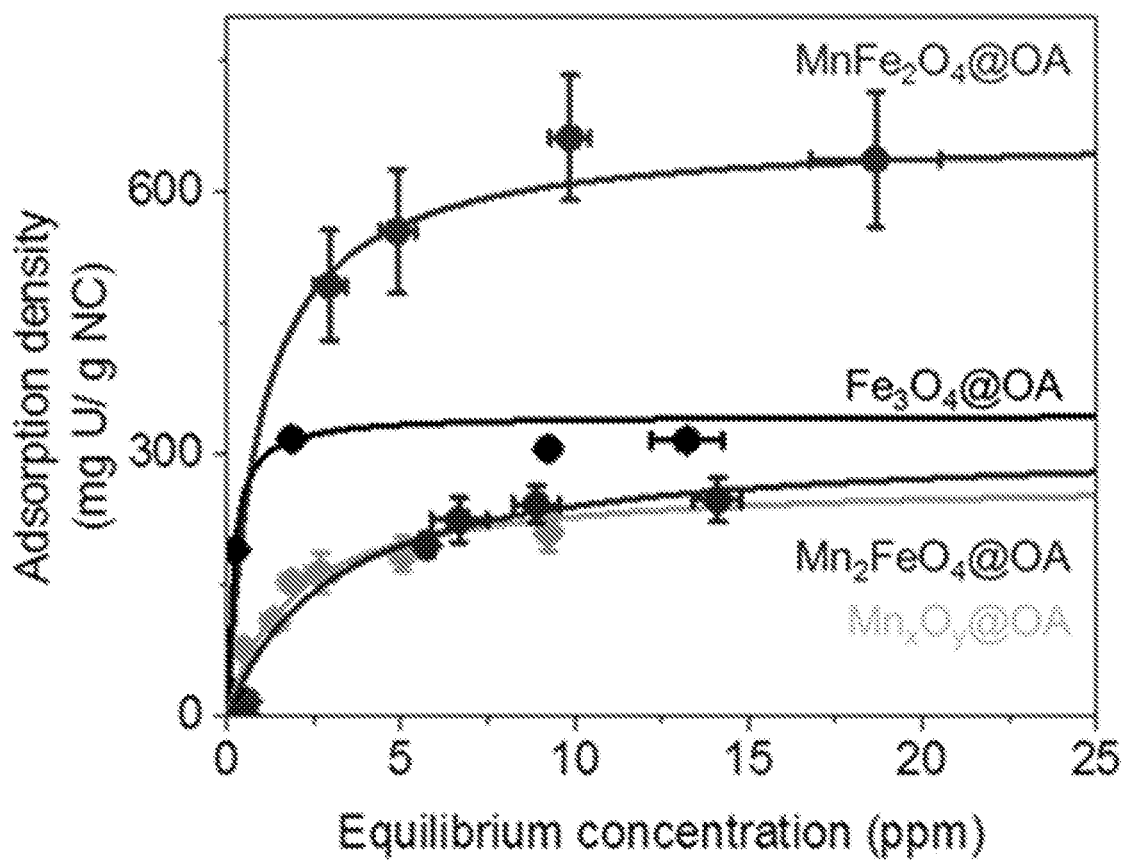
FIG. 35 depicts an exemplary embodiment of uranium sorption isotherms on composition controlled manganese iron oxide nanocrystals in accordance with the present disclosure.

Uranium sorption capacities of manganese ferrites were also evaluated as a function of the ferrite composition (i.e. ratio of manganese and iron) for 11 nm particles which were all stabilized by an oleic acid bilayer at pH 7. $MnFe_2O_4$ cores demonstrated the highest capacity (666.7 mg U/g NC for $MnFe_2O_4$) compared with $Mn_2FeO_4$, $Mn_xO_y$, and $Fe_3O_4$ (312.5, 270.3, and 344.8 mg U/g NC, respectively) (FIG. 35, Table 25). Enhanced uranium sorption capacity of $MnFe_2O_4$ is in part due to the enhanced reduction from uranium (VI) to uranium (IV) at the interface between the nanocrystal and uranium ion via partial redox reactions. Uranium sorption isotherms for composition controlled manganese iron oxide nanocrystals are shown in FIG. 35. Uranium sorption measurements were performed on oleic acid (OA) bilayered nanocrystals samples ($MnFe_2O_4$ (red in original color image), $Fe_3O_4$ (black in original color image), $Mn_2FeO_4$ (purple in original color image), and $Mn_xO_y$ (yellow in original color image)); typical nanocrystal concentration was $2.3 \times 10^{15}$ nanocrystals/L in each sample) at uranium (U(VI)) concentration from 0.1 to 40 mg/L at pH 7.0. All calculated uranium sorption capacity values were fitted by Langmuir isotherm equation.

TABLE 25

The maximum uranium sorption capacity (qmax, milligram of uranium per gram of nanocrystals), and the adsorption constant (k, liter per milligram) of oleic acid (OA) bilayer structured (unsaturated-unsaturate carbon chain linked) $MnFe_2O_4$ nanocrystal samples at pH 7.0.

| | MnO@OA | Mn₂FeO₄@OA | MnFe₂O₄@OA | Fe₃O₄@OA |
|---|---|---|---|---|
| $q_{max}$ (mg of U/g of NC) | 270.3 | 312.5 | 666.7 | 344.8 |
| K (L/mg) | 0.5 | 0.3 | 1.1 | 5.8 |

Figure 36:
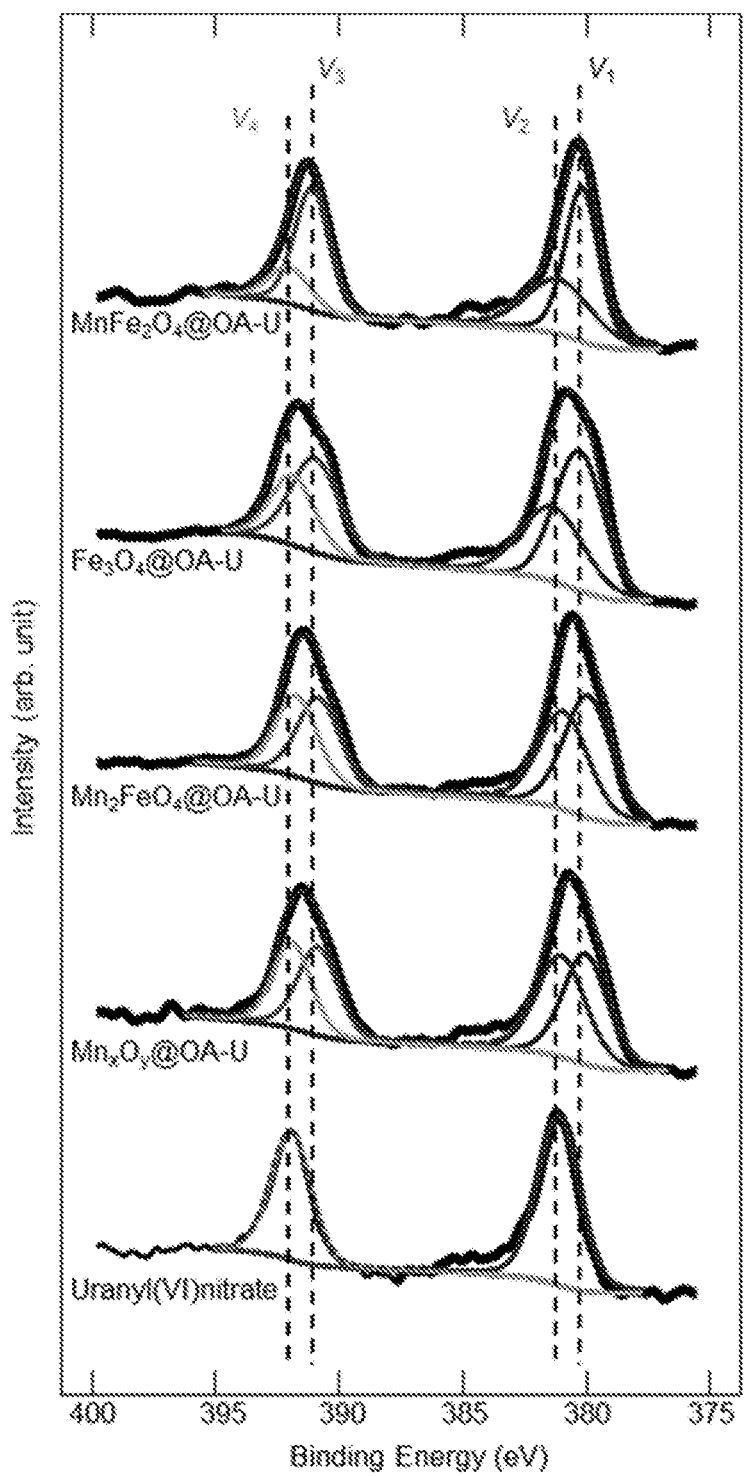
FIG. 36 depicts an exemplary embodiment of redox reactions of uranium (U) on composition controlled nanocrystal surfaces in accordance with the present disclosure.
Figure 37:
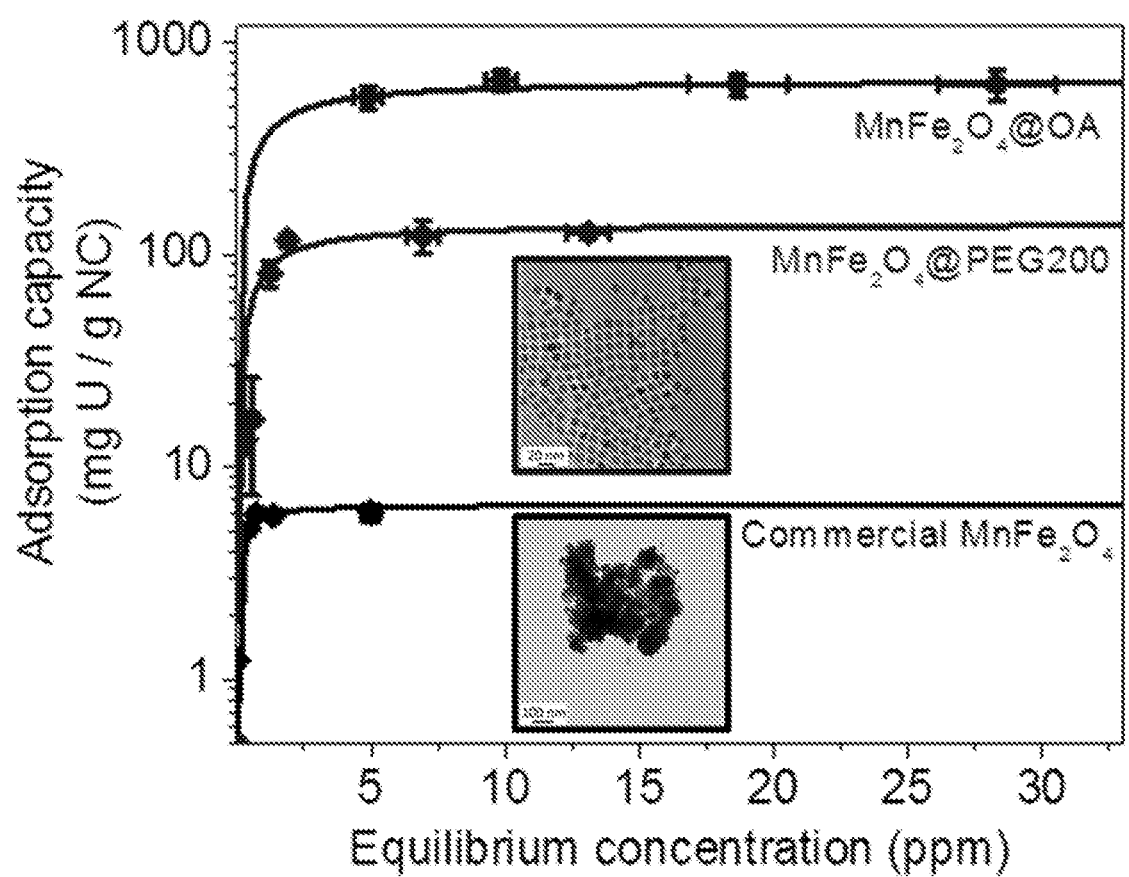
FIG. 37 depicts an exemplary embodiment of uranium sorption isotherms for both engineered and commercial $MnFe_2O_4$ nanocrystals in accordance with the present disclosure.

The uranium 4f XPS data of the materials sampled before and after uranium sorption measurements show the highest uranium reduction (total) for $MnFe_2O_4$ (iron rich ferrite) cores with 65% of measured U as reduced uranium (IV) (from uranium (VI)) (FIG. 36); the uranium reduction percentage of $Fe_3O_4$, $Mn_2FeO_4$, and $Mn_xO_y$ was 58%, 53%, and 51%, respectively. FIG. 36 illustrates a redox reaction of uranium (U) on the surface of the composition controlled nanocrystals. The black lines are the raw data and the red dash lines are the fitted curves based on curve fitting using $V_1$ (blue in original color image), $V_2$ (purple in original color image), $V_3$ (pink in original color image), and $V_4$ (green in original color image). The ratio of U(IV) to U(VI) was calculated by $(V_1+V_3)/(V_2+V_4)$ in the uranium 4f XPS data from the sample after the uranium sorption measurement and compared with uranium nitrate. Accordingly, for mixed ferrite nanocrystal systems, concentrations of both manganese (II) and iron (II) on the surface of the nanocrystal samples may have a significant role in uranium reduction from VI to IV (FIG. 35). XPS data of manganese 2P and iron 2P shows that 17% of manganese (II) and 38% of iron (II) on the surface of $MnFe_2O_4$ were correspondingly oxidized upon U sorption, further supporting a surface redox mediated process. Comparatively, $Mn_2FeO_4$ showed less (relative) change in oxidation of both manganese (II) and iron (II) (2% of Fe (II) and 4% of Mn (II) were oxidized) due to lower concentration of manganese (II) and iron (II) on the surface of the pristine manganese rich ferrite nanocrystal. For pure iron oxide and manganese oxides, 43% of iron (II) for iron oxide and 6% of manganese (II) for manganese oxide samples were oxidized after uranium adsorption measurements. Finally, for comparison, commercial metal oxide nanocrystal (no surface coatings) analogs sorbed 6.6 mg U/g NC for manganese ferrite, 4.9 mg U/g NC for iron oxide (magnetite) and 4.4 mg U/g NC for manganese oxide (MnO) at pH 7. In water, uncoated, commercial magnetite nanocrystal samples exhibited significant and rapid aggregation, as shown in TEM inset images in FIG. 37, thus exhibiting lower surface area for sorption/reaction processes to occur. Uranium sorption isotherm for both engineered and commercial $MnFe_2O_4$ nanocrystals are shown in FIG. 37. Uranium sorption measurements were performed on engineered nanocrystalline $MnFe_2O_4$ (oleic acid bilayered (blue in original color image) and pegylated (single layered, dark red in original color image); typical nanocrystal concentration was $2.3 \times 10^{15}$ nanocrystals in each sample) and commercial $MnFe_2O_4$ nanocrystals (average size of the nanocrystals were 50 nm) at uranium (U(VI)) concentration from 0.1 to 40 mg/L at pH 7.0. All calculated uranium sorption capacity values were fitted by Langmuir isotherm equation (solid lines).

Figure 38:
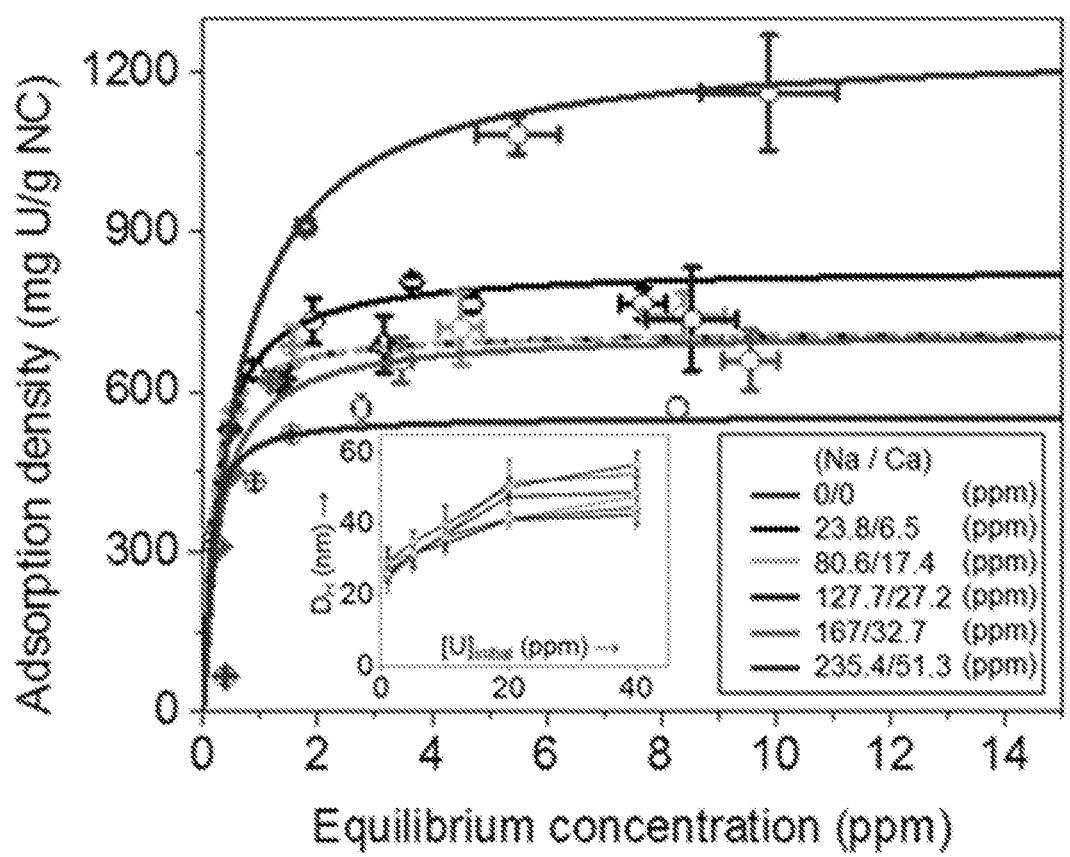
FIG. 38 depicts an exemplary embodiment of uranium sorption isotherms on $MnFe_2O_4@OP$ nanocrystals at elevated ionic salt concentrations in accordance with the present disclosure.

Effects of Ionic Strength and pH. To understand how water chemistry affects uranium adsorption properties, uranium adsorption was investigated as a function of ionic strength and type (both sodium and calcium) and pH. Uranium sorption isotherms for $MnFe_2O_4$@OP nanocrystals at elevated ionic salt concentrations are shown in FIG. 38. Uranium sorption measurements were performed on the nanocrystal samples in the presence of both sodium and calcium with the ratio of about 5 to 1; typical nanocrystal concentration was $2.3 \times 10^{15}$ nanocrystals/L in each sample at uranium (U(VI)) concentration from 0.1 to 40 mg/L at pH 7.0. The inset image shows the hydrodynamic diameters (DH) of the nanocrystals as a function of initial uranium concentration ([U] initial) at elevated both sodium and calcium concentrations. All calculated uranium sorption capacity values were fitted by Langmuir isotherm equation. FIG. 38 and Table 26 show uranium sorption capacities of oleyl phosphate coated bilayered $MnFe_2O_4$ nanocrystals in the presence of sodium (from 0 to 235 ppm (10.2 mM)) and calcium (from 0 to 51 ppm (1.28 mM)) with a mole ratio of ca. 10/1 between sodium and calcium. In general, U adsorption capacity of the phosphate group functionalized nanocrystalline $MnFe_2O_4$ decreased as ionic salt (both sodium and calcium) concentrations increased; with a ca. 55% decrease in sorption capacity at high salt concentrations (235.4 ppm (10.24 mM) of sodium with 51.3 ppm (1.28 mM) of calcium) (Table 27). For reference, a typical ground water has ca. 125 ppm (5.44 mM) of sodium and ca. 24 ppm (0.60 mM) of calcium. The decrease in uranium sorption capacities for multi-cationic mixtures may not only arise from nanocrystal aggregation as shown for the DLS measurements in FIG. 38 (inset) but also due to binding site competition.

sodium were observed when the initial (competitive) uranium concentration was low (<5 ppm); sorbed sodium and calcium concentrations on the nanocrystals reached up to 125 ppm (system) of sodium (14.8 g Na/g NC) and 42 ppm of calcium (4.9 g Ca/g NC) in the case for initial sodium and calcium concentrations of 235 and 51 ppm. Interestingly, sodium and calcium can be correspondingly released as a function of subsequent uranyl addition via displacement. For example, 60 ppm (2.61 mM) of sodium and 11 ppm (0.27 mM) of calcium ions were released from $MnFe_2O_4$@OP samples (8.44 mg/L of the nanocrystals), by 6 ppm (0.026 mM) of adsorbed uranium upon a 10 ppm (0.043 mM) uranyl injection (FIG. 39(A)).

In contract to the near complete release of surface associated sodium ions (over 90%) released upon the introduc-

TABLE 26

The maximum uranium sorption capacity (qmax, milligram of uranium per gram of nanocrystals), and the adsorption constant (k, liter per milligram) of oleylphosphate (OP) coated $MnFe_2O_4$ nanocrystal samples at pH 7.0 in the presence of both sodium and calcium in water.
$MnFe_2O_4$@OP, ph = 7.0

| | Ionic condition Na/Ca (ppm) | | | | | |
|---|---|---|---|---|---|---|
| | 0/0 | 23.6/6.5 | 60.6/17.4 | 127.7/27.2 | 167/32.7 | 235.4/51.3 |
| $q_{max}$ (mg of U/g of NC) | 1250 | 833.3 | 714.3 | 714.3 | 714.3 | 555.6 |
| K (L/mg) | 1.4 | 4 | 7 | 7 | 3.5 | 9 |

TABLE 27

The maximum uranium sorption capacity (qmax, milligram of uranium per gram of nanocrystals), and the adsorption constant (k, liter per milligram) of oleylphosphate (OP) coated $MnFe_2O_4$ nanocrystal samples at pH 7.0 under varied sodium and calcium conditions.
$MnFe_2O_4$@OP, pH = 7.0

| | Ionic condition (ppm) | | | | | | | |
|---|---|---|---|---|---|---|---|---|
| | Na 23 | Na 229.9 | Na 2299 | Na 11494.9 | Na 16391.8 | Ca 6.5 | Ca 27.2 | Ca 51.3 |
| $q_{max}$ (mg of U/g of NC) | 1250 | 1111.1 | 1111.1 | 1000 | 1000 | 1000 | 833.3 | 714.3 |
| K (L/mg) | 1 | 1.5 | 1.3 | 1.4 | 1.3 | 1.3 | 1.2 | 2.3 |

Figure 39:
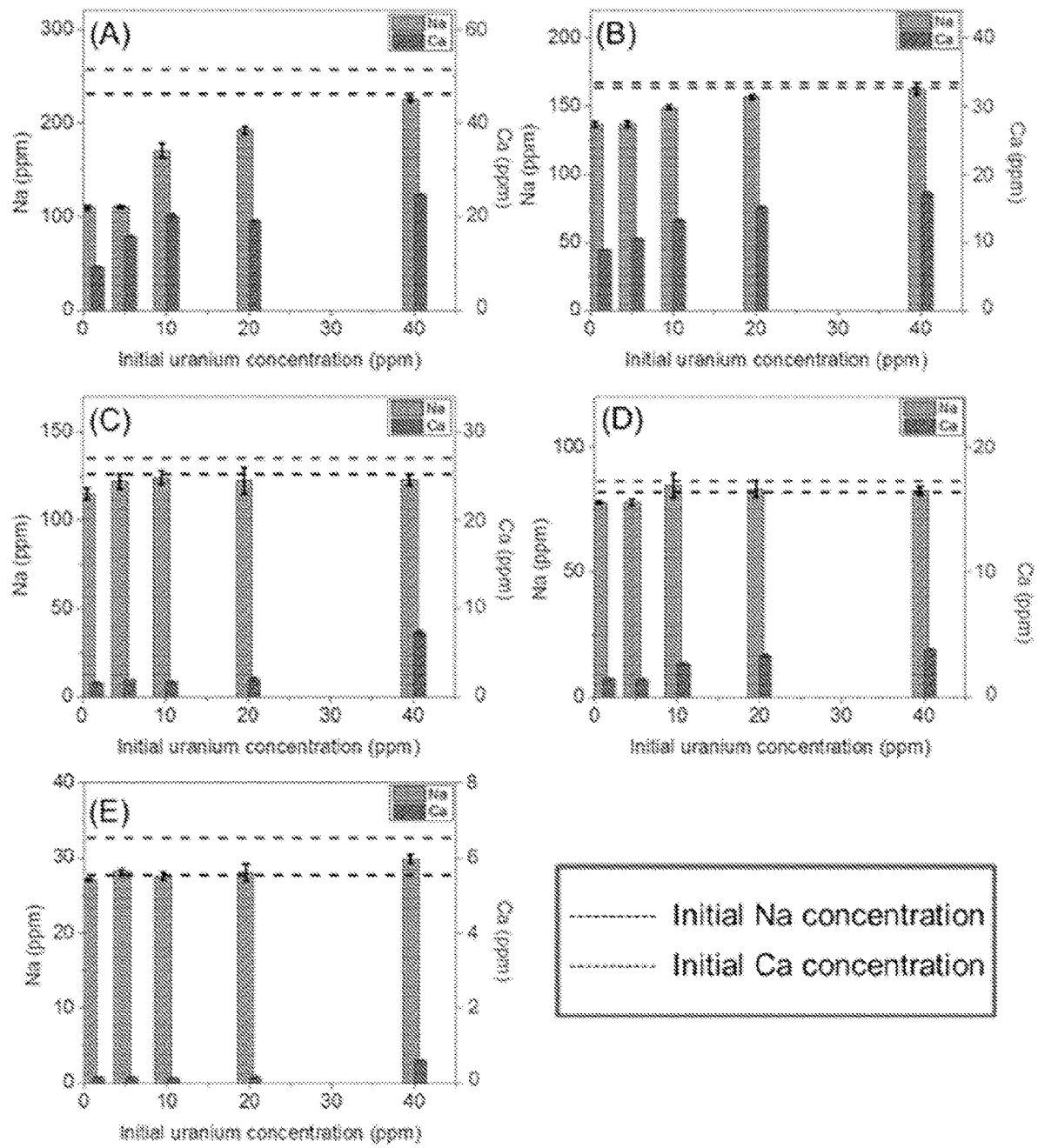
FIG. 39 depicts an exemplary embodiment of multi-sorbate concentrations after uranium sorption on $MnFe_2O_4@OP$ samples in accordance with the present disclosure.
Figure 40:
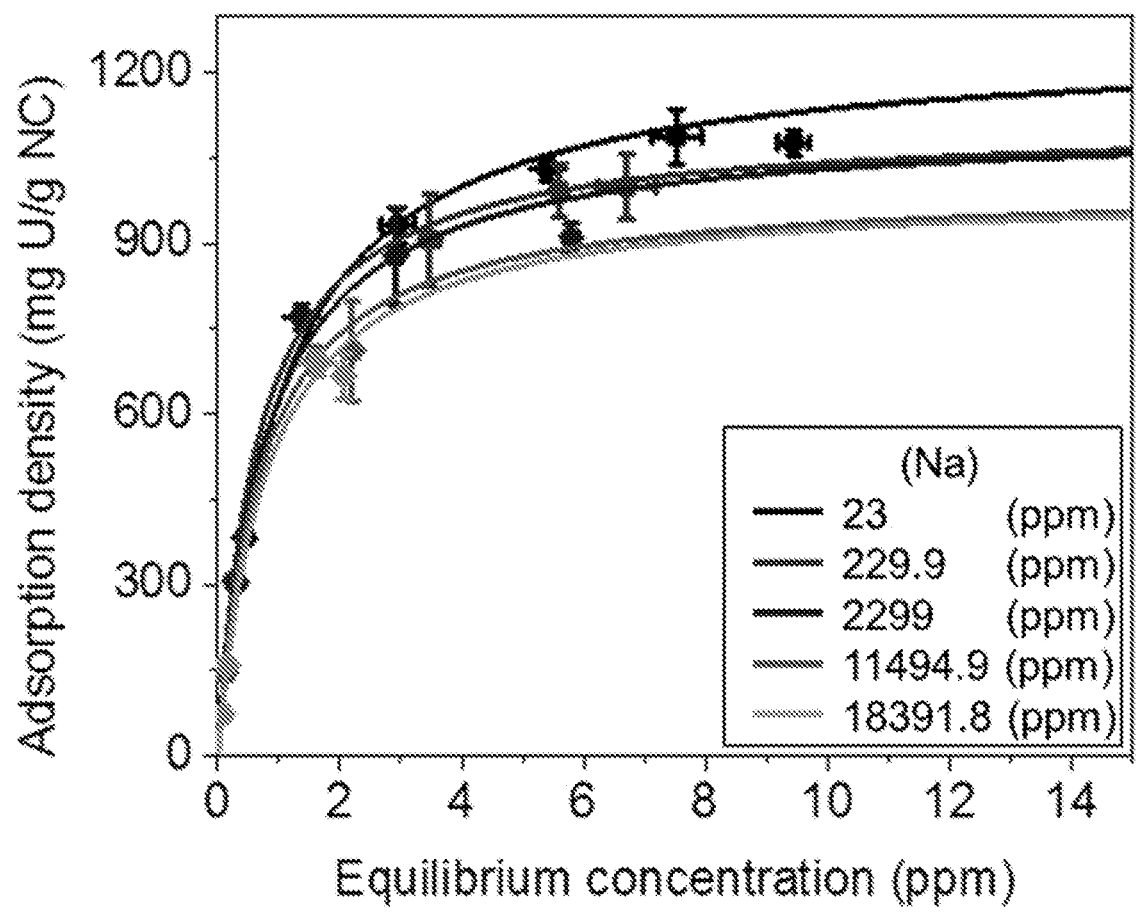
FIG. 40 depicts an exemplary embodiment of uranium sorption isotherms on $MnFe_2O_4@OP$ nanocrystals at elevated sodium concentrations in accordance with the present disclosure.
Figure 41:
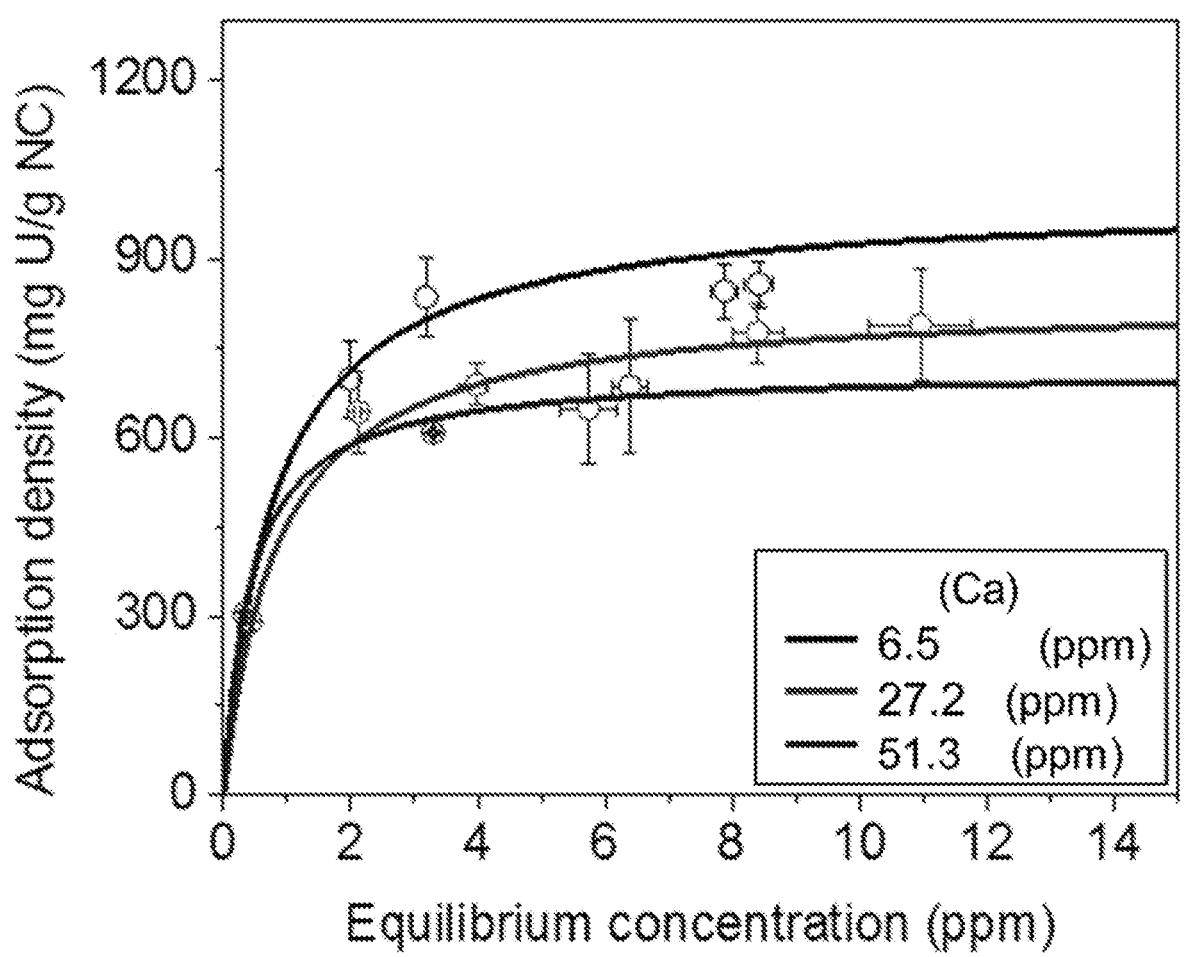
FIG. 41 depicts an exemplary embodiment of uranium sorption isotherms on $MnFe_2O_4@OP$ nanocrystals at elevated calcium concentrations in accordance with the present disclosure.

To evaluate the multi-sorbate (competitive) effects for oleyl phosphate coated $MnFe_2O_4$ nanocrystals, sodium and calcium particle sorption was tested (by measuring remaining sodium and calcium concentrations) at varied uranyl concentrations, upon equilibrium and separation. Multi-sorbate concentrations including sodium, calcium, and uranium are shown in FIG. 39. The remaining sodium (gray in original color image) and calcium (red in original color image) concentrations in the supernatant samples after uranium sorption on $MnFe_2O_4$@OP samples (8.436 mg/L of the nanocrystals) at elevated sodium and calcium concentrations were measured at pH 7 by ICP-OES. The ratio of the initial sodium (dotted black lines in original color image) and calcium (dotted red lines in original color image) concentration was 235.4/51.3 (A), 167/32.7 (B), 127.7/27.2 (C), 80.6/17.4 (D), and 23.8/6.5 ppm (E), respectively. As shown in FIG. 39, the highest sorption values for both calcium and tion of excess uranyl in batch experiments, a lower percentage of calcium ions were displaced (FIG. 39). Relatively stronger divalent calcium cation association with negatively charged nano-sorbent systems (OP) competes with divalent cationic uranium ion (uranyl, $UO_2^{2+}$) binding sites. For example, there was little effect on uranium sorption capacities of $MnFe_2O_4$ coated with oleylphosphate when the nanocrystals were first exposed to excess sodium salts (only). In this case, nanocrystals remained colloidally stable and the sorption capacity was over 1000 mg U/g NC at 18,000 ppm of sodium in pH 7 water (FIG. 40). Uranium sorption isotherms for $MnFe_2O_4$@OP nanocrystals at elevated sodium concentrations are shown in FIG. 40. Typical nanocrystal concentration was $2.3 \times 10^{15}$ nanocrystals/L in each sample at uranium (U(VI)) concentration from 0.1 to 40 mg/L at pH 7.0. All calculated uranium sorption capacity values were fitted by Langmuir isotherm equation. When the same nanocrystals were exposed to elevated calcium concentrations (51.3 ppm), maximum uranium adsorption capacity decreased to 714.3 mg U/g NC at pH 7 (FIG. 41 and Table 27), which while relatively lowered, remain substantial. Uranium sorption isotherms for $MnFe_2O_4$@OP nanocrystals at elevated calcium concentrations are shown in FIG. 41. Typical nanocrystal concentration was $2.3\times10^{15}$ nanocrystals/L in each sample at uranium (U(VI)) concentration from 0.1 to 40 mg/L at pH 7.0. All calculated uranium sorption capacity values were fitted by Langmuir isotherm equation.

Engineered Manganese Oxide Nanocrystals for Enhanced Uranyl Sorption and Separation.

Libraries of precisely engineered monodisperse manganese oxide nanocrystals have been synthesized, stabilized in water, characterized, and demonstrated for uranium, as uranyl, sorption based applications. Monodisperse manganese oxide nanocrystals may be synthesized through the thermal decomposition of manganese oleate with fine size control (12-28 nm) achieved through described combinations of reaction temperature, time, the ratio of metal precursor to surfactant, and monomer concentration(s). As-synthesized nanocrystalline manganese oxides can then be systematically phase transferred into water, via a series of surface coating strategies, including organic acid bilayers (oleic acid base layer with oleyl phosphate, octadecylphosphonic acid, oleic acid, and stearic acid second layers interfacing the aqueous phase) and single layered, polyethylene glycol (PEG) of varied molecular weights (200-10 k MW). The resulting colloidally stable nanocrystals were characterized and evaluated for uranium sorption capacities and aqueous stabilities under varied pH, ionic strengths, and types ($Na^+$, $Ca^{2+}$). Together, the results indicate that these materials are capable of ultra-high uranyl sorption capacities (>50% wt U/wt Mn, with partial U reduction from VI to IV) with simultaneously high aqueous stabilities when optimized via bilayer coating(s) with second (outer-facing) layers consisting of either carboxylic acid or phosphonic acid head groups.

Synthesis of Monodisperse Manganese Oxide Nanocrystals. Manganese oxide nanocrystals with controlled diameters may be synthesized through the thermal decomposition of manganese oleate resulting in highly monodisperse particle libraries. Resulting nanocrystals can be stabilized by an amphiphilic organic acid surface coating (oleic acid) and remained well dispersed in various non-polar organic solvents (hexane, toluene, ether, and chloroform). Strong organic solvents and mixtures thereof may be preferred (e.g., 1-octadecene, hexane, toluene, ether, chloroform, and formaldehyde). Each of reaction temperature, time, and the ratio of surfactant to metal precursor affected the diameter of nanocrystalline manganese oxide. For example, the nanocrystalline manganese oxide nanocrystals increase in size from 6.8±0.7 to 12.2±1.2 nm as the reaction temperature increased from 290° C. to 320° C. The increasing ratio of surfactant to manganese precursor (from 0:5 to 8:5) and longer reaction times (from 30 min to 3 h) also resulted in the larger manganese oxides over 25 nm.

Figure 42:
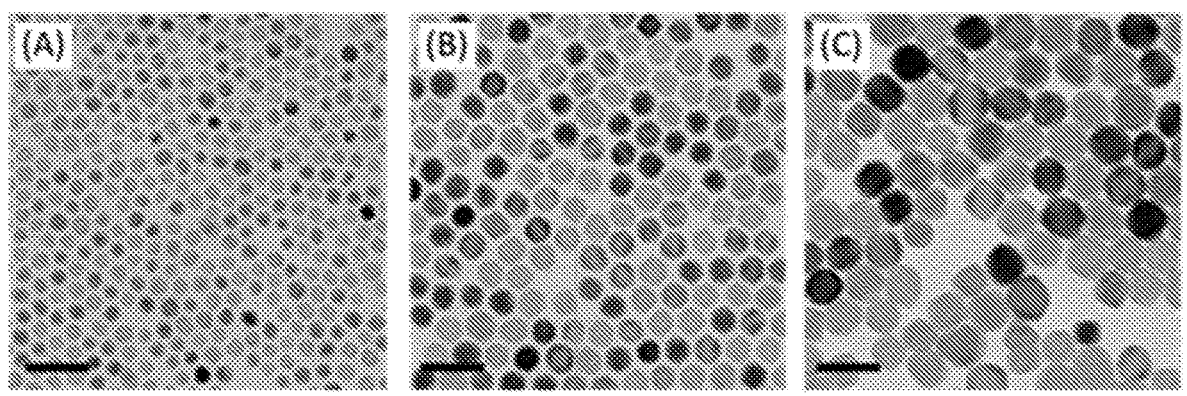
FIG. 42 depicts an exemplary embodiment of TEM micrographs of manganese oxide nanocrystals in accordance with the present disclosure.

In addition to the effect of reaction conditions (temperature, ratio of manganese oleate to oleic acid, and time), the concentration of the starting precursor materials (manganese oleate in 1-octadecene) had a significant effect on the nanocrystal size. The TEM micrographs of manganese oxide nanocrystals in FIG. 42 show that high concentration of manganese oleate (Mn-Ol) increases the diameters of the nanocrystalline manganese oxides. The diameters of manganese oxide nanocrystals are 12.2±1.2 nm (0.5 M of manganese oleate), 18.7±2.8 nm (1.0 M of manganese oleate), and 27.9±2.8 nm (1.5 M of manganese oleate) from (A) to (C). Different concentrations of manganese oleate were decomposed in 1-octadecene in the presence of 2 mmol of oleic acid at 320° C. for 1 h. The average diameters of the nanocrystals were analyzed by counting over 1000 particles using Image-Pro plus 6. All scale bars are 50 nm. As shown in FIG. 42, transmission electron micrographs of monodisperse manganese oxide nanocrystals from 12.2±1.2 to 27.9±2.8 nm were synthesized by varying the concentration of the manganese oleate in 1-octadecene ranging from 0.5 to 1.5 M at 320° C. for 1 h (higher precursor concentrations yielding larger diameter nanocrystals), which has been observed for other, similarly sized monodisperse metal oxide nanoparticles.

Figure 43:
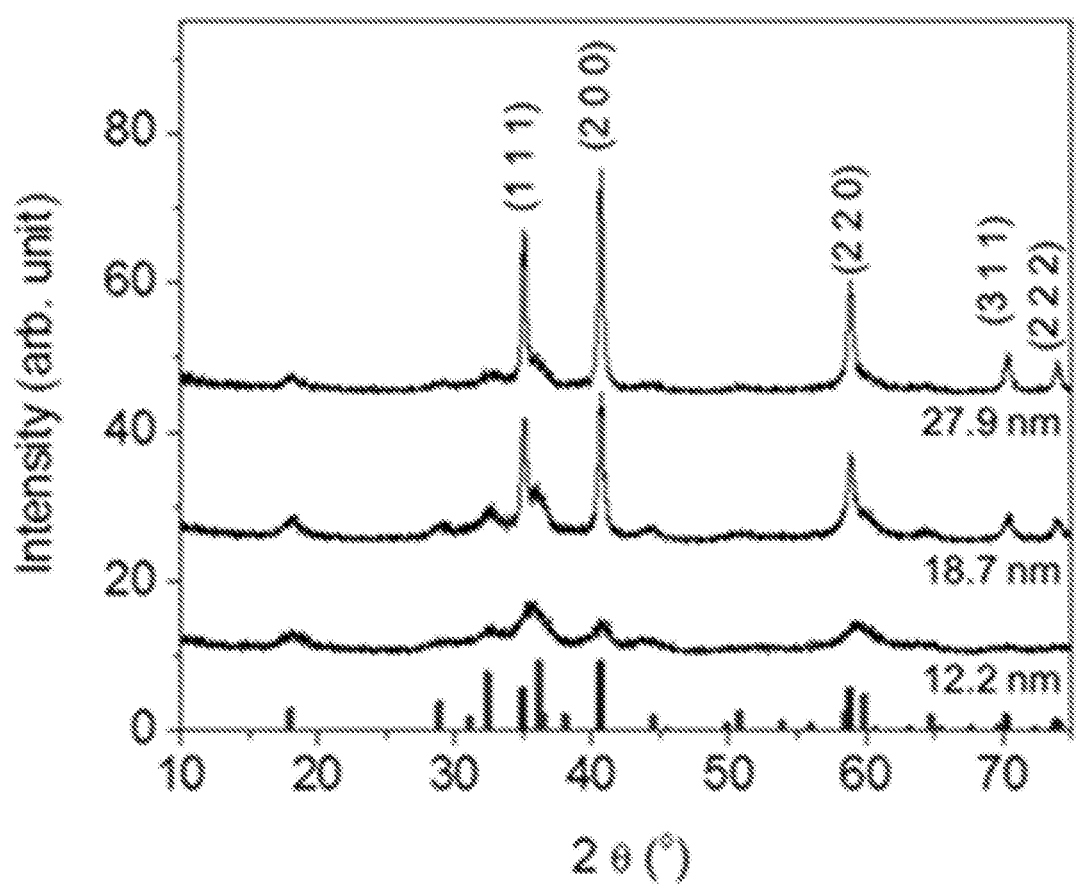
FIG. 43 depicts an exemplary embodiment of XRD patterns of nanocrystalline manganese oxides with varying diameters in accordance with the present disclosure.

Synthesized nanocrystalline manganese oxides are shown to have a core structure of MnO with a thin shell of $Mn_3O_4$. For example, HR-TEM analysis showed that the lattice fringes of the shell and the core structure were indexed to either planes of $Mn_3O_4$ or planes of MnO, respectively. This is consistent with X-ray diffraction (XRD) patterns of the manganese oxide samples in FIG. 43; all peaks match to MnO (JCPDS Card #07-0230) and $Mn_3O_4$ (JCPDS Card #24-0734) with the MnO:$Mn_3O_4$ ratio increasing with size as expected for a core-shell structure. Specifically, FIG. 43 shows XRD patterns of the nanocrystalline manganese oxides with varying diameters of 12.2±1.2 nm, 18.7±2.8 nm, and 27.9±2.8 nm. The position of the reflections matches to cubic MnO and the tetragonal $Mn_3O_4$ phases. The vertical lines at the bottom of the graph corresponds to JCPDS card of MnO (Blue in original color image, JCPDS Card No. 07-0230), and $Mn_3O_4$ (Red in original color image, JCPDS Card No. 24-0734). That is to say, with increasing particle size, the particle core mass (composed of MnO) increases more than the surface area (covered by $Mn_3O_4$). This type of core-shell structure of manganese oxides (MnO@ $Mn_3O_4$) may be formed through the oxidation Mn(II) on the MnO surface in the presence of oxygen as the reaction cools. Visually, the color of the reaction mixture at 320° C. was grey green (MnO) turning to a deep brown (the formation of $Mn_3O_4$) at room temperature and open to the air.

Figure 44:
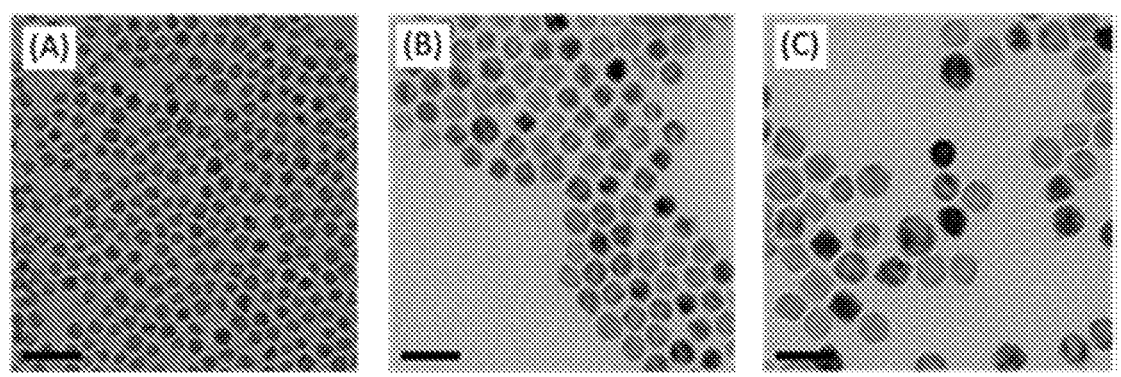
FIG. 44 depicts an exemplary embodiment of TEM micrographs of water stable manganese oxide nanocrystals in accordance with the present disclosure.

Phase Transfer of Monodisperse Manganese Oxide Nanocrystals. Nanocrystalline manganese oxides synthesized in organic solvents may be phase transferred into water using either by a bilayer strategy, using organic acids (such as, oleyl phosphate, octadecylphosphonic acid, oleic acid, and stearic acid) and/or ligand exchange process using polyethylene glycol (PEG) with different molecular weights. Strong organic solvents and mixtures thereof may be preferred (e.g., 1-octadecene, hexane, toluene, ether, chloroform, and formaldehyde). Organic acid bilayer strategies utilize the organic solvent stabilizing oleic acid base (surface) layer (occurring during the synthesis) which can then be tailored with regard to the second, outer layer, which upon self-assembly, interfaces the water phase via hydrophobic head group (here as oleic acid, oleyl phosphate, octadecylphosphonic acid, and stearic acid). For all materials described, the phase transferred nanocrystals were well dispersed in nano-pure (Milli-Q, 18.2Ω) water and colloidally stable without any precipitation for over 6 months. The average core diameters and morphologies are identical to those for as-synthesized nanocrystals in organic solvents (FIG. 44). Strong organic solvents and mixtures thereof may be preferred (e.g., hexane, toluene, and formaldehyde). The TEM micrographs of FIG. 44 show water stable manganese oxide nanocrystals with diameters of 12.0±0.9, 18.2±2.2, and 27.5±2.9 nm from (A) to (C). The average diameters of the nanocrystals were analyzed by counting over 1000 particles using Image-Pro plus 6. All scale bars are 50 nm. In all cases, phase transfer efficiency was over 70%.

Figure 45:
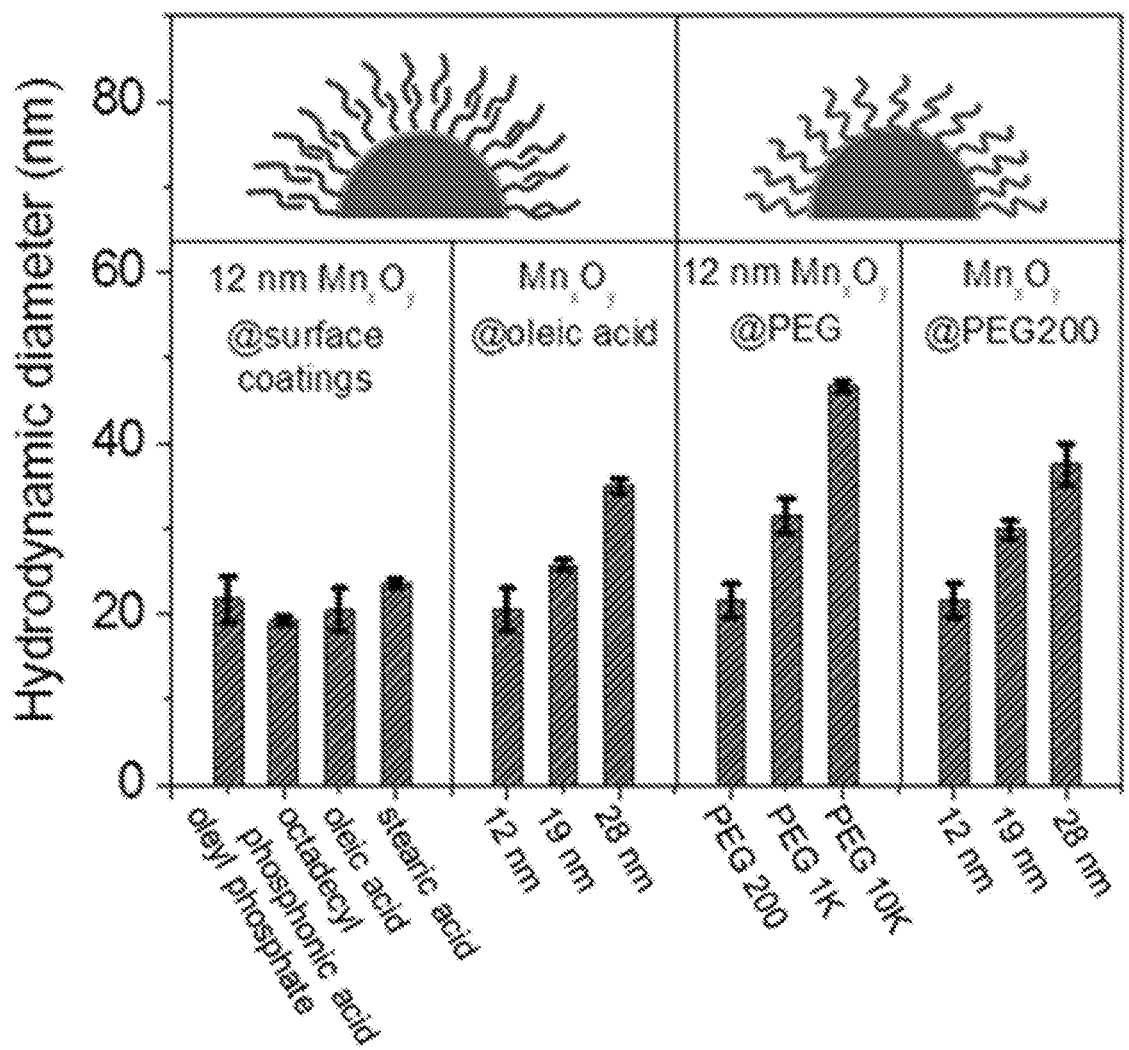
FIG. 45 depicts an exemplary embodiment of hydrodynamic diameters of manganese oxide ($Mn_xO_y$) nanocrystals in accordance with the present disclosure.

Water-stable nanocrystalline manganese oxide samples were characterized by dynamic light scattering (DLS) to measure the hydrodynamic size and zeta potential as it relates to effective surface charge. The hydrodynamic diameters (DH) of the phase transfer agent coated manganese oxide nanocrystals are shown in FIG. 45, which represents hydrodynamic diameters of manganese oxide (MnxOy) nanocrystals from the inorganic core (12, 19, and 28 nm) as well as the surface coating (oleyl phosphate, octadecyl phosphonic acid, oleic acid, stearic acid, and poly ethylene glycol). DLS measurements revealed that the bilayered structures (using oleyl phosphate, octadecyl phosphonic acid, oleic acid, and stearic acid) and a low molecular weight polymer (poly (ethylene glycol) with 200 molecular weight (PEG200)) led to thin, compact surface coatings. For example, oleyl phosphate, octadecylphosphonic acid, oleic acid, stearic acid, and PEG200 applied to nanocrystal cores of 12.2 nm diameter produced materials with hydrodynamic diameters (DH) of 21.7±2.6, 19.2±0.6, 20.4±2.5, 23.6±0.5, and 21.5±2.0 nm, respectively. The larger molecular weight polymers yielded particles with larger hydrodynamic diameters (PEG1K and 10K coated manganese oxide nanocrystals showed the hydrodynamic diameters of 31.5±2.0, and 46.6±0.7 nm, respectively). The zeta potential of oleyl phosphate, octadecylphosphonic acid, oleic acid stearic acid, poly (ethylene glycol) coated manganese oxide nanocrystals were −46.6±2.3, −43.0±1.9, −33.7±1.9, −32.0±1.1, and −14.7±1.6 mV, respectively, which are in line with expected values for these coatings.

Figure 46:
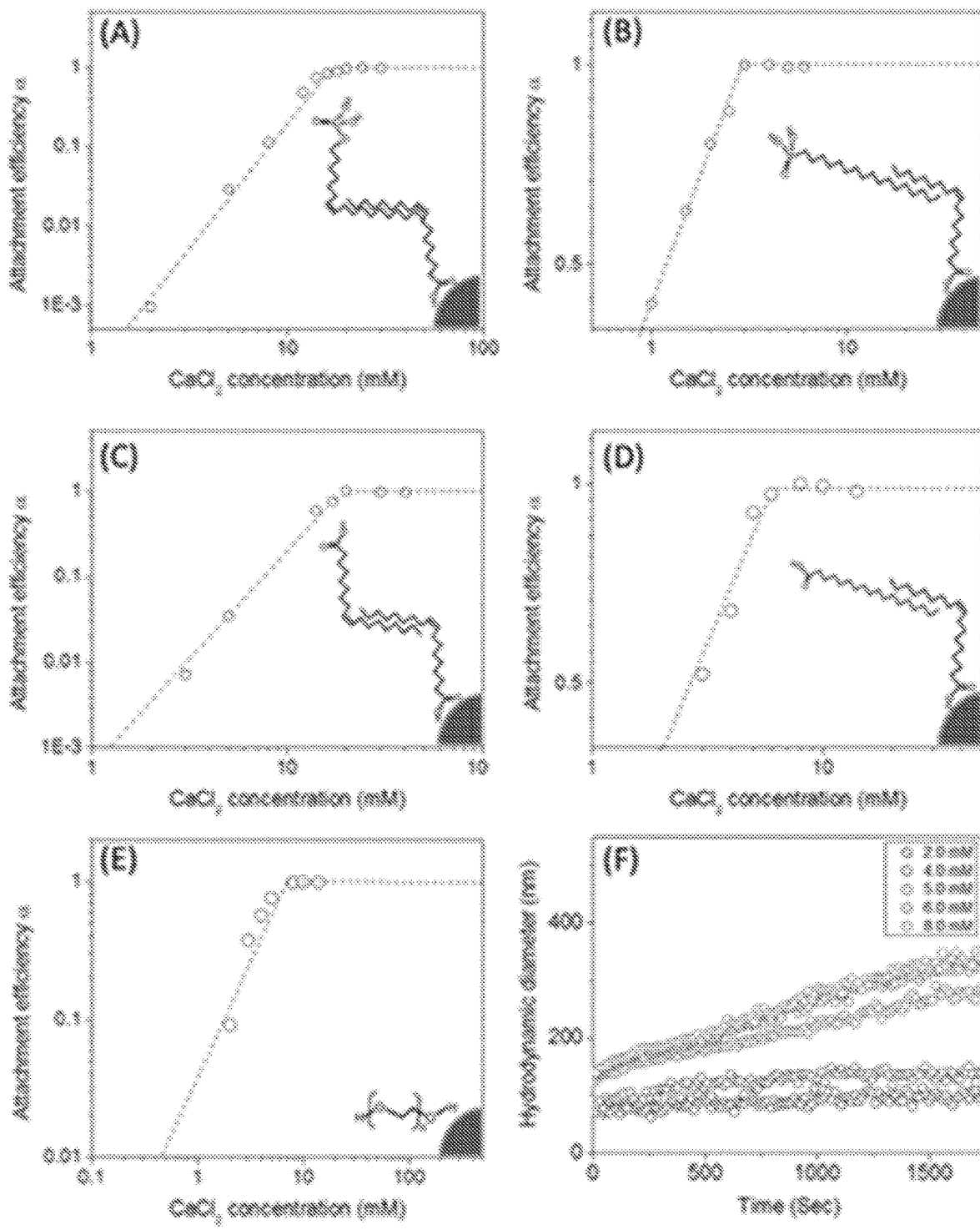
FIG. 46 depicts an exemplary embodiment of attachment efficiency (a) as a function of $CaCl_2$ concentrations for both bilayered and pegylated-manganese oxide nanocrystals in accordance with the present disclosure.

Once transferred, particle aggregation kinetics were evaluated as a function of environmentally relevant ionic strength and type. Hydrodynamic diameters were monitored by DLS in situ and in real time to determine the critical coagulation concentrations (CCC) of both mono- and di-valent salts ($Na^+$ and $Ca^{2+}$) for all materials described. FIG. 46 represents attachment efficiency (a) as a function of $CaCl_2$ concentrations for both bilayered-(A for oleyl phosphate coated-, B for octadecyl phosphonic acid coated-, C for oleic acid coated-, D for stearic acid coated-manganese oxides) and pegylated-manganese oxide nanocrystals (E) and the aggregation kinetic example of pegylated manganese oxide nanocrystals also as a function of $CaCl_2$ concentration. The attachment efficiency (a) for each nanocrystal sample was calculated by measuring the aggregation rates of the particles as a function of time and salt concentrations (F). The nanocrystal concentration employed was $2.7 \times 10^{14}$ nanocrystals/L. The depicted images showed the bilayered and single layered surface coating structures. The critical coagulation concentrations were 19.1 mM of $CaCl_2$ for oleyl phosphate coated-(A), 2.7 mM of $CaCl_2$ for octadecylphosphonic acid coated-(B), 19.2 mM of $CaCl_2$ for oleic acid coated-(C), and 5.8 mM of $CaCl_2$ for stearic acid coated-bilayered manganese oxide nanocrystals (D). The critical coagulation concentrations for PEG 200 coated manganese oxide nanocrystals was 6.8 mM of $CaCl_2$ (E). As FIG. 46 shows, unsaturated carbon (C8-C9 double bond) surface coating materials containing phosphonic acid and carboxylic acid bilayered nanocrystals had higher critical coagulation concentration values compared to both saturated carbon chain analog, bilayered structures and single layered coatings. CCCs for oleyl phosphate—(883.7 mM of NaCl and 19.1 mM of $CaCl_2$) and oleic acid—(810.1 mM of NaCl and 19.2 mM of $CaCl_2$) bilayered nanocrystals were higher than octadecyl phosphonic acid coated (201.5 mM of NaCl and 2.7 mM of $CaCl_2$), stearic acid coated (245.8 mM of NaCl and 5.8 mM of $CaCl_2$), and pegylated nanocrystals (261.4 mM of NaCl and 6.8 mM of $CaCl_2$).

Uranium Sorption and Separation Using Aqueous Stabilized Manganese Oxide Nanocrystals. Material libraries were assessed and compared for their ability to adsorb and thus separate uranium in water. Uranyl sorption isotherms were performed to calculate a maximum adsorption capacity (qmax) and adsorption constant (k) based on the Langmuir isotherm equation at 3 different pH values (pH 5.6, 7.0, and 8.5) for described particle types (size and surface coating combinations).

Figure 47:
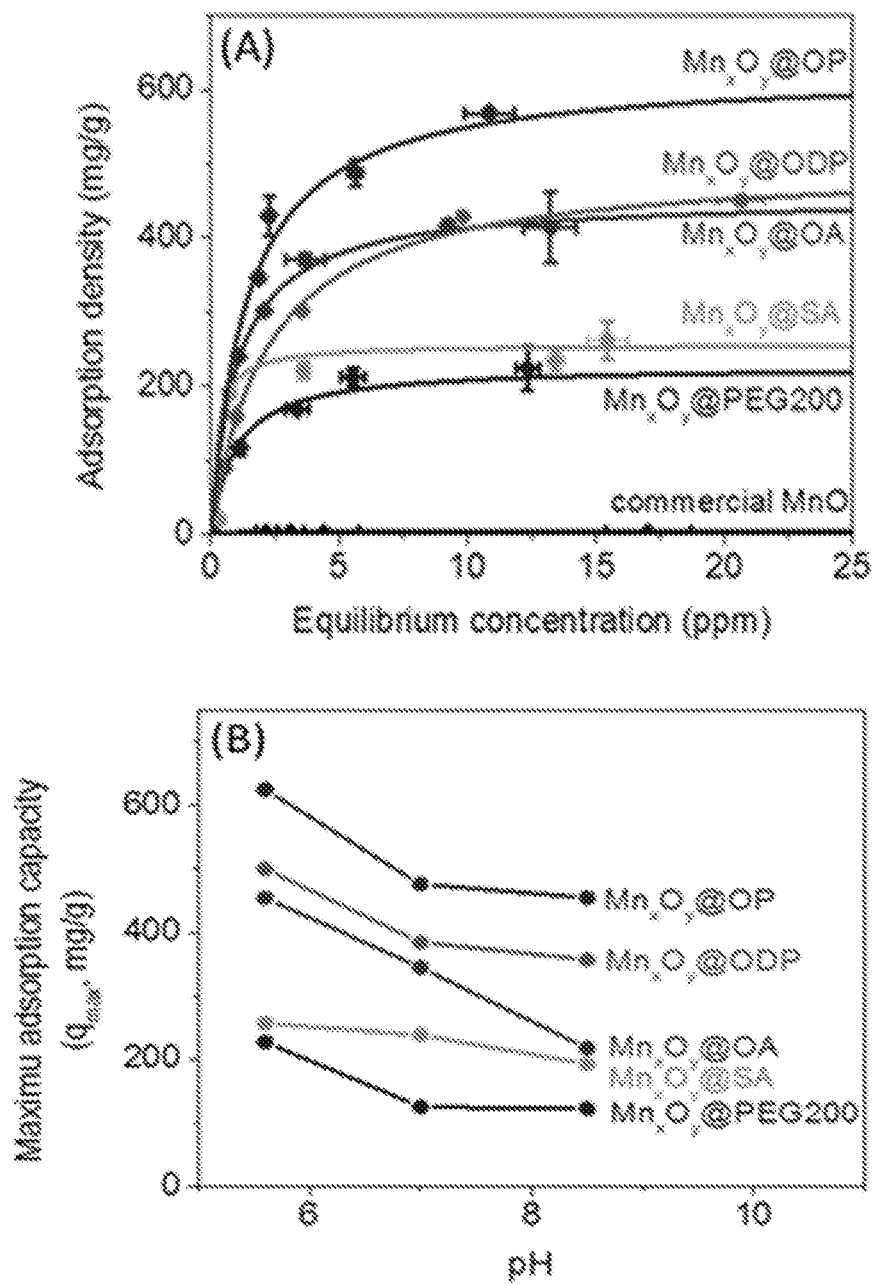
FIG. 47 depicts an exemplary embodiment of uranium sorption isotherms for both engineered and commercial manganese oxides in accordance with the present disclosure.

FIG. 47 gives uranium sorption isotherm for both engineered and commercial manganese oxides. Engineered nanocrystals included (oleylphosphate coated—(OP, purple in original color image), octadecylphosphonic acid coated—(ODP, green in original color image), oleic acid coated—(OA, red in original color image), stearic acid coated—(SA, orange in original color image), and poly (ethylene glycol) 200 coated—(PEG200, blue in original color image); 0.2 mg of manganese (II)) and commercial MnO (black in original color image, 6.7 mg of manganese (II)) at pH 5.6 as shown in (A). For these materials, a maximum sorption capacity (qmax) was 47.6, 41.7, 32.3, 18.9, and 16.7 percentage by weight (wt %) per loaded sample (manganese oxide) for oleyl phosphate, octadecylphosphonic acid coated-, oleic acid coated-, stearic acid coated-bilayered manganese oxide nanocrystals, and PEG 200 coated manganese oxide nanocrystals, respectively; commercial manganese oxides showed 0.4 wt %. All solid lines were plotted by Langmuir isotherm equation using the experimental data. Maximum uranium sorption capacities (qmax) for all materials at three different pH levels (5.6, 7.0, and 8.5) as shown in (B). As shown in FIG. 47(A), monodisperse nanocrystalline manganese oxides (12.2 nm diameter) demonstrated significantly higher sorption capacities when compared to aggregated commercial available manganese oxides by a factor of over 100 in some cases for oleyl phosphate coated manganese oxides (maximum adsorption capacity was 625.0 mg/g (milligram of uranium per gram of manganese)), compared to 5.7 mg/g for commercial MnO. Such enhancement is not only a function of more favorable surface chemistry, but also due to the high particle stabilities resulting in the larger effective surface areas when compared to the commercial materials, which due to high surface energies, readily aggregate in water (FIG. 47). For all surface coatings evaluated, higher sorption values occurred under slightly acidic conditions, here as pH 5.6, compared to neutral (7.0) or slightly basic (pH 8.5) conditions (FIG. 47), which is an expected trend. For example, a maximum uranium adsorption capacity of oleic acid bilayered manganese oxide nanocrystals was 454.55 mg/g at pH 5.6, 344.83 mg/g at pH 7.0, and 217.39 mg/g at pH 8.5 (FIG. 47(B)). Such higher uranium sorption at slightly acidic condition is a result of aqueous uranium (VI) speciation (<pH 6, forming $UO_2^{2+}$ or $UO_2(OH)^+$) which should have a higher electrostatic affinity for negatively charged surfaces.

When normalized for pH and surface coating chemistry effects, both the particle diameter and the surface coating thickness play a significant role in uranyl binding capacities. Smaller manganese oxide nanocrystals with thinner, compact surface coating structures demonstrated higher uranium sorption capacities. For example, particle diameter and surface coating thickness dependent uranium sorption using particle diameters of 12, 19, and 28 nm coated with 3 different surface coating materials (PEG 200, PEG 1K, and PEG 10K) was observed. At the same mass concentration, 12 nm manganese oxides (surface area: $2.5 \times 10^{16}$ nm2), as expected, had the largest uranium sorption capacity due to higher surface area than 19 nm (surface area: $1.6 \times 10^{16}$ nm2) and 28 nm (surface area: $1.0 \times 10^{16}$ nm2) materials; at 20 mg/L of manganese (II); there are $5.4 \times 10^{13}$ nanocrystals for 12 nm, $1.4 \times 10^{13}$ nanocrystals for 19 nm, and $4.3 \times 10^{12}$ nanocrystals for 28 nm particles. Further, sorption capacity decreased as a function of surface coatings molecular weight, which scaled well with coating thickness (FIG. 45). For example, PEG 200 coated manganese oxide nanocrystals (DH=21.5 nm) demonstrated the highest maximum sorption capacity of 227.3 mg/g compared to 142.9 mg/g for PEG 1K and 119.0 mg/g for PEG 10 K coated manganese oxides. Thinner surface coating materials may allow for more uranyl interfacial surface reactions/binding occurrences.

The surface coating structure and chemistry play a significant role in sorption. As shown in FIG. 47, bilayered manganese oxide nanocrystals with phosphonate and carboxylate based surface functional groups performed better than single layered PEGylated (HO-PEG-OH) manganese oxide nanocrystals. In one case, a maximum uranium sorption capacity for bilayered nanocrystals (e.g., oleyl phosphate or oleic acid coated manganese oxides) was nearly 3 times higher than the value for the single layered structure, PEG200 coated materials (FIG. 47) for the same core particle at the same pH. High uranium sorption capacities for the bilayered structures is due, in part, to the strong binding of uranium at the functional groups (potentially at either end of the bilayer structure) and the enhanced colloidal stability (colloidal stability effects are discussed below). For a better understanding of the interaction between uranium and the bilayered stabilized materials, uranium binding was analyzed using ATR-FTIR and XPS. For example, upon uranyl sorption, a decrease in intensity and a peak shift at 1226 $cm^{-1}$ and 1055 $cm^{-1}$ can be attributed to strong interactions of uranium with phosphonate and carboxyl groups, respectively. Based on this, the binding affinity of the phosphonate group $(PO(OH)_2)$ (or carboxyl group (COOH)) to uranium occurs, in part, via electrostatic based mechanism(s).

Figure 48:
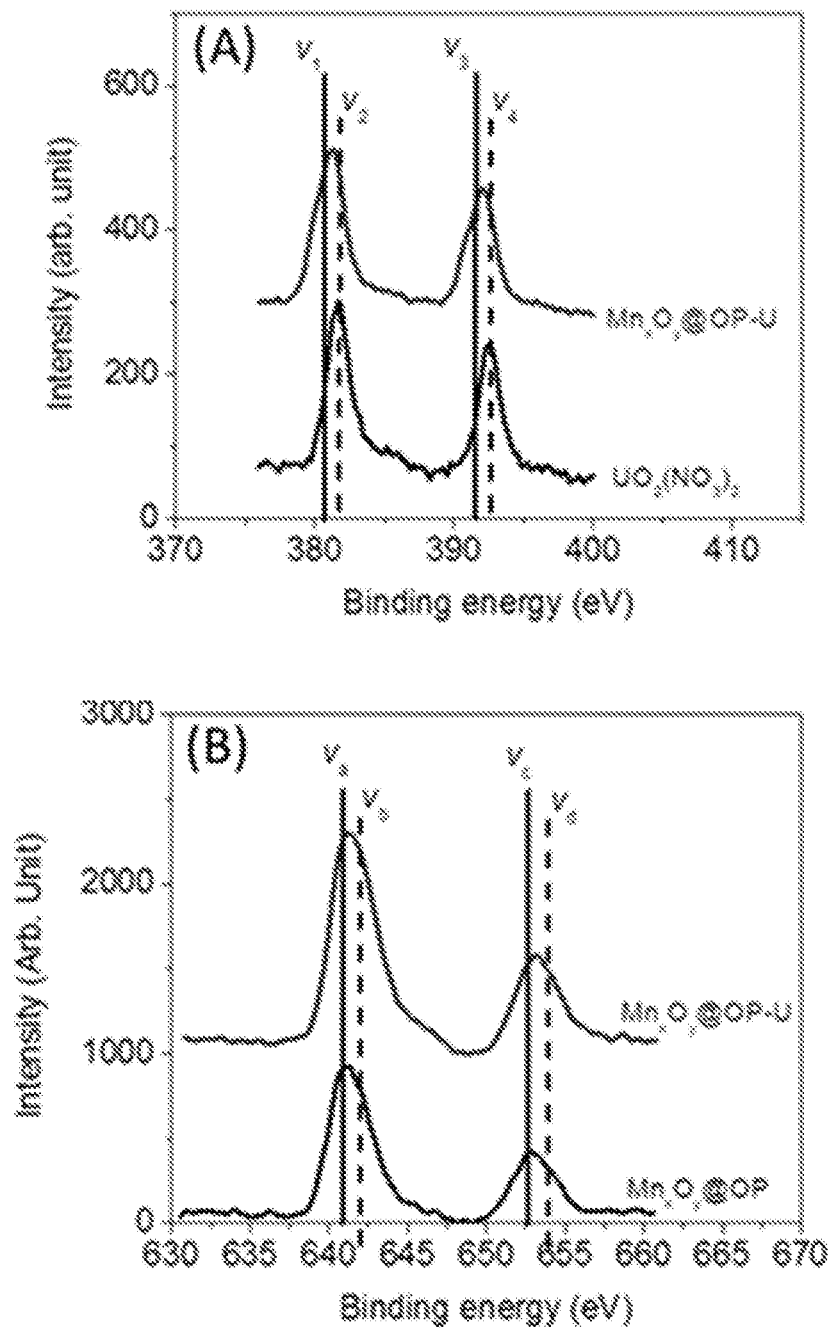
FIG. 48 depicts an exemplary embodiment of redox reactions between uranium (U) and manganese (Mn) on a nanocrystal surface in accordance with the present disclosure.

System redox chemistry was also studied using XPS. Oxidation states of sorbed uranium were evaluated using the colloid samples (oleyl phosphate coated manganese oxide nanocrystals) separated by ultracentrifugation before/after the uranium sorption measurement. The ratio of each element (uranium (U4f) and manganese (Mn2p)) was calculated by integration of the area under the curves fitted by MultiPak V7.0.1. FIG. 48 represents a redox reaction between uranium (U) and manganese (Mn) on the surface of the nanocrystals. The ratio of U(IV) to U(VI) was calculated by $(V_1+V_3)/(V_2+V_4)$ in the uranium 4f XPS data from the sample before and after the uranium sorption measurement (A). Manganese 2P XPS data was used to evaluate the ratio of Mn(II)/Mn(III) calculated by $(V_a+V_c)/(V_b+V_d)$ from the sample before and after the uranium sorption measurement (B). As shown in FIG. 48, 55% of uranium (VI) was reduced to uranium (IV) upon sorption and a slight change in manganese oxidation state (ca. 6% decrease in manganese (II) with a corresponding increase in manganese (IV)) also occurred in the manganese 2P spectrum. Such reduction may result from a redox reaction between uranium species and bilayer functional groups and/or surface active sites on the nanocrystal surface itself.

Figure 49:
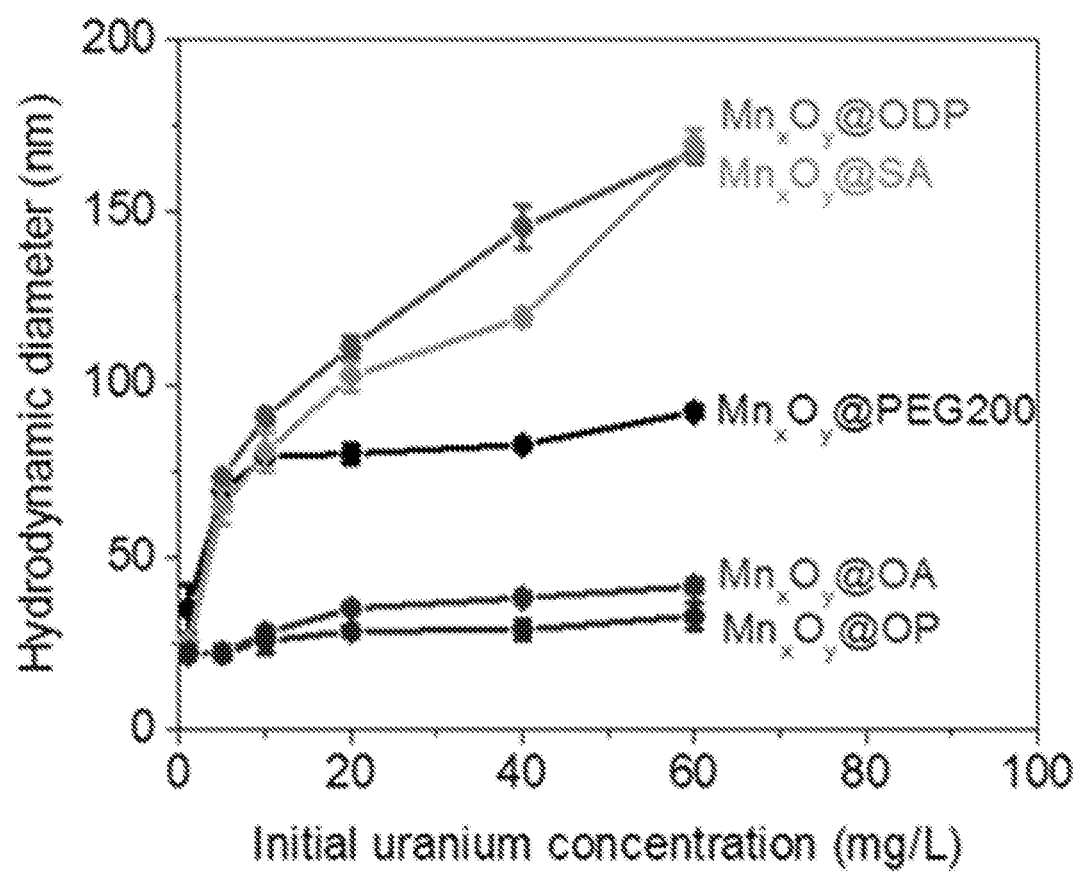
FIG. 49 depicts an exemplary embodiment of hydrodynamic diameters of both bilayered and pegylated manganese oxide nanocrystals after uranium sorption in accordance with the present disclosure.

Colloidal Stability of Single and Bilayered Nanocrystalline Manganese Oxides in the Presence of Mono-/Di-Valent Salt Ions. Both oleyl phosphate coated- and oleic acid coated-bilayered structures outperformed the uranium sorption capacities of PEG based coated materials and commercial manganese oxide nanocrystals. Due to relatively large amounts of sorbed uranyl, which could shield functional group interaction(s) with water, the stability of these systems was further evaluated in the presence of elevated uranyl concentrations. FIG. 49 gives hydrodynamic diameters of both bilayered-(oleyl phosphate (purple in original color image), octadecylphosphonic acid (green in original color image), stearic acid (orange in original color image), and oleic acid (red in original color image) coated) and pegylated-(black in original color image) manganese oxide nanocrystals after uranium sorption measurements ranging from 0.1 to 60 mg/L of uranium (VI) at pH 5.6 for 24 h. FIG. 49 shows that the hydrodynamic diameters of oleyl phosphate and oleic acid bilayered manganese oxide nanocrystals were stable despite increasing uranyl concentrations (from 0.1 to 60 mg/L) after 24 h. However, octadecylphosphonic acid, stearic acid, and PEG coated manganese oxides showed significant increases in their hydrodynamic diameters (thus losing monomeric stability) as a function of U concentration. Such data are consistent with CCC trends for ($Na^+$) and divalent ($Ca^{2+}$) cations (FIG. 49). As discussed for FIG. 46, both oleyl phosphate coated- and oleic acid coated-nanocrystals (bilayered structures) were extremely stable with extended critical coagulation concentration values in the presence of high concentrations of sodium (<880 mM) and calcium (<19 mM) ions. However octadecyl phosphonic acid-, stearic acid-, and PEG200-coated nanocrystals aggregated at lower critical coagulation concentrations values for sodium (<260 mM) and calcium (<6 mM).

The enhancement of colloidal stability for the oleyl phosphate and oleic acid bilayered nanocrystals results from the increased hydrophobic (sp2 pi bonding environments) interactions between unsaturated carbon chains, thus resulting in more stable, compact bilayers, for oleic acid bilayer stabilized metal oxide nanoparticles. The kink structure of unsaturated carbon chains (cis forms in both cases here) provides additional layer support via increased Van der Waals interactions (compared to octadecyl phosphonic acid or stearic acid, which are saturated). The lower sorption capacities of octadecyl phosphonic acid- and stearic acid-coated bilayered manganese oxide nanocrystals may also be due, in part, to the lower stability in the presence of elevated uranyl ($UO_2^{2+}$ or $UO_2(OH)^+$) which would decrease the effective surface areas (FIGS. 47, 48, and 49). Highly stable oleyl phosphate and oleic acid coated bilayered structures demonstrated nearly 1.5 times higher uranium sorption capacities than octadecyl phosphonic acid and stearic acid coated bilayered structure samples, respectively.

EXAMPLES

Example 1: Synthesis of Nanocrystalline Manganese Iron Oxide Coated Iron Oxides (IO@MF)

IO@MF nanocrystals were synthesized by decomposition of manganese oleates (Mn-OA) in the presence of iron oxide (IO) nanocrystals as seed materials at 320° C. 10 ml of IO nanocrystals in hexane solution ([Fe]=5,096 mg/L) and 0.5 ml of manganese oleate ([Mn]=12,150 mg/L) was mixed with 1 mmol of oleic acid in 4 g of 1-octadecene at room temperature. The mixture was heated at 60° C. for 0.5 h and kept at 120° C. for 1 h to evaporate hexane and water. The reaction was then treated at 320° C. for 1 h to decompose manganese oleate on the surface of iron oxide nanocrystals (seeds). The synthesized black colloids were purified using ethanol (and/or acetone), and precipitated by centrifugation at 7000 rpm for 15 min. The resulting black precipitates were then dissolved in hexane and the purified IO@MF was separated from hexane solution containing colloidally unstable nanocomposites. The purified and colloidally stable nanocrystalline IO@MF was well dispersed in various nonpolar solvents such as, hexane, THF, and toluene. The concentration ratio of manganese to iron in IO@MF nanocrystals was 0.28, measured by ICP-OES.

Example 2: Phase Transfer of IO@MF Nanocrystals

As-synthesized IO@MF nanocrystals (see Example 1) were transferred to aqueous solution by ligand encapsulation methods using probe sonication. 0.05 mmol of oleylphosphate as a surface stabilizer was stirred with 5 mg of nanocrystal in hexane solution ([Fe]=1,500 mg/ml and [Mn]=870 mg/L, measured by ICP-OES) and 10 ml of ultra-pure water (MILLIPORE, 18.2 MΩ cm). Aqueous and organic phases were mixed by application of a probe-sonicator (UP 50H, DR. HIELSCHER) for 10 min at 80% amplitude and full cycle. The resulting solution was further stirred for 1 day under vacuum to evaporate hexane and to obtain a clean black solution. To remove excess free surface stabilizer molecules left in the suspension, the phase transferred IO@MF nanocrystals were further purified using ultracentrifugation (Sorvall WX Ultra 80, Thermo scientific) at 50,000 rpm for 2 h, and membrane filtration (Ultrafiltration cellulose membranes, 100 KDa MWCO) using a stirred cell (Amicon), followed by syringe filtration (pore size of 0.22 μm, WHATMAN-NYL).

Example 3: Synthesis of Iron Oxide NPs 8 nm iron oxide NPs were prepared by stirring 0.178 g FeO(OH) fine powder, 2.26 g oleic acid and 5.0 g 1-octadecene together in a three-neck flask equipped with a heating mantle and temperature controller. The system was kept at 120° C. for 1 h to remove residual water and then heated to 320° C. for 1 h under argon condition. The resulting brown-black synthesized colloid was purified by acetone and methanol by collecting (10 ml) in a centrifuge tube, mixing with 40 ml of ethanol/acetone solution, and centrifuging at 6000 rpm for 15 min. This procedure was repeated 4-5 times to remove unreacted iron salts, excess organic moieties. Purified iron oxide NPs were finally collected in hexanes and stored at 4° C.

NPs core size was characterized by Transmission Electron Microscope (TEM, FEI Tecnai G2 Spirit) operated at 120 kV. TEM samples were prepared by placing a small drop (10 μL) of the diluted NPs suspension on a carbon coated copper grids (Electron Microscopy Sciences) and left to dry at room temperature (22±0.5° C.). The average diameter (with size distribution) was obtained by counting more than 1000 randomly chosen NPs from the TEM micrographs using ImageJ software (National Institutes of Health).

Inductively Coupled Plasma Optical Emission Spectroscopy (ICP-OES) was used to determine the iron concentration of NPs in both hexane and water. Iron oxide NPs were digested by strong nitric acid (10%) and analyzed with ICP-OES (Perkin Elmer ELAN DRC).

The total organic carbon (TOC) of the coated bi-layers was analyzed using a total organic carbon analyzer (TOC-L total organic carbon analyzer, Shimadzu Scientific Instrument, Inc., MD). All NPs samples were diluted to the same concentration (as Fe). Before measurement, samples were acidified with HCl for evasion of inorganic carbon.

Magnetization measurements were obtained with a superconducting quantum interference device (SQUID) magnetometer (Quantum Design MPMS 5XL SQUID). Magnetization and hysteresis data were collected at a temperature of 300 K up to 5 T with powders of NPs.

Serial concentrations of salt stock solutions (ACS grade NaCl and $CaCl_2$) were prepared and filtrated (pore size of 0.2 um, Millipore) before use. DLS and zeta potential measurements were conducted at room temperature (22±0.5° C.). Reagents included: iron(III) oxide (hydrated, catalyst grade, 30-50 mesh), oleic acid (technical grade, 90%), 1-octadecene (technical grade, 90%), oleic acid (OA, 99%), elaidic acid (EA, 99.0%), sodium stearate (SA, 99.0%), sodium palmitate (PA, 98.5%), sodium myristate (MA, 99%), sodium laurate (LA, 99%), sodium decanoate (DA, 98%), sodium monododecyl phosphate (SDP), sodium dodecyl sulfate (SDS, 99.0%), dodecyltrimethylammonium bromide (C12TAB, 98%), N,N-Dimethyl-N-dodecylglycine betaine (EMPIGEN), sodium chloride (ACS reagent, 99.0%), calcium chloride dihydrate (ACS reagent, 99%), nitric acid (trace metal grade), sodium ricinolate (RA, 90%), and sodium dodecylbenzenesulfonate (SDBS, 95%). Reagent grade of hexane, acetone, and ethanol were used without purification.

The hydrodynamic diameters and zeta potentials of NPs in water were measured by Dynamic Light Scattering (DLS, Zetasizer, Malvern Nano ZS, UK). Triplicate samples were prepared and measured for the size and zeta potential analysis. The average value and the standard deviation of size and zeta potential were calculated from at least 5 measurements.

The aggregation kinetics of iron oxide NPs in the presence of salt was examined by DLS equipped with a HeNe 633 nm laser (Zetasizer, Malvern Nano ZS), operating in backscattering mode at a scattering angle of 173°. Before each aggregation measurement, a predetermined volume of NPs stock solution and ultrapure water were added into a vial and pH was adjusted to 7.0±0.2. Then a certain amount of salt solution was added into the vial to make the total volume of sample to be 1 mL and the concentration of NPs (as Fe) was 1 mg/L. Samples were transferred into the DLS measurement chamber after a short time of vortex. Data points were measured every 15 sec and recorded continuously for 20 to 60 min, depending on the aggregation rate of each sample. The attachment efficiency, a, of the iron oxide NPs in the presence of monovalent ($Na^+$) and divalent ($Ca^{2+}$) cations was calculated by the following equation:

$$\alpha = \frac{k}{k_{fast}}$$

where k is the initial aggregation rate constant at examined salt concentrations and $k_{fast}$ is the aggregation rate under diffusion-limited (fast) aggregation conditions.

Example 4: Phase Transfer of Iron Oxide NPs

Purified NPs (see Example 3) were transferred from hexane to water by ligand addition (bilayer) method using a probe sonicator. Specifically, 1.0 mL of NPs in hexane solution (1-5 g/L) and a varied amount of ligand was added to 10 mL of ultrapure water (Millipore, 18.2Ω) in a glass vial. The mixture of organic and aqueous phase was then subjected to a probe sonicator (UP 50H, Dr. Hielscher, GMHB) for 3-6 min at various amplitude (60-75%) and full cycle. The cloudy and colored suspension after sonication was stirred for 1 day for the evaporation of residual hexane. The aqueous phase was collected and the NPs were purified via ultracentrifugation (Sorvall WX Ultra 80, Thermo scientific), membrane filtration (Ultrafiltration cellulose membranes, 100 KDa MWCO), followed by redispersion and filtration through a syringe filter (pore size of 0.2 μm, Millipore).

Example 5: Synthesis of Nanocrystalline Iron Oxides, Manganese Oxides, and Manganese Iron Oxides (Ferrites)

11 nm magnetic metal oxides were synthesized by metal precursor decomposition at high temperature. For iron oxide nanocrystals, 2 mmol of FeOOH were used as an iron precursor and decomposed in the presence of 8 mmol of oleic acid in 8 g of 1-octadecene at 320° C. for 1 h. Manganese oxide nanocrystals were synthesized by decomposition of 3.0 mmol of manganese oleate with 1.5 mmol of oleic acid in 5 g of 1-octadecene at 320° C. for 1 h. Manganese iron oxide nanocrystals were synthesized by decomposition of the mixture of metal oleate precursors (0.27 mmol of manganese oleate and 0.72 mmol of iron oleate as metal precursors) with excess oleic acid (2 mmol) in 5 g of 1-octadecene at 320° C. for 1 h; the composition of the nanocrystal between iron and manganese were controlled by the ratio between two different metal precursors. The resulting nanocrystals were purified using ethanol, acetone, and hexane; nearly 0.5 g of the resulting colloidal nanocrystals was mixed with 5 ml of hexane, 10 ml of ethanol, and 30 ml of acetone and centrifuged at 8000 rpm for 20 min. This process was repeated three times. The purified black colloids were well dispersed in various nonpolar solvents such as, chloroform, hexane, and toluene.

Example 6: Phase Transfer of Engineered Nanocrystals: Single Layered Nanocrystals As-synthesized nanocrystal (see Example 5) was phase transferred to aqueous phase via single and bilayer methods (ligand exchange and ligand encapsulation). For the formation of the single layered nanocrystal structure, the as synthesized nanocrystals were coated with poly (ethylene glycol) with 200 molecular weights (PEG200) by ligand exchange method. More specifically, a particular amount of PEG200 (30.0 mg of PEG200) was mixed with 0.5 ml nanocrystal solution ($1.5 \times 10^{18}$ nanocrystals/L) in hexane and 6 ml of ultra-pure water (MILLIPORE, 18.2 MΩ cm). Aqueous and organic phases were mixed and sonicated using a probe-sonicator (UP 50H, Hielscher) for 5 min at 80% amplitude, full cycle. The resulting nano-colloid suspensions were further stirred for 1 day under vacuum condition to evaporate hexane and to obtain a clear brownish black solution. The phase transferred nanocrystal suspensions were, then, separated from excess (free) organic phase transfer agent molecules using ultracentrifugation (Sorvall WX Ultra 80, Thermo scientific) at 60,000 rpm for 2 h, and membrane filtration (Ultrafiltration cellulose membranes, 100 KDa MWCO) using a stirred cell (Amicon), followed by syringe filtration (0.22 μm, PTFE, Whatman). The transfer yield of the final solution was over 60%.

Example 7: Phase Transfer of Engineered Nanocrystals: Bilayered Nanocrystals 0.05 mmol of surface stabilizers (oleyl phosphate, oleic acid, octadecylphosphonic acid, stearic acid, SDS, and CTAB) were added to 0.5 ml of nanocrystal in hexane solution (particular nanocrystal concentration was $1.5 \times 10^{18}$ nanocrystals/L) and mixed with 6 ml of ultra-pure water (Millipore, 18.2 MΩ cm). The aqueous and organic mixture was, then, probe sonicated and purified by ultracentrifugation, membrane filtration, and syringe filtration as mentioned above. In all cases, the transfer yield of each of the purified nanocrystal was over 70%.

Example 8: Synthesis of Manganese Oleate

Manganese oleate has been synthesized. Manganese chloride tetrahydrate (15.8 g, 80 mmol) reacted with oleic acid (45.2 g, 144 mmol) in 20 g of ethanol, 10 g of water, and 30 g of hexane at 60° C. for 4 h. The resulting pink colloidal suspension was washed by using water and ethanol. The purified manganese oleate was extracted by hexane.

Example 9: Synthesis of Nanocrystalline Manganese Oxide

Manganese oleate (see Example 8) was used as a manganese precursor for manganese oxide nanocrystal synthesis. 12.2 nm manganese oxides were prepared using 3.0 mmol manganese oleate, 2.0 mmol oleic acid in 5.0 g 1-octadecene at 320° C. for 1 h. 18.7 nm manganese oxide was synthesized by 6.0 mmol manganese oleate with 2 mmol oleic acid in 5.0 g 1-octadecene at 320° C. for 1 h. For 27.9 nm manganese oxide, 9.5 mmol manganese oleate was decomposed in the presence of 2.0 mmol oleic acid in 5.0 g 1-octadecene at 320° C. for 1 h. The resulting nanocrystals were purified using methanol, acetone, and hexane. More specifically, 1 g of the resulting colloidal nanocrystals was mixed with 10 ml of hexane, 20 ml of ethanol, and 20 ml of acetone and centrifuged at 7000 rpm for 20 min. This process was repeated three times. Final, cleaned colloidal nanocrystals were redispersed in hexane. All nanocrystals were synthesized under nitrogen condition (N2, 99.999%).

Example 10: Phase Transfer of Manganese Oxide Nanocrystals

As-synthesized nanocrystals (see Example 9) were transferred to water by ligand encapsulation and exchange methods using probe sonication. For bilayer structures, manganese oxide nanocrystals, 0.05 mmol of surface stabilizer (oleyl phosphate, oleic acid, octadecylphosphonic acid, and stearic acid) was stirred with 0.5 ml of nanocrystal in hexane solution (concentration of manganese=7.5 mg/ml) and 10 ml of ultra-pure water (Millipore, 18.2Ω). Aqueous and organic phases were mixed by application of a probe-sonicator (UP 50H, Dr. Hielscher, GMHB) for 5 min at 80% amplitude and full cycle. The resulting solution was further stirred for 1 day to evaporate hexane, resulting in a transparent, brown solution. To remove excess free phase transfer agent(s) left in the suspension, the phase transferred manganese oxide nanocrystals were further purified using ultracentrifugation (Sorvall WX Ultra 80, Thermo scientific) at 40,000 rpm for 2 h, and membrane filtration (Ultrafiltration cellulose membranes, 100 KDa MWCO) using a stirred cell (Amicon), followed by syringe filtration (pore size of 0.22 μm, Whatman-NYL). The transfer yield of the final solution was typically ca. 70% by mass. For single layered polyethylene glycol coated manganese oxide nanocrystals, polyethylene glycol (PEG) (30.0 mg of PEG200, 10.0 mg of PEG 1K, and 10 mg of PEG 10K) was mixed with 0.5 ml manganese oxide nanocrystal solution ([Mn]=7.5 mg/ml) in hexane and 10 ml of Milli-Q water. The aqueous and organic mixture was probe sonicated and purified by ultracentrifugation, filtered as done above. In all cases, the transfer yield of the purified nanocrystalline manganese oxide coated with PEG was over 60%.

In summary, colloidally stable IO@MF nanocrystals coated with phosphate group functionalized bilayer surface coatings are effective for U sorption/separation in water. The greatest U sorption capacity of IO@MF nanocrystals was colloidally stable when the surface of IO nanocrystals were coated with iron rich MF ([Mn]/[Fe] of an IO@MF nanocrystal=0.28). This core@shell type magnetic material may be used as a new design of nano-sorbents for water remediation. Additionally, an effective and general approach for aqueous stable, monodispersed, superparamagnetic NPs with a series of organic bilayer coatings is provided herein. As described, bilayer surface modification methods not only provide stable, monodisperse suspensions but also allow for variable surface chemistries to tune surface charge, colloidal stability and functionality, as needed for application. Further, such methods can be modified to engineer water-stable NPs (oxide) analogs with different core compositions (e.g. metal oxides), sizes, and shapes.

Further, the engineered monodisperse manganese oxide nanocrystals systematically synthesized, stabilized in water, and characterized herein are exemplified as platform materials for advanced uranium, as uranyl, sorption applications. As a function of particle size, surface (layered) structure, and chemistry, these materials are capable of ultra-high uranyl sorption capacities (>50% wt U/wt Mn, with partial U reduction from VI to IV) with simultaneous high aqueous stabilities (at environmentally relevant ionic strengths), when optimized via bilayer coating(s) with second (outer-facing) layers consisting of either carboxylic acid or phosphonic acid head groups. Fundamental understanding of the U localization at/in the nanocrystal structures/interfaces as well as a complete system redox evolution is important for achieving a next iteration in Mn-based particle design for optimized uranyl sorption and separation application platforms. Accordingly, the classic nanocrystal synthetic approach described above can optimize monodisperse manganese iron oxide (manganese ferrites) nanocrystals with tailorable surface chemistries for uranium sorption and separation under environmentally relevant chemistries. Among the described libraries of phase (water) transferred manganese ferrite nanocrystals, oleyl phosphate (phosphonate group functionalized unsaturated carbon chain linked bilayered structure) showed the highest uranium adsorption capacities, specificity, and colloidal stability even under elevated ionic strengths and types. With respect to core composition dependent sorption, $MnFe_2O_4$ nanocrystals demonstrated significantly enhanced uranium adsorption compared to iron oxide, manganese rich manganese ferrite and manganese oxide nanocrystals (at pH 7 with normalized surface coatings). Mechanistically, uranium sorption is due to both chemisorption and redox reactions between transition metal ions (manganese (II) and iron (II)) and uranium ions (uranium (VI) and uranium (IV)) at the particle surface. Taken together, this platform provides for optimized/tailored, engineered particle system approach(es) for next generation actinide sorption, separation, and sensing technologies. The maximum uranyl sorption over 1.6 mg of uranium per gram of the nanocrystal of manganese ferrite is one of the most attractive advantages of the nanocrystals described herein. Favorable sorption enhances sensing, separation, and remediation related technologies for heavy metals, lanthanides, and actinides under environmental conditions.

When introducing elements of the present disclosure or embodiments thereof, the articles "a," "an," "the," and "said" are intended to mean that there are one or more of the elements. The terms "comprising," including," and "having" are intended to be inclusive and mean that there may be additional elements other than the listed elements.

In view of the above, it will be seen that the several advantages of the disclosure are achieved and other advantageous results attained. As various changes could be made in the above processes and composites without departing from the scope of the disclosure, it is intended that all matter contained in the above description and shown in the accompanying drawings shall be interpreted as illustrative and not in a limiting sense.

What is claimed is:

1. A method for synthesizing iron oxide (IC)) nanocrystals, the method comprising:
   providing a solution of IO nanocrystals;
   coating the IO nanocrystals with manganese ferrite, wherein coating the IO nanocrystals comprises decomposing a manganese oleate onto the IO nanocrystals such that an oleic acid layer is formed on the IO nanocrystals; and
   stabilizing the manganese ferrite coated IO nanocrystals with a bilayer surface comprising at least one surfactant, wherein the stabilizing comprises linking an oleylphosphate outer layer to the oleic acid layer.

2. The method in accordance with claim 1, wherein linking the oleylphosphate outer layer to the oleic acid layer is performed under probe sonication.

3. The method in accordance with claim 1, wherein a molar composition ratio of manganese to iron is in the range of from 0.03 to 2.00.

4. The method in accordance with claim 1, wherein the at least one surfactant is selected from the group consisting of oleic acid, ricinoleic acid, elaidic acid, stearic acid, palmitic acid, myristic acid, lauric acid, decanoic acid, SDP, SDS, SDBS, $C_{12}TAB$, EMPIGEN, dodecyl phosphonate, hexadecyl phosphonate, and dihexadecyl phosphate.

5. A method of synthesizing iron oxide (IO) nanocrystals for adsorption of a substance, the method comprising:
   providing a solution of IO nanocrystals;
   coating the IO nanocrystals with manganese ferrite, wherein coating the IO nanocrystals comprises decomposing a manganese oleate onto the IO nanocrystals such that an oleic acid layer is formed on the IO nanocrystals;
   stabilizing the manganese ferrite coated IO nanocrystals with a bilayer surface comprising at least one surfactant, wherein the stabilizing comprises linking an oleylphosphate outer layer to the oleic acid layer; and, utilizing the IO nanocrystals to adsorb the substance.

6. The method of claim 5, wherein the substance is selected from the group consisting of a heavy metal, a lanthanide and an actinide.

7. The method of claim 6, wherein the actinide is uranium.

8. The method of claim 6, wherein the heavy metal is selected from the group consisting of arsenic and chromium.

9. The method of claim 6, wherein the lanthanide is selected from the group consisting of lanthanum and cerium.

10. The method of claim 5, wherein the IO nanocrystals have a uranium adsorption capacity of at least 50% weight uranium/weight manganese.

11. The method of claim 5, wherein the adsorption occurs at a surface of the bilayer coating.

12. The method of claim 5, wherein the adsorption occurs underneath the bilayer coating.

13. The method of claim 5, wherein the at least one surfactant is selected from the group consisting of oleic acid, ricinoleic acid, elaidic acid, stearic acid, palmitic acid, myristic acid, lauric acid, decanoic acid, SDP, SDS, SDBS, $C_{12}TAB$, EMPIGEN, dodecyl phosphonate, hexadecyl phosphonate, and dihexadecyl phosphate.

* * * * *